United States Patent
Matsuo

(10) Patent No.: US 6,484,253 B1
(45) Date of Patent: Nov. 19, 2002

(54) DATA PROCESSOR

(75) Inventor: Masahito Matsuo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/355,024
(22) PCT Filed: Jan. 24, 1997
(86) PCT No.: PCT/JP97/00173

§ 371 (c)(1),
(2), (4) Date: Jul. 23, 1999

(87) PCT Pub. No.: WO98/33115

PCT Pub. Date: Jul. 30, 1998

(51) Int. Cl.[7] ................................. G06F 9/30
(52) U.S. Cl. ...................... 712/212; 712/216
(58) Field of Search .................. 712/25, 212, 216, 712/226, 220

(56) References Cited

U.S. PATENT DOCUMENTS

| | | | |
|---|---|---|---|
| 4,367,524 A | | 1/1983 | Budde et al. ............... 712/246 |
| 5,163,139 A | * | 11/1992 | Haigh ....................... 712/206 |
| 5,193,205 A | | 3/1993 | Matsuo et al. ............. 712/239 |
| 5,371,862 A | * | 12/1994 | Suzuki ...................... 712/234 |
| 5,404,472 A | | 4/1995 | Kurosawa et al. .......... 712/229 |
| 5,430,854 A | * | 7/1995 | Sprague .................... 712/236 |
| 5,526,498 A | | 6/1996 | Matsuo et al. ............. 712/239 |
| 5,701,449 A | | 12/1997 | Matsuo et al. ............. 712/239 |
| 5,761,470 A | * | 6/1998 | Yoshida ..................... 712/210 |
| 5,794,063 A | * | 8/1998 | Favor ......................... 712/23 |
| 6,049,864 A | * | 4/2000 | Liu ............................. 712/214 |

FOREIGN PATENT DOCUMENTS

| | | |
|---|---|---|
| JP | 59091551 A | 5/1984 |
| JP | 62285140 | 12/1987 |
| JP | 1-310444 | 12/1989 |
| JP | 2-77940 | 3/1990 |
| JP | 3-62129 | 3/1991 |
| JP | 3-129433 | 6/1991 |
| JP | 3-218523 | 9/1991 |
| JP | 4-96133 | 3/1992 |

OTHER PUBLICATIONS

"i486™ Microprocessor Programmer's Reference Manual", Intel Corp., 1990.
"ACORN RISC Machine Family Data Manual", VLIS Technology, Inc., 1990.
"Power PC 603 RISC Microprocessor User's Manual", IBM Microelectronics, 1991–1994.
"TMS32054x User's Guide", TI, 1995.

* cited by examiner

Primary Examiner—Eric Coleman
(74) Attorney, Agent, or Firm—Burns, Doane, Swecker & Mathis, LLP

(57) ABSTRACT

The present invention relates to a data processor, and particularly in a data processor performing condition execution on the basis of flag information, aims at obtaining a data processor having excellent code efficiency, which can reduce branch penalty. In order to attain the aforementioned object, it is so structured that, when a first instruction decoded in a first decoder is an execution condition specifying instruction specifying the execution condition for a pair of second instructions executed in parallel, a first execution condition determination unit performs determination of the execution condition for the second instructions defined by the execution condition specifying instruction on the basis of the flag information and controls assertion/non-assertion of an execution inhibit signal on the basis of whether the execution condition defined by the execution condition specifying instruction is satisfied or not.

20 Claims, 33 Drawing Sheets

| Mnemonic | Condition | C |
|---|---|---|
| MVFOF | F0==0 | 0 |
| MVFOT | F0==1 | 1 |

| Mnemonic | Condition | C |
|---|---|---|
| BRFOF | F0==0 | 0 |
| BRFOT | F0==1 | 1 |

| Mnemonic | Condition | C |
|---|---|---|
| SETFOF | F0==0 | 0 |
| SETFOT | F0==1 | 1 |

CONDITION BRANCH INSTRUCTION

| MNEMONIC | CONDITION | F-op | F0 | F1 |
|---|---|---|---|---|
| BRF0F | F0==0 | 00 | 00 | 10 |
| BRF0T | F0==1 | 00 | 01 | 10 |
| BRF1F | F1==0 | 00 | 10 | 00 |
| BRF1T | F1==1 | 00 | 10 | 01 |
| BRFAF | (F0==0) and (F1==0) | 00 | 00 | 00 |
| BRFAT | (F0==0) and (F1==1) | 00 | 00 | 01 |
| BRTAF | (F0==1) and (F1==0) | 00 | 01 | 00 |
| BRTAT | (F0==1) and (F1==1) | 00 | 01 | 01 |
| BRFRF | (F0==0) or (F1==0) | 01 | 00 | 00 |
| BRFRT | (F0==0) or (F1==1) | 01 | 00 | 01 |
| BRTRF | (F0==1) or (F1==0) | 01 | 01 | 00 |
| BRTRT | (F0==1) or (F1==1) | 01 | 01 | 01 |
| BRTXF | (F0==1) xor (F1==0) | 10 | 01 | 00 |
| BRTXT | (F0==1) xor (F1==1) | 10 | 01 | 01 |

CONDITION SET INSTRUCTION

| MNEMONIC | CONDITION | | | F-op | F0 | F1 |
|---|---|---|---|---|---|---|
| SETF0F | F0==0 | | | 00 | 00 | 10 |
| SETF0T | F0==1 | | | 00 | 01 | 10 |
| SETF1F | F1==0 | | | 00 | 10 | 00 |
| SETF1T | F1==1 | | | 00 | 10 | 01 |
| SETFAF | (F0==0) | and | (F1==0) | 00 | 00 | 00 |
| SETFAT | (F0==0) | and | (F1==1) | 00 | 00 | 01 |
| SETTAF | (F0==1) | and | (F1==0) | 00 | 01 | 00 |
| SETTAT | (F0==1) | and | (F1==1) | 00 | 01 | 01 |
| SETFRF | (F0==0) | or | (F1==0) | 01 | 00 | 00 |
| SETFRT | (F0==0) | or | (F1==1) | 01 | 00 | 01 |
| SETTRF | (F0==1) | or | (F1==0) | 01 | 01 | 00 |
| SETTRT | (F0==1) | or | (F1==1) | 01 | 01 | 01 |
| SETTXF | (F0==1) | xor | (F1==0) | 10 | 01 | 00 |
| SETTXT | (F0==1) | xor | (F1==1) | 10 | 01 | 01 |

EXECUTION CONDITION SPECIFY INSTRUCTION

BIT NUMBER

| MNEMONIC | CONDITION | F-op | F0 | F1 |
|---|---|---|---|---|
| EXEF0F | F0==0 | 00 | 00 | 10 |
| EXEF0T | F0==1 | 00 | 01 | 10 |
| EXEF1F | F1==0 | 00 | 10 | 00 |
| EXEF1T | F1==1 | 00 | 10 | 01 |
| EXEFAF | (F0==0) and (F1==0) | 00 | 00 | 00 |
| EXEFAT | (F0==0) and (F1==1) | 00 | 00 | 01 |
| EXETAF | (F0==1) and (F1==0) | 00 | 01 | 00 |
| EXETAT | (F0==1) and (F1==1) | 00 | 01 | 01 |
| EXEFRF | (F0==0) or (F1==0) | 01 | 00 | 00 |
| EXEFRT | (F0==0) or (F1==1) | 01 | 00 | 01 |
| EXETRF | (F0==1) or (F1==0) | 01 | 01 | 00 |
| EXETRT | (F0==1) or (F1==1) | 01 | 01 | 01 |
| EXETXF | (F0==1) xor (F1==0) | 10 | 01 | 00 |
| EXETXT | (F0==1) xor (F1==1) | 10 | 01 | 01 |

FIG. 28

```
BIT NUMBER           EXEFOT                    MV2W   R0,R2
  0  1  2                         32 33                      63
 | 00 | 100111 0001 0010 0  | 101000 0000 0010 0 |
       |                       |                  |
      621                     622                623
```

FIG. 29

```
BIT NUMBER      ST   R0,QR12                    EXETAT
  0  1  2                         32 33                      63
 | 00 | 110100 0000 1100 0  | 100111 0001 0001 0 |
       |                       |                  |
      626                     627                628
```

FIG. 30

```
       LD2W     R2,@(DISP,R14)                          ~631
       LDI      R8,#h'2000                              ~632
       LD2W     R0,@R8+      ||  NOP                    ~633
       LDI      R6,#0        ||  MV2WTAC  R2,A0         ~634

REPI     #20,REP_END                             ~635

LD2W     R2,@R8+      ||  CMP      A0,R0         ~636
       EXEFOT                ||  ADDI     R6,#1         ~637
       LD2W     R0,@R8+      ||  CMP      A0,R2         ~638
REP_END:
       EXEFOT                ||  ADDI     R6,#1         ~639
```

FIG. 31

| ADDRESS | FM | LEFT-HAND CONTAINER | | RIGHT-HAND CONTAINER | | |
|---|---|---|---|---|---|---|
| | 0 1 2 | | 16 17 | | 31 | |
| h'1005 | 00 | LD2W | R2,@R8+ | CMP | A0,R0 | ~636 |
| h'1006 | 00 | EXEF0T | | ADDI | R6,#2 | ~637 |
| h'1007 | 00 | LD2W | R0,@R8+ | CMP | A0,R2 | ~638 |
| h'1008 | 00 | EXEF0T | | ADDI | R6,#2 | ~639 |

FIG. 32

| ADDRESS | 0 31 | |
|---|---|---|
| h'2000~h'2003 | D[0] | ~641 |
| h'2004~h'2007 | D[1] | ~642 |
| h'2008~h'200b | D[2] | ~643 |
| h'200c~h'200f | D[3] | ~644 |
| h'209c~h'209f | D[39] | ~645 |

```
LD      R0,@(DISP_A,R14)                    ~651
LD      R1,@(DISP_B,R14)                    ~652
LD      R2,@(DISP_C,R14)                    ~653
BTSTI   R0,#0                               ~654
BTSTI   R1,#7                               ~655
EXETAT              ||  BSETI   R2,#3       ~656
ST      R2,@(DISP_C,R14)                    ~657

BTSTI   R0,#2                               ~658
BTSTI   R1,#15                              ~659
BL      SUB_1       ||  EXETOF              ~660

LD      R0,(DISP_D,R14)                     ~661
LD      R1,(DISP_E,R14)                     ~662
CMPEQI  R0,#0                               ~663
CMPI    R1,#8                               ~664
SETTAF  R0                                  ~665
ST      R0,(DISP_F,R14)                     ~666

SUB_1:
```

BIT NUMBER

```
F-op    00:  x and y and z
        01:  x or y or z
        10:  x xor y xor z
        11:  Reserved
F0      00:  x = F0
        01:  x = not(F0)
        10:  x = "0"(false)
        11:  x = "1"(true)
F1      00:  y = F1
        01:  y = not(F1)
        10:  x = "0"(false)
        11:  x = "1"(true)
F2      00:  z = F2
        01:  z = not(F2)
        10:  x = "0"(false)
        11:  x = "1"(true)
```

CONDITION BRANCH INSTRUCTION

CONDITION SET INSTRUCTION

| Mnemonic | F |
|----------|---|
| CMP      | 0 |
| CMPX     | 1 |

| Mnemonic | F-op | Condition |
|---|---|---|
| EXExAy | 00: | x and y |
| EXExRy | 01: | x or y |
| EXExXy | 10: | x xor y |

| Mnemonic(x, y) | Fn | Condition(x, y) |
|---|---|---|
| EQ | 000 | Zn==1 |
| NE | 001 | Zn==0 |
| LT | 010 | LTn==1 |
| LE | 011 | GTn==0 |
| GT | 100 | GTn==1 |
| GE | 101 | LTn==0 |
| T | 111 | 1 (True) |

CONDITION BRANCH INSTRUCTION

CONDITION SET INSTRUCTION

EXEC COND1, COND2, COND3

| Mnemonic | CONDn | Condition |
|---|---|---|
| FOT | 000: | F0 = 0 |
| FOF | 000: | F0 = 1 |
| A   | 011: | Always |
| FAF | 100: | (F0 = 0) and (F1 = 0) |
| FAT | 101: | (F0 = 0) and (F1 = 1) |
| TAF | 110: | (F0 = 1) and (F1 = 0) |
| TAT | 111: | (F0 = 1) and (F1 = 1) |

```
Mnemonic   COND    Condition
EXEF0      001:    F0 = 1
EXEF1      011:    F1 = 1
EXEFAF     100:    (F0 = 0) and (F1 = 0)
EXEFAT     101:    (F0 = 0) and (F1 = 1)
EXETAF     110:    (F0 = 1) and (F1 = 0)
EXETAT     111:    (F0 = 1) and (F1 = 1)

Mnemonic   OPUn    Condition
T          00:     Cond is false
F          01:     Cond is true
A          11:     Always
```

DATA PROCESSOR

TECHNICAL FIELD

The present invention relates to a data processor of high performance, and more particularly, it relates to a data processor performing condition execution on the basis of a flag on which an operation result is reflected.

BACKGROUND TECHNIQUE

In a data processor, pipeline processing is frequently employed for improving the performance. As one of large factors hindering performance improvement in the pipeline processing, there is overhead resulting from execution of a branch. While various contrivances are made as to this, there is condition execution of an instruction as one thereof.

ARM (VLSI Technology), which is a 32-bit RISC processor, provides an execution condition specify field of four bits for instruction codes of all instructions, and can condition-execute all instructions. When executing one instruction only when a certain condition is satisfied, for example, it can be processed without causing a branch. When performing unconditional execution, one bit pattern of this field of four bits specifies regular execution.

Thus, some processors such as ARM reduce penalty of a branch by rendering many instructions condition-executable, for attaining performance improvement and reduction of power consumption. When making setting to perform condition execution in all instructions, however, fields specifying execution conditions are required for all instructions and hence the instruction length lengthens.

Particularly when ROMing and storing a program to be built in, reduction of the code size becomes important. When forcibly excessively suppressing the instruction length for reduction of the code size, an area describing actual instructions further reduces by the execution condition specify fields, and hence the number of encodable instructions reduces. Thus, when comprising condition specify fields for all instructions, there has been such a problem that the code size enlarges.

TMS320C54x series (TI), which is a 16-bit fixed-point DSP, comprises an XC instruction specifying execution of a next instruction (or subsequent two instructions) only when a condition is satisfied thereby reducing penalty of a branch. This technique requires one clock cycle for specifying the execution condition, and hence has a small effect. Further, there have been such problems that it is difficult to implement sophisticated parallel processing of a superscalar, VLIW and the like used in the processor, while an external interrupt immediately after the XC instruction is also limited.

In many data processors, an operation result or a comparison result is held as a flag in a processor status word, and this flag can be referred to as an execution condition for a condition branch instruction or a condition trap instruction. In this flag, information of a single operation result or comparison result is generally held. However, it is useful for reduction of code efficiency and reduction of penalty by a branch if a combination of a plurality of operation results or an operation result other than an immediately precedent operation can be referred to as the condition. Further, the number of registers used as those for working is also reducible.

For example, the processor Power PC (IBM) comprises a condition register consisting of eight flag groups consisting of 4-bit flags, and is contrived to be capable of specifying to which flag group to reflect the operation result in a comparison instruction and to be capable of referring to an arbitrary flag in a condition branch instruction or the like. A logical operation between the flags is also possible. However, fields for specifying a flag group storing the comparison result in the comparison instruction and the flag referred to in determination of the branch condition in the condition branch instruction are required and the instruction length lengthens by the field area. There has been such a problem that, when forcibly suppressing the instruction length, the number of instructions encodable to short instructions reduces and the code size enlarges similarly to the processor ARM.

In order to efficiently handle Boolean algebra, some processors comprise an instruction setting "1" when the condition is true or "0" when false. For example, the processor x86 series (Intel) comprises a SETcc instruction. However, there has been such another problem that, only one condition can be determined with these instructions and hence complex expressions cannot be efficiently processed when a composite condition of a plurality of condition is specified or the like.

DISCLOSURE OF THE INVENTION

The present invention has been proposed in order to solve the aforementioned problems, and aims at obtaining a high-performance data processor having excellent code efficiency, which can reduce penalty of a branch by condition execution.

It aims at obtaining a high-performance data processor implementing condition execution with an instruction set having a small instruction code size, which can reduce penalty of a branch.

A first aspect of the data processor according to the present invention is an apparatus receiving a parallel processing instruction including first and second instruction codes defining first and second instructions, which comprises a first decoder for decoding the first instruction code to output a first decoded result, a second decoder for decoding the second instruction code to output a second decoded result, flag information storage means for storing flag information, first execution control means for controlling execution of the first instruction on the basis of the first decoded result, second execution control means for controlling execution of the second instruction on the basis of the second decoded result and first execution condition judgment means for outputting second instruction execution control information which controls whether to permit or inhibit the execution of the second instruction to the second instruction execution control means on the basis of whether or not the flag information satisfies a second instruction execution condition when the first instruction is an execution condition specifying instruction defining an execution condition for the second instruction based on the flag information, and the second execution control means controls whether to permit or inhibit the execution of the second instruction on the basis of indication of the second instruction execution control information.

As in a second aspect of the data processor, it may further comprise second execution condition judgment means for outputting first instruction execution control information which controls whether to permit or inhibit the execution of the first instruction to the first execution control means on the basis of whether or not the flag information satisfies a first instruction execution condition when the second instruction is an execution condition specifying instruction defining an execution condition for the first instruction based on the flag information, and the first execution control means may control whether to permit or inhibit the execution of the first instruction on the basis of indication of the first instruction execution control information.

As in a third aspect of the data processor, the parallel processing instruction may further comprise third and fourth instruction codes defining third and fourth instructions, it may further include a third decoder for decoding the third instruction code to output a third decoded result; a fourth decoder for decoding the fourth instruction code to output a fourth decoded result; third execution control means for controlling execution of the third instruction on the basis of the third decoded result; fourth execution control means for controlling execution of the fourth instruction on the basis of the fourth decoded result; and third execution condition judgment means for outputting fourth instruction execution control information which controls whether to permit or inhibit the execution of the fourth instruction to the fourth execution control means on the basis of whether or not the flag information satisfies a fourth instruction execution condition when the third instruction is an execution condition specifying instruction defining an execution condition for the fourth instruction based on the flag information, wherein the fourth execution control means may control whether to permit or inhibit the execution of the fourth instruction on the basis of indication of the fourth instruction execution control information.

As in a fourth aspect of the data processor, the parallel processing instruction may further include a third instruction code defining a third instruction, it may further comprise a third decoder for decoding the third instruction code to output a third decoded result and third execution control means for controlling execution of the third instruction on the basis of the third decoded result, wherein the first execution condition judgment means may output third instruction execution control information which controls whether to permit or inhibit the execution of the third instruction to the third execution control means on the basis of whether or not the flag information satisfies a third instruction execution condition when the first instruction is the execution condition specifying instruction also defining an execution condition for the third instruction based on the flag information as well as the execution condition for the second instruction, and the third execution control means may control whether to permit or inhibit the execution of the third instruction on the basis of indication of the third instruction execution control information.

As in a fifth aspect of the data processor, the second instruction execution condition and the third instruction execution condition may be independently described in the first instruction code respectively when the first instruction is the execution condition specifying instruction.

As in a sixth aspect of the data processor, the second instruction execution condition and the third instruction execution condition may be partially duplicated in the first instruction code when the first instruction is the execution condition specifying instruction, the second instruction execution condition may consist of a common execution condition and an execution condition specific to the second instruction, and the third instruction execution condition may consist of the common execution condition and an execution condition specific to the third instruction.

As in a seventh aspect of the data processor, a common execution condition common to the second instruction execution condition and the third instruction execution condition may be described in the first instruction code when the first instruction is the execution condition specifying instruction, and the first execution condition judgment means may output the second instruction execution control information indicating permission of the execution of the second instruction while outputting the third instruction execution control information indicating inhibition of the execution of the third instruction when satisfying the common executing condition, and may output the second instruction execution control information indicating inhibition of the execution of the second instruction while outputting the third instruction execution control information indicating permission of the execution of the third instruction when not satisfying the common execution condition.

As in an eighth aspect of the data processor, the flag information may include first and second flag information, and the execution condition specifying instruction may be an instruction specifying an execution condition consisting of a composite condition decided by the first flag information and the second flag information.

A ninth aspect of the data processor according to the present invention is an apparatus capable of executing an instruction at least including a flag update instruction to update flag information and a flag control execution instruction whose execution content is decided on the basis of the flag information, which comprises flag information storage means for storing the flag information and instruction execution control means for outputting flag update relevant information relevant to flag updating to the flag information storage means on the basis of the flag update instruction when an instruction to be executed is the flag update instruction and for execution-controlling the flag control execution instruction with an execution content decided on the basis of the content of the flag information when the instruction is the flag control execution instruction, the flag information includes first and second flag information each including information of at least one flag, and the flag information storage means may store the first flag information as the second flag information and update the first flag information on the basis of the flag update relevant information.

As in a tenth aspect of the data processor, the first flag information may include information of a plurality of flags, and the second flag information may include information of a plurality of flags.

As in an eleventh aspect of the data processor, the flag information may further include third flag information, and the flag information storage means may store the second flag information as the third flag information when the second flag information is updated.

A twelfth aspect of the data processor according to the present invention is an apparatus capable of executing an instruction at least including a flag update instruction to update flag information and a flag control execution instruction whose execution content is decided on the basis of the flag information, which comprises flag information storage means for storing the flag information and instruction execution control means for outputting flag update relevant information relevant to flag updating to the flag information storage means on the basis of the flag update instruction when an instruction to be executed is the flag update instruction and for execution-controlling the flag control execution instruction with an execution content decided on the basis of the flag information when the instruction is the flag control execution instruction, the flag information includes first and second flag information each including information of at least one flag and update flag information specifying flag information to be updated in the first and second flag information, and the flag information storage means updates one of the first and second flag informations indicated by the update flag information on the basis of the flag update relevant information.

As in a thirteenth aspect of the data processor, the first flag information may include information of a plurality of flags, and the second flag information may include information of a plurality of flags.

As in a fourteenth aspect of the data processor, the flag control execution instruction may include an instruction whose execution content is decided on the basis of only the second flag information.

As in a fifteenth aspect of the data processor, the flag control execution instruction may include an instruction whose execution content is decided on the basis of a composite condition combining the first flag information and the second flag information.

A sixteenth aspect of the data processor according to the present invention is an apparatus capable of executing an instruction at least including a flag control execution instruction whose execution content is decided on the basis of flag information, which comprises flag information storage means for storing the flag information and instruction execution control means for execution-controlling the flag control execution instruction whose execution content is decided on the basis of the content of the flag information when the instruction is the flag control execution instruction, the flag information includes first and second flag information each including information of at least one flag, and the flag control execution instruction includes an instruction writing a first value in a prescribed storage unit on the basis of a composite condition decided by the first and second flag information when the composite condition is satisfied while writing a second value in the prescribed storage unit when not satisfied.

As in a seventeenth aspect of the data processor, the first flag information may include information of a plurality of flags, and the second flag information may include information of a plurality of flags.

As in an eighteenth aspect of the data processor, the prescribed storage unit may include at least one of a register, an accumulator and a memory.

In the first aspect of the data processor according to the present invention, the first execution condition judgment means outputs the second instruction execution control information which controls whether to permit or inhibit the execution of the second instruction to the second execution control means on the basis of whether or not the flag information satisfies the second instruction execution condition when the first instruction is the execution condition specifying instruction defining an execution condition for the second instruction based on the flag information, and the second execution control means controls whether to permit or inhibit the execution of the second instruction on the basis of indication of the second instruction execution control information.

When the first instruction is the execution condition specifying instruction, therefore, various execution conditions for the second instruction can be set while fully utilizing the first instruction code by describing the execution condition for the second instruction in the first instruction code, whereby processing employing a branch instruction can be decreased by this and reduction of branch penalty can be attained.

When the first instruction is the execution condition specifying instruction, further, the code size of the second instruction code can be reduced since it is not necessary to describe the execution condition for the second instruction in the second instruction code. Consequently, reduction of the cost can be attained following reduction of a program capacity created employing an instruction executable in this data processor.

In addition, prescribed processing can be efficiently executed by setting various execution conditions for the second instruction with the first instruction as the execution condition specifying instruction, whereby reduction of power consumption can be attained by reducing the number of clock cycles of the data processor necessary for implementation.

In the second aspect of the data processor, the second execution condition judgment means outputs the first instruction execution control information indicating whether to permit or inhibit the execution of the first instruction to the first execution control means on the basis of whether or not the flag information satisfies the first instruction execution condition when the second instruction is the execution condition specifying instruction defining an execution condition for the first instruction based on the flag information, and the first execution control means controls whether to permit or inhibit the execution of the first instruction on the basis of indication of the first instruction execution control information.

Also when the second instruction is the execution condition specifying instruction, therefore, various execution conditions for the first instruction can be set while fully utilizing the second instruction code by describing the execution condition for the first instruction in the second instruction code, and reduction of the branch penalty, reduction of the cost and reduction of power consumption can be attained beyond the first aspect.

In the third aspect of the data processor, the third execution condition judgment means outputs the fourth instruction execution control information indicating whether to permit or inhibit the execution of the fourth instruction on the basis of whether or not the flag information satisfies the fourth instruction execution condition when the third instruction is the execution condition specifying instruction defining the fourth instruction execution condition based on the flag information, and the fourth execution control means controls whether to permit or inhibit the execution of the fourth instruction on the basis of indication of the fourth instruction execution control information.

When the third instruction is the execution condition specifying instruction, therefore, various execution conditions for the fourth instruction can be set while fully utilizing the third instruction code by describing the execution condition for the fourth instruction in the third instruction code, whereby reduction of the branch penalty, reduction of the cost and reduction of power consumption can be attained beyond the first and second aspects.

In the fourth aspect of the data processor, the first execution control means outputs the third instruction execution control information indicating whether to permit or inhibit the execution of the third instruction to the third execution control means on the basis of whether or not the flag information satisfies the third instruction execution condition when the first instruction is the execution condition specifying instruction also defining an execution condition for the third instruction based on the flag information as well as the execution condition for the second instruction, and the third execution control means controls whether to permit or inhibit the execution of the third instruction on the basis of indication of the third instruction execution control information.

Consequently, the fourth aspect of the data processor can control execution and inhibition of two instructions (second and third instructions) by one execution condition specifying instruction (first instruction), whereby effective execution condition specification can be performed.

In the fifth aspect of the data processor, the second instruction execution condition and the third instruction execution condition are independently described in the first instruction code respectively, whereby the second and third instruction execution conditions can be inherently set.

In the sixth aspect of the data processor, the second instruction execution condition and the third instruction execution condition are partially duplicated in the first instruction code when the first instruction is the execution condition specifying instruction, whereby the second and third instruction execution conditions can be inherently set while effectively utilizing the first instruction code.

In the seventh aspect of the data processor, the first execution condition judgment means outputs the second instruction execution control information indicating permission of the execution of the second instruction while outputting the third instruction execution control information indicating inhibition of the execution of the third instruction when satisfying the common execution condition and outputs the second instruction execution control information indicating inhibition of the execution of the second instruction while outputting the third instruction execution control information indicating permission of the execution of the third instruction when not satisfying the common execution condition, whereby a series of processing accompanied by a condition branch instruction can be batch-performed on the basis of the determination of the first execution condition judgment means.

In the eighth aspect of the data processor, the first flag information includes the first and second information and the execution condition specifying instruction is the instruction specifying the execution condition consisting of the composite condition decided by the first flag information and the second flag information, whereby an execution condition consisting of a complex composite condition can be specified.

The flag information storage means in the ninth aspect of the data processor according to the present invention stores the first flag information as the second flag information and updates the first flag information on the basis of the flag update relevant information, whereby updating of the second flag information is also performed at the same time when updating of the first flag information is performed.

Therefore, the first and second flag information can be updated by simply supplying the flag update relevant information to the flag information storage means without specifying the flag information to be updated in the flag update instruction.

Consequently, the code size of the instruction code for the flag update instruction can be reduced since a specify area for the flag information to be updated can be omitted in relation to the first and second flag information, whereby the first and second flag information can be updated with a flag update instruction having a small code size.

In the tenth aspect of the data processor, the first flag information includes the information of the plurality of flags and the second flag information includes the information of the plurality of flags, whereby the information of the plurality of flags in the first and second flag information can be batch-updated respectively by simply supplying single flag update relevant information to the flag information storage means.

In the eleventh aspect of the data processor, the flag information storage means stores the second flag information as the third flag information when the second flag information is updated, whereby the first to third flag information can be updated by simply supplying the flag update relevant information to the flag information storage means without specifying the flag information to be updated in the flag update instruction.

Consequently, the code size of the instruction code for the flag update instruction can be reduced since the specify area for the flag information to be updated can be omitted in relation to the first to third flag information, whereby the first to third flag information can be updated with a flag update instruction having a small code size.

In the twelfth aspect of the data processor, the flag information includes the first and second flag information and information of a flag specify flag specifying the flag information to be updated in the first and second flag information, and the flag information storage means updates one of the first and second flag informations indicated by the update flag information on the basis of the flag update relevant information.

Therefore, the flag information to be updated can be intentionally decided by properly setting the updated flag information without providing information specifying the flag information to be updated in the flag update instruction.

In the thirteenth aspect of the data processor, the first flag information includes the information of the plurality of flags and the second flag information includes the information of the plurality of flags, whereby the information of the plurality of flags indicated by the updated flag information can be updated in the first and second flag information by simply supplying single flag update relevant information to the flag information storage means.

In the fourteenth aspect of the data processor, the flag control execution instruction includes the instruction whose execution content is decided on the basis of only the second flag information, and execution control of an instruction based on a specific condition employing only the second flag information is enabled.

In the fifteenth aspect of the data processor, the flag control execution instruction includes the instruction whose execution content is decided on the basis of the composite condition combining the first flag information and the second flag information, whereby execution control of an instruction based on a complex composite condition is enabled.

In the sixteenth aspect of the data processor, the flag control execution instruction includes the instruction writing the first value in the prescribed storage unit when the composite condition is satisfied and writing the second value when not satisfied on the basis of the composite condition decided by the first and second flag information, whereby a sophisticated write instruction can be executed.

In the seventeenth aspect of the data processor, the first flag information includes the information of the plurality of flags and the second flag information includes the information of the plurality of flags, whereby a more sophisticated write instruction further complexing the aforementioned composite condition can be executed.

In the eighteenth aspect of the data processor, the prescribed storage unit includes at least one of the register, the accumulator and the memory, whereby a sophisticated write instruction for the accumulator or the memory can be executed.

BRIEF DESCRIPTION OF THE DRAWINGS

FIG. 28 is an explanatory diagram showing an instruction code in the case of executing an EXEF0T instruction and an MV2W instruction in parallel in the data processor according to the embodiment 1 of the present invention.

FIG. 29 is an explanatory diagram showing an instruction code in the case of executing an EXETAT instruction and an ST instruction in parallel in the data processor according to the embodiment 1 of the present invention.

FIG. 30 is an explanatory diagram showing an exemplary program of the data processor according to the embodiment 1 of the present invention.

FIG. 31 is an explanatory diagram showing the contents of an instruction memory of a repeat block in a loop in the exemplary program of the data processor according to the embodiment 1 of the present invention.

FIG. 32 is an explanatory diagram showing allocation of data on an integrated data memory in the exemplary program of the data processor according to the embodiment 1 of the present invention.

BEST MODES FOR CARRYING OUT THE INVENTION

<Embodiment 1.>
<Basic Structure>

Now, a data processor of an embodiment 1 of the present invention will be discussed. The data processor of this embodiment is a 16-bit processor and processes addresses and data of 16 bits.

Figure 1:
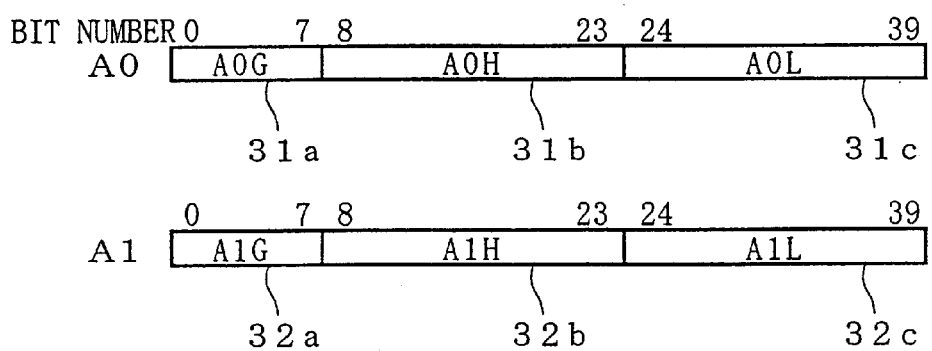
FIG. 1 is an explanatory diagram showing a register set of a data processor according to an embodiment 1 of the present invention.

FIG. 1 illustrates a register set of the data processor of this embodiment. The data processor adopts Big Endian on the order of bit or byte, and the most significant bit (MSB) corresponds to the bit 0.

Sixteen general-purpose registers R0 to R15 each store data or address value. The registers R0 to R14 are general-purpose registers and the register R13 is designated as a LINK register to store a return address in execution of sub-routine jump instruction. The register R15 is a stack pointer SP, and a stack pointer SPI for interrupt and a stack pointer SPU for user which are switched over to each other by a processor status word PSW as discussed later. Hereafter, the stack pointers SPI and SPU are generally termed a stack pointer SP.

Except specific cases, 4-bit register-designator field indicates the number for the register, which is an operand. The data processor of the present invention uses an instruction which performs an operation with a pair of registers, for example, registers R0 and R1. In this case, designation is made to an even-numbered register and as a register paired with this register, implicit designation is made to a register with an odd number obtained by incrementing the register number by one. Registers CR0 to CR3 and CR7 to CR11 are 16-bit control registers. The control registers, like the general-purpose registers, are designated by using 4-bit number. The register CR0 is intended to store the processor status word (PSW), consisting of bits indicating an operation mode of the data processor and flags indicating an operation result.

Figure 2:
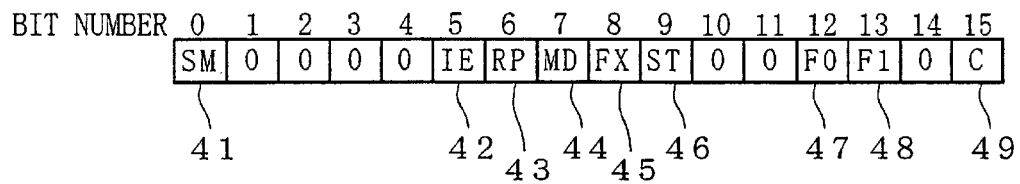
FIG. 2 is an explanatory diagram showing the structure of a processor status word of the data processor according to the embodiment 1 of the present invention.

FIG. 2 illustrates a format of the PSW in the register CR0. As shown in FIG. 2, the bit No. 1 of the PSW is an SM bit 41 indicating a stack mode. When the SM bit 41 is "0", indicating an interrupt mode, the stack pointer SPI is used as the register R15. When the SM bit 41 is "1", indicating a user mode, the stack pointer SPU is used as the register R15. The bit No. 5 of the PSW is an IE bit 42 indicating whether the interrupt is enabled or disabled. When the IE bit 42 is "0", the interrupt is masked (ignored if asserted) and when it is "1", the interrupt is serviced. This data processor implements a repeat function to achieve a zero-overhead loop processing. The bit No. 6 of the PSW is an RP bit 43 on repeat operation. The RP bit 43 of "0" indicates no repeat operation being executed and the RP bit 43 of "1" indicates a repeat operation being executed. Further, this data processor implements a modulo addressing function to access the circular buffer. The bit No. 7 of the PSW is an MD bit 44 indicating whether the modulo addressing is enabled or disabled. When the MD bit 44 is "0", the modulo addressing is disabled and when it is "1", the modulo addressing is enabled. The bit No. 8 of the PSW is an FX bit 45 specifying a format of data to be stored in an accumulator. When the FX bit 45 is "0", a multiplication result is stored into the accumulator in an integer format and when it is "1", the multiplication result is stored in a fixed-point format, being shifted right one bit position. The bit No. 9 of the PSW is an ST bit 46 specifying a saturation mode. When the ST bit 46 is "0", an operation result is stored in the accumulator in 40 bits and when it is "1", the operation result is stored in 32 bits, being limited. Assuming that hexadecimal representation follows "h'", when the operation result is larger than h'007fffffff, h'007fffffff is written into the accumulator and when it is smaller than h'ff80000000, h'ff80000000 is written into the accumulator. The bit No. 12 of the PSW is an execution control flag (F0 flag) 47, to which a comparison result after execution of comparison instruction and the like is set. The bit No. 13 of the PSW is an execution control flag (F1 flag) 48, to which the value in the F0 flag 47 is copied before the F0 flag 47 is updated in execution of comparison instruction and the like. The bit No. 15 of the PSW is a carry flag (C flag) 49, to which a carry in execution of add-subtract instruction is set.

The register CR2 of FIG. 1 is a program counter PC, indicating the address of an instruction being executed. The data processor of this embodiment in principle processes instructions of 32-bit fixed length, and the PC (or CR2) holds instruction word addresses in units of word of 32 bits.

The register CR1 is a backup processor status word (BPSW) for saving and holding the value of the processor status word PSW during execution if an exception or an interrupt is found. The register CR3 is a backup program counter (BPC) for saving and holding the value of the program counter PC. The registers CR7 to CR9 are registers for a repeat operation, allowing an user to read and write values so that an interrupt may be accepted during the repeat operation. The register CR7 is a repeat counter (RPT_C) for holding a count value indicating the repeat count. The register CR8 is a repeat start address (RPT_S) for holding the address of the first instruction in the block to be repeated. The register CR9 is a repeat end address (RPT_E) for holding the address of the last instruction in the block to be repeated.

The registers CR10 and CR11 are control registers for modulo addressing. The register CR10 holds a modulo start address (MOD_S) and the register CR11 holds a modulo end address (MOD_E). The registers CR10 and CR11 hold the first and the last data word addresses (16 bits), respectively. In the modulo addressing with increment, the lower address is designated as the modulo start address MOD_S and the higher address is designated as the modulo end address MOD_E. When a register value to be incremented coincides with the modulo end address MOD_E, the address value of the modulo start address MOD_S is written back to the register as an increment result.

FIG. 1 also shows 40-bit accumulators A0 and A1. The accumulators A0 and A1 consist of fields A0H and A1H holding the high-order 16 bits of the multiply-add operation result, fields A0L and A1L holding the low-order 16 bits of the multiply-add operation result and 8-bit guard bits A0G and A1G holding overflow bits of the multiply-add operation result, respectively.

Figure 3:
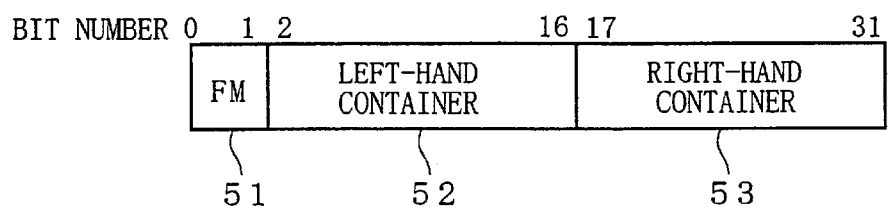
FIG. 3 is an explanatory diagram showing the instruction format of the data processor according to the embodiment 1 of the present invention.

The data processor of this embodiment processes 2-way VLIW (Very Long Instruction Word) instruction sets. FIG. 3 illustrates a format of instruction used in the data processor of this embodiment. The basic instruction length is fixed to 32 bits and the instruction is aligned in 32-bit boundary. A 32-bit instruction code consists of 2-bit format specification bit (FM bit) 51 indicating a format of the instruction, a 15-bit left-hand container 52 and a 15-bit right-hand container 53.

The containers 52 and 53 may each store a 15-bit short-format sub-instruction or may store together a 30-bit long-format sub-instruction. For simple discussion, hereafter, the short-format sub-instruction is referred to as a short instruction and the long-format sub-instruction is referred to as a long instruction.

The FM bit 51 specifies a format of instruction and an order of executions of two short instructions. When the FM bit 51 is "11", the combined containers 52 and 53 of 30 bits hold a long instruction, and otherwise the containers 52 and 53 each hold a short instruction. Further, if the containers 52 and 53 hold two short instructions, the FM bit 51 specifies an order of executions of the two instructions. When the FM bit 51 is "00", the two short instructions are executed in parallel. When "01", the short instruction stored in the left-hand container 52 is first executed and the short instruction stored in the right-hand container 53 is executed later. When "10", the short instruction stored in the right-hand container 53 is first executed and the short instruction stored in the left-hand container 52 is executed later. Thus, two short instructions to be sequentially executed can be also encoded in a 32-bit instruction, for higher efficiency of encoding.

Figure 4:
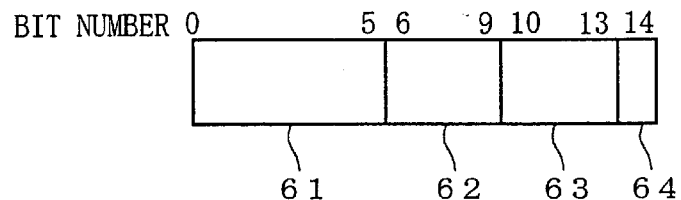
FIG. 4 is an explanatory diagram showing the instruction format of a two-operand instruction of a short format in the data processor according to the embodiment 1 of the present invention.
Figure 5:
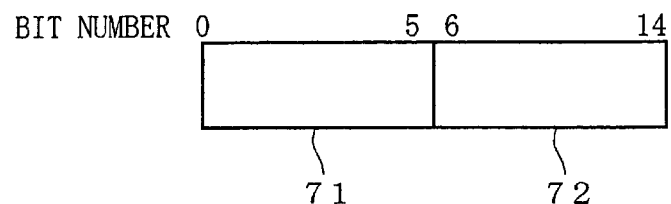
FIG. 5 is an explanatory diagram showing the instruction format of a branch instruction of a short format in the data processor according to the embodiment 1 of the present invention.
Figure 6:
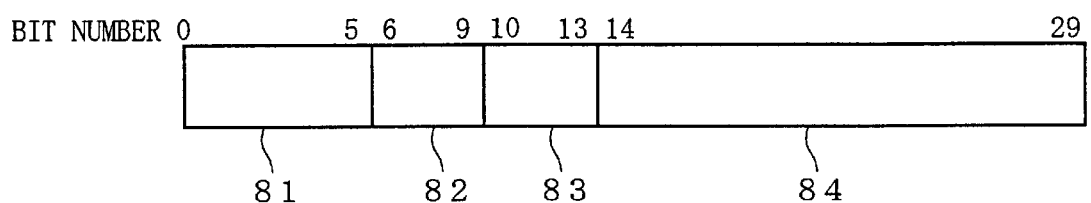
FIG. 6 is an explanatory diagram showing the instruction format of a three-operand instruction or a load/store instruction of a long format in the data processor according to the embodiment 1 of the present invention.
Figure 7:
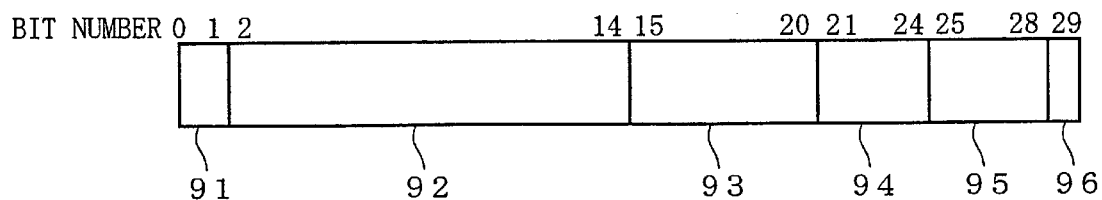
FIG. 7 is an explanatory diagram showing the instruction format of an instruction of long format having an operation code in a right-hand container in the data processor according to the embodiment 1 of the present invention.

FIGS. 4 to 7 illustrate typical instruction encodings. FIG. 4 illustrates instruction encoding of a 2-operand short instruction. Fields 61 and 64 are operation code fields. In some cases, the field 64 designates an accumulator number. Fields 62 and 63 designate the location to hold data to be referenced or updated as an operand by using a register number or an accumulator number. In some cases, the field 63 designates a 4-bit short immediate value. FIG. 5 illustrates instruction encoding of a short-format branch instruction, consisting of an operation code field 71 and 8-bit branch displacement field 72. The branch displacement is designated by an offset of 32-bit instruction word, like the PC value. FIG. 6 illustrates a format of 3-operand instruction with 16-bit displacement or immediate value, or load/store instruction, consisting of an operation code field 81, fields 82 and 83 for designating a register number and so on like the short format and an extended data field 84 for designating 16-bit displacement or immediate value. FIG. 7 illustrates a format of long-format instruction with an operation code in the right-hand container 53. A 2-bit field 91 indicates "01". Fields 93 and 96 are operation code fields and fields 94 and 95 each designate a register number or the like. A field 92 is a reserved field used for designating an operation code, a register number or the like as required.

Besides the above, there are some special encodings for instructions, such as NOP (No Operation) instruction whose entire 15 bits are designated as operation code and 1-operand instruction.

A sub-instruction processed in the data processor of this embodiment is a RISC-like instruction set. Only a load/store instruction accesses the memory data and an operation instruction performs an arithmetic operation on an operand held in the register/accumulator or using an immediate operand. There are five operand-data addressing modes: a register indirect mode, a register indirect mode with postincrement, a register indirect mode with postdecrement, a push mode and a register relative indirect mode, and their mnemonic-names are "@Rsrc", "@Rsrc+", "@Rsrc−", "@-SP", "@(disp16, Rsrc)", respectively. Rsrc refers to a register number used to designate a base address and disp16 refers to a 16-bit displacement value. An operand address is designated by byte address.

In the above modes, except the register relative indirect mode, the instruction format of FIG. 4 is used. The field 63 designates a base register number and the field 62 designates the number for a register to hold a value loaded from the memory or to be stored in the memory. In the register indirect mode, a value held in the designated base register is the operand address. In the register indirect mode with postincrement, a value held in the designated base register is the operand address, and the value is postincremented by the size (the number of bytes) of the operand and written back into the base register. In the register indirect mode with postdecrement, a value in the register designated as the base register is the operand address, and the value is postdecremented by the size (the number of bytes) of the operand and written back into the base register. The push mode is enabled only when a store instruction is executed and the base register is the register R15, and the stack pointer (SP) value is predecremented by the size (the number of bytes) of the operand to serve as the operand address and is written back to the SP.

In the register relative indirect mode, the instruction format of FIG. 6 is used. The field 83 designates a base register number and the field 82 designates the number for a register to hold a value loaded from the memory or to be stored in the memory. The field 84 specifies a displacement value for the location to hold the operand from the base address. In the register relative indirect mode, the 16-bit displacement value is added to the value held in the designated base register to serve as the operand address.

In the register indirect mode with postincrement and the register indirect mode with postdecrement, a modulo addressing mode is enabled by setting "1" to the MD bit 44 in the PSW.

For designating the jump-target address of a jump instruction, there are a register indirect mode for designating the jump target address by the register value and a PC-relative indirect mode for designating the jump target address by a branch displacement from the PC of the jump instruction. Further, as to the PC relative indirect there are two types of short-format addressing with 8-bit branch displacement and long-format addressing with 16-bit branch displacement. The data processor also processes a repeat instruction which achieves a loop without overhead.

Figure 8:
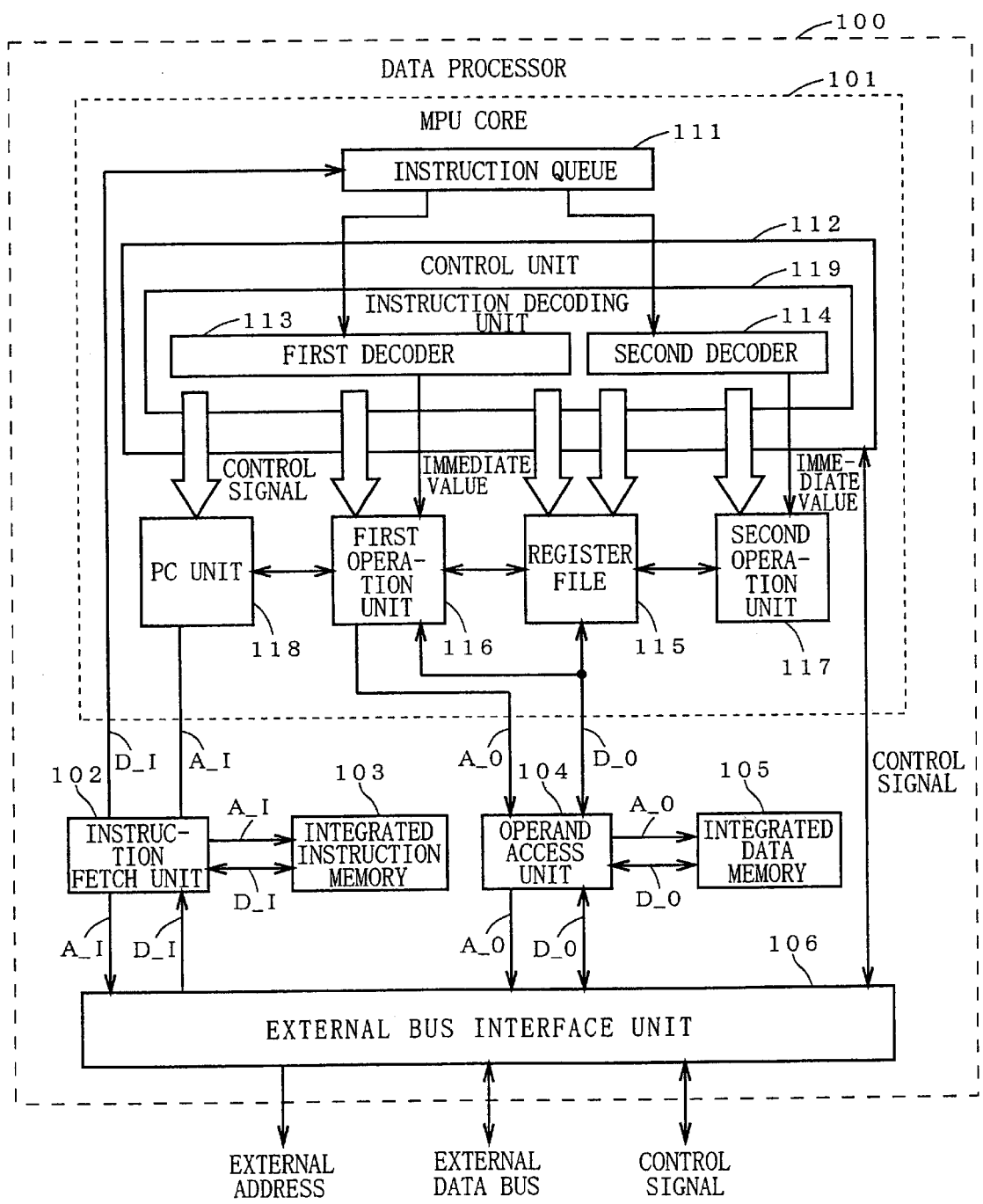
FIG. 8 is a block diagram showing the structure of the data processor according to the embodiment 1 of the present invention.

FIG. 8 is a block diagram showing a functional structure of a data processor 100 in accordance with the embodiment 1 of the present invention. The data processor 100 includes an MPU core 101, an instruction fetch unit 102 for accessing instruction data in response to a request from the MPU core 101, an integrated instruction memory 103, an operand access unit 104 for accessing operand data in response to a request from the MPU core 101, an integrated data memory 105, and an external bus interface unit 106 for arbitrating external memory-access requests from the instruction fetch unit 102 and the operand access unit 104 to make an access to an external memory of the data processor 100 or the like.

The MPU core 101 includes an instruction queue 111, a control unit 112, a register file 115, a first operation unit 116, a second operation unit 117 and a PC unit 118.

The instruction queue 111 holds two entries of 32-bit instruction buffers, a valid bit, an input/output pointer and so on, and is controlled in a FIFO (first-in first-out) order. The instruction queue 111 temporarily holds instruction data fetched by the instruction fetch unit 102 to transfer the instruction data to the control unit 112.

The control unit 112 makes all controls on the MPU core 101, such as control of the above instruction queue 111, pipeline control, execution of instructions and interface between the internal elements, such as the instruction fetch unit 102 and operand access unit 104, and the external elements. The control unit 112 includes an instruction decoding unit 119 for decoding instruction codes transferred from the instruction queue 111, which includes two decoders. A first decoder 113 decodes instructions to be executed in the first operation unit 116, and a second decoder 114 decodes instructions to be executed in the second operation unit 117. In the first cycle of decoding of a 32-bit instruction, the first decoder 113 analyzes an instruction code in the left-hand container 52 (FIG. 3), and the second decoder 114 analyzes an instruction code in the right-hand container 53. Accordingly, the instruction to be first executed must be located correspondingly to the arithmetic unit which executes it.

The data located in the FM bits 51 and in the bit 0 and the bit 1 of the left-hand container 52 are analyzed by both the first and second decoders 113 and 114. The data in the right-hand container 53 are transferred to the first decoder 113 to extract the extended data, but are not analyzed therein. When two short instructions are sequentially executed, the instruction to be executed later is decoded by a non-illustrated predecoder during decoding of the instruction to be first executed, to judge which decoder, among the two, should decode the instruction to be executed later. If the instruction to be executed later can be decoded by either of the first and second decoders 113 and 114, the instruction should be decoded by the decoder 113. After decoding of the instruction to be first executed, the code of the instruction to be executed later is given to the selected decoder and analyzed therein.

The register file 115 holds values of the registers R0 to R15 (FIG. 1) and is connected to the first operation unit 116, the second operation unit 117, the PC unit 118 and the operand access unit 104 with a plurality of buses.

Figure 9:
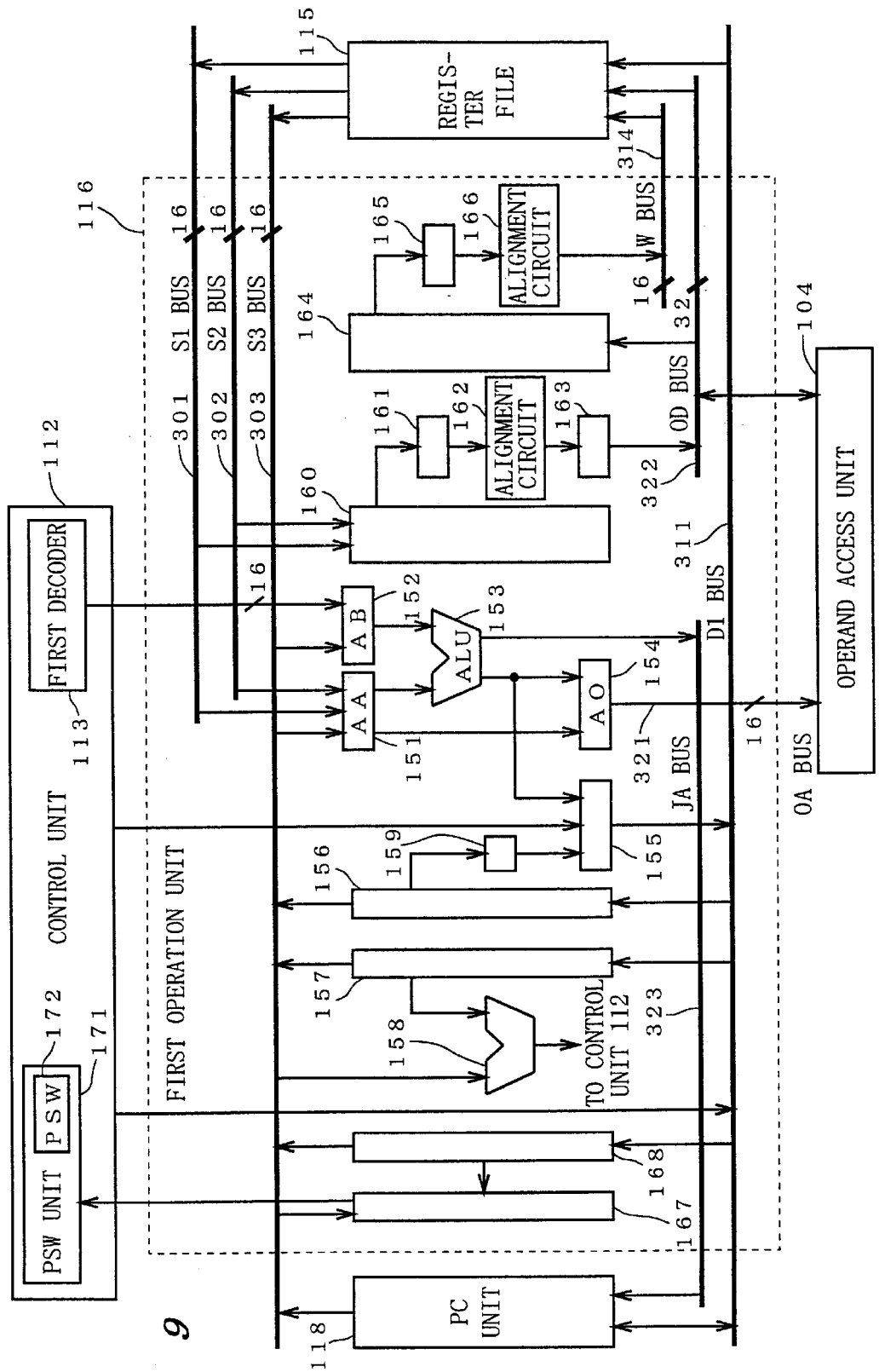
FIG. 9 is a block diagram showing the details of a first operation unit of the data processor according to the embodiment 1 of the present invention.

FIG. 9 is a block diagram showing a detailed structure of the first operation unit 116. The first operation unit 116 is connected to the register file 115 with an S1 bus 301, an S2 bus 302 and an S3 bus 303. Data read from the register file 115 are transferred over the three buses 301 to 303 to arithmetic devices and the like, serving as operands or to be stored. The S1 bus 301 is connected only to even-numbered registers and the S2 bus 302 is connected only to odd-numbered registers. The S1 bus 301 and the S2 bus 302 can transfer 2-word data from a pair of registers in parallel. The S3 bus 303 is connected to all the registers.

The first operation unit 116 is connected to the register file 115 with a D1 bus 311 and a W bus 314. Operation results and transferred data are transferred to the register file 115 over the D1 bus 311 and loaded byte data are transferred to the register file 115 over the W bus 314. Both the D1 bus 311 and the W bus 314 are connected to all the registers. Further, the register file 115 is connected to the operand access unit 104 with a 32-bit OD bus 322, allowing parallel transfer of 1-word data or 2-word data from a pair of registers. The high-order/low-order 16 bits on the OD bus 322 are connected to all the registers of the register file 115 so as to be written into any of the registers.

An AA latch 151 and an AB latch 152 are input latches for an ALU 153. The AA latch 151 receives a register value read out and transferred over the S1 bus 301, the S2 bus 302 or the S3 bus 303. The AA latch 151 also has a zero-clear function. The AB latch 152 receives a register value read out and transferred over the S3 bus 303 or a 16-bit immediate value generated by decoding in the first decoder 113, and also has a zero-clear function.

The ALU 153 mainly performs transfer, comparison, arithmetic and logic operation, calculation/transfer of operand addresses, increment/decrement of operand address values, calculation/transfer of jump target addresses and the like. Results of operation and address modification are transferred through a selector 155 over the D1 bus 311 and written back to the register designated by the instruction in the register file 115. To execute a condition set instruction which writes "1" in the register when the specified condition is satisfied and writes "0" when not satisfied, the selector 155 has a function to fill the least significant bit of the operation result with data from the control unit 112. In this case, the operation result is controlled to be zero. An A0 latch 154 holds operand addresses, and specifically, it selectively holds the address calculation result from the ALU 153 or the base address value from the AA latch 151 and outputs the held data to the operand access unit 104 over an OA bus 321. When the ALU 153 calculates the jump target address or the repeat end address, the output from the ALU 153 is transferred to the PC unit 118 over a JA bus 323.

MOD_S 156 and MOD_E 157 are control registers corresponding to the registers CR10 and CR11 of FIG. 1 respectively. A comparator 158 compares the value of MOD_E 157 and the value of the base address on the S3 bus 303 and transmits the comparison result to the control unit 112. When modulo addressing is enabled in the post register indirect mode with postincrement/postdecrement and the comparison result of the comparator 158 indicates coincidence, the value of MOD_S 156 held in a latch 159 is written back into the register in the register file 115 designated as the base address register through the selector 155 over the D1 bus 311.

A stored-data (SD) register 160 includes two 16-bit registers and temporarily holds store data outputted to both or either of the S1 bus 301 and the S2 bus 302. Data held in the SD register 160 are transferred to an alignment circuit 162 through a latch 161. The alignment circuit 162 aligns the stored data in 32-bit boundary according to the operand address and outputs the stored data to the operand access unit 104 through a latch 163 over an OD bus 322.

The byte data loaded by the operand access unit 104 are inputted to a 16-bit load-data (LD) register 164 over the OD bus 322. The value held in the LD register 164 is transferred to an alignment circuit 166 through a latch 165. The alignment circuit 166 performs alignment in byte and zero-/sign-extension on the byte data. The aligned and extended data are transferred over the W bus 314 and written into the designated register in the register file 115. When 1-word (16-bit) load or 2-word (32-bit) load is made, the loaded value is directly written into the register file 115, not through the LD register 164.

A PSW unit 171 in the control unit 112 includes a PSW latch 172 for holding the value of the register CR0 of FIG. 1, a PSW update circuit and the like, and updates the value held in the PSW latch 172 with the operation result or by executing the instruction. Of the data on the S3 bus 303, only required bits (assigned bits) are transferred to the PSW latch 172 through a TPSW latch 167. When the value is read from the PSW latch 172, the value is given to the D1 bus 311 from the PSW unit 171 and written into the register file 115. A BPSW latch 168 is a register which corresponds to the register CR1 of FIG. 1. When an exception is serviced, the value of the PSW on the D1 bus 311 is written into the BPSW latch 168. The value held in the BPSW latch 168 is read out into the S3 bus 303 and transferred to the register file and the like as required. The bits not assigned are forcefully given "0" and then outputted to the S3 bus 303. On return from the exception, only the required bits (assigned bits) of the value held in the BPSW latch 168 are transferred to the PSW latch 172 directly through the TPSW latch 167.

Figure 10:
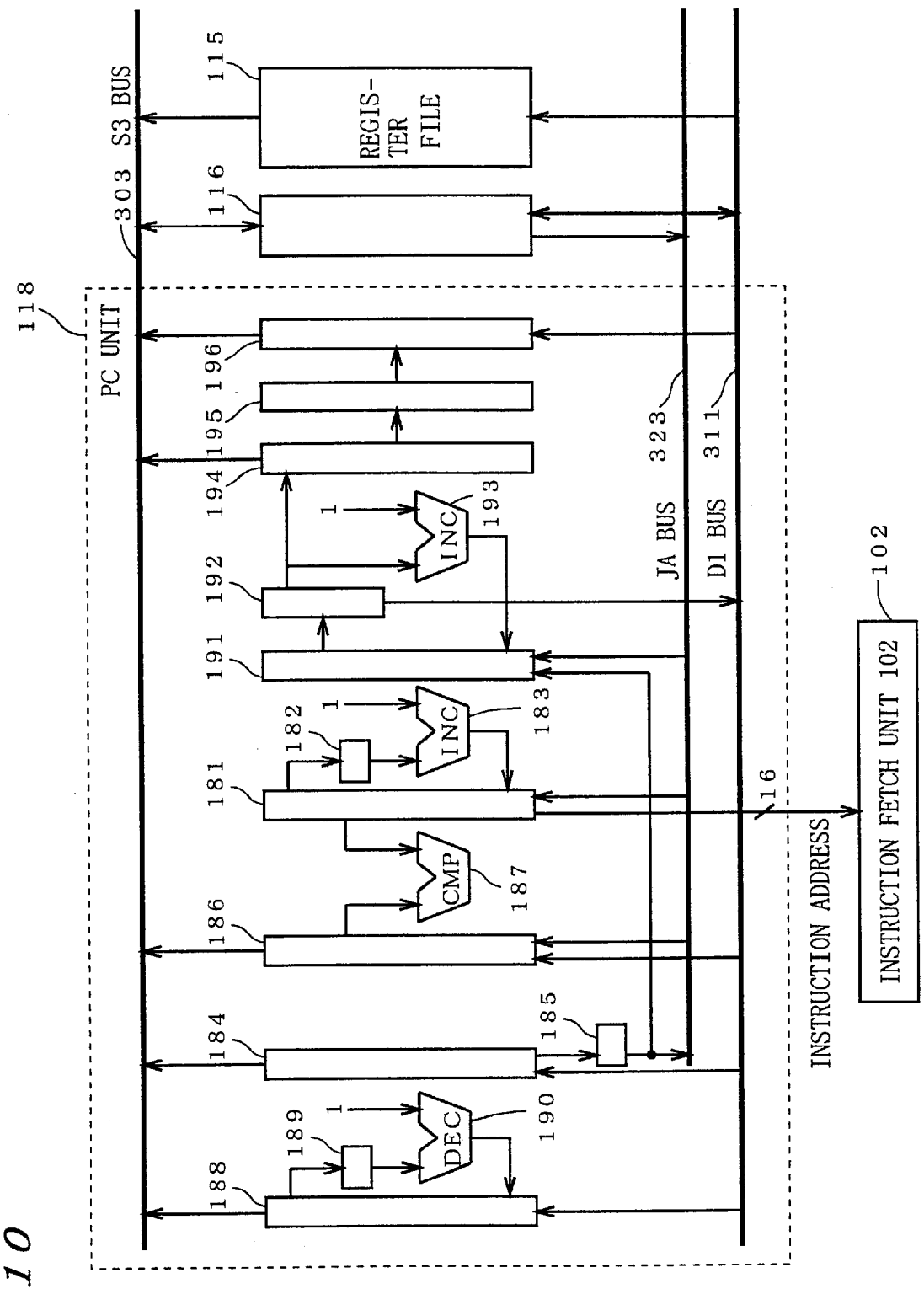
FIG. 10 is a block diagram showing the details of a PC unit of the data processor according to the embodiment 1 of the present invention.

FIG. 10 is a block diagram showing a detailed structure of a program counter (PC) unit 118. An instruction address (IA) register 181 holds the address of the next instruction to be fetched and outputs the address to the instruction fetch unit 102. When a subsequent instruction is to be fetched, the address value transferred from the IA register 181 through a latch 182 is incremented by one in an incrementor 183 and then written back into the IA register 181. If a jump or repeat instruction changes the sequence, the IA register 181 receives the jump target address or the repeat block start address transferred over the JA bus 323.

An RPT_S register 184, an RPT_E register 186 and an RPT_C register 188 are repeat control registers and correspond to the control registers CR8, CR9 and CR7 of FIG. 1, respectively. The RPT_E register 186 holds the address of the last instruction in the block to be repeated. The last address is calculated by the first operation unit 116 during execution of the repeat instruction and given to the RPT_E register 186 over the JA bus 323. A comparator 187 compares the value of an end address in the block to be repeated which is held in the RPT_E register 186 with the value of a fetch address which is held in the IA register 181. If the value of a repeat count which is held in the RPT_C register 188 is not "1" during execution of the repeat instruction and the two addresses coincide with each other, the value of a start address in the block to be repeated which is held in the RPT_S register 184 is transferred to the IA register 181 through a latch 185 A over the JA bus 323. Every time the last instruction of the block to be repeated is executed, the value held in the RPT_C register 188 is decremented by one in a decrementor 190 through a latch 189. If the decremented value is "0", the RP bit 43 of the PSW is cleared and the execution of the repeat instruction is terminated. The RPT_S register 184, the RPT_E register 186 and the RPT_C latch 188 each have an input port connected to the D1 bus 311 and an output port connected to the S3 bus 303, and initialization caused by execution of the repeat instruction, and saving and returning operations are performed as required.

An execution-stage PC (EPC) 194 holds the PC value of the instruction being executed, and a next-instruction PC (NPC) 191 holds the PC value of the next instruction. The NPC 191 receives the jump target address value on the JA bus 323 if a jump occurs during execution, and receives the first address in the block to be repeated from the latch 185 if a branch occurs during repeat operation. In other cases, the value of the NPC 191 is transferred through a latch 192 to an incrementor 193 which increments it and then written back into the NPC 191. When a subroutine jump instruction is executed, the value held in the latch 192 is given to the D1 bus 311 as a return address and then written back into the register R13 designated as a link register in the register file 115. When the next instruction comes into execution, the value held in the latch 192 is transferred to the EPC 194. To make a reference to the PC value of the instruction being executed, the value held in the EPC 194 is transferred to the first operation unit 116 over the S3 bus 303. A BPC 196 corresponds to the register CR3 in the register set of FIG. 1. When an exception, interrupt or the like is found, the value held in the EPC 194 is transferred to the BPC 196 through a latch 195. The BPC 196 has an input port connected to the D1 bus 311 and an output port connected to the S3 bus 303, and performs saving and returning as required.

Figure 11:
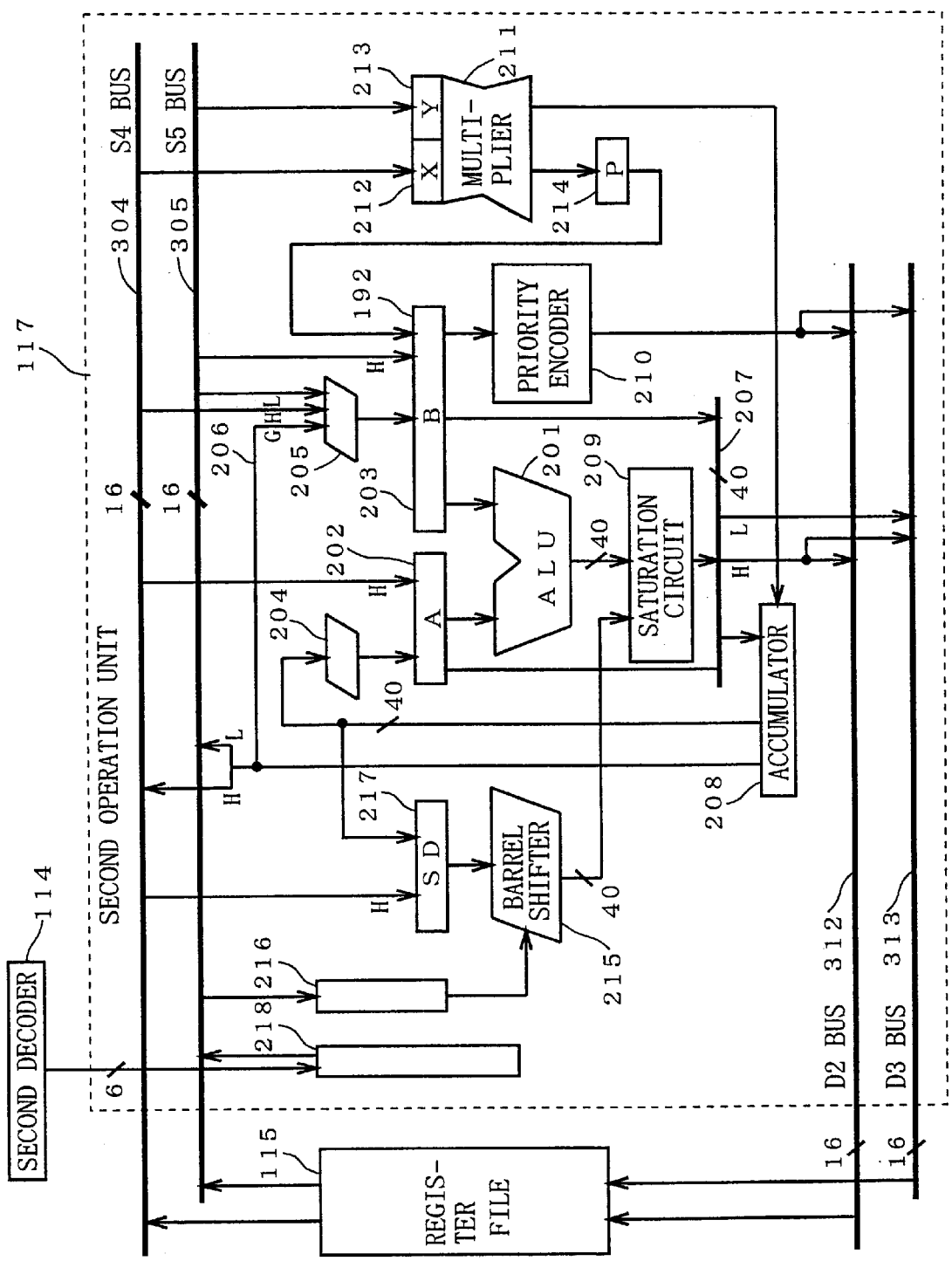
FIG. 11 is a detailed block diagram of a second operation unit of the data processor according to the embodiment 1 of the present invention.

FIG. 11 is a block diagram showing a detailed structure of the second operation unit 117. The second operation unit 117 is connected to the register file 115 with an S4 bus 304 and an S5 bus 305, and reads data from the register file 115 over the two buses 304 and 305. The S4 bus 304 and the S5 bus 305 can transfer 2-word data from a pair of registers in parallel. The second operation unit 117 is connected to the register file 115 also with a D2 bus 312 and a D3 bus 313, and writes data into the registers in the register file 115 over the two buses 312 and 313. The D2 bus 312 is connected only to the even-numbered registers, and the D3 bus 313 is connected only to the odd-numbered registers. The D2 bus 312 and the D3 bus 313 can transfer 2-word data from a pair of registers in parallel.

An accumulator 208 performs a combined function of the two 40-bit accumulators A0 and A1 of FIG. 1.

201 is a 40-bit ALU 201 including an 8-bit adder (ranging from the bit No. 0 to the bit No. 7) for addition of the guard bit of the accumulator, a 16-bit arithmetic and logic unit (ranging from the bit No. 8 to the bit No. 23) and a 16-bit adder (ranging from the bit No. 24 to the bit No. 39) for addition of the low-order 16 bits of the accumulator, for performing addition and subtraction of up to 40 bits and a logic operation of 16 bits.

An A latch 202 and a B latch 203 are 40-bit input latches for the ALU 201.

The A latch 202 receives the register value from the S4 bus 304 into the location ranging from the bit No. 8 to the bit No. 23, or receives a value from the accumulator 208 not changed or arithmetically shifted right by 16 bits through a shifter 204. A shifter 205 receives the value from the accumulator 208 over an interconnection line 206 (the guard bit of 8 bits), the S4 bus 304 (the high-order 16 bits) and the S5 bus 305 (the low-order 16 bits), or receives the register value of 16 bits or 32 bits right aligned over only the S5 bus 305 or both the S4 bus 304 and the S5 bus 305 and sign-extends it into 40 bits. The shifter 205 arithmetically shifts the received value by any shift count in a range of 3 bits left to 2 bits right and outputs the shifted data. The B latch 203 receives the data on the S5 bus 305 at the location ranging from the bit No. 8 to the bit No. 23, or an output from a multiplier or the shifter 205. The A latch 202 and the B latch 203 each have a function to clear the data therein to zero or to set the data at a constant value.

An output from the ALU 201 is given to a saturation circuit 209. The saturation circuit 209 has a function to perform clipping of a value into maximum or minimum value in 16-bit or 32-bit representation with reference to the guard bit in order to limit the high-positioned value to 16 bits or combine the high-positioned value and the low-positioned value into 32 bits, and naturally can output the value without clipping. An output from the saturation circuit 209 is connected to an interconnection line 207.

When a destination operand designates the accumulator 208, the value on the interconnection line 207 is written into the accumulator 208. When the destination operand designates a register, the value on the interconnection line 207 is written into the register file 115 over the D2 bus 312 and D3 bus 313. In the case of 1-word transfer, the value on the interconnection line 207 is outputted to the D2 bus 312 when the destination register is even-numbered and outputted to the D3 bus 313 when odd-numbered. In the case of 2-word transfer, the high-order 16-bit data are outputted to the D2 bus 312 and the low-order 16-bit data are outputted to the D3 bus 313. To execute a transfer instruction, calculation of absolute values and a maximum- or minimum-value setting instruction, outputs of the A latch 202 and the B latch 203 are connected to the interconnection line 207, allowing the values from the A latch 202 and the B latch 203 to be transferred to the accumulator 208 and the register file 115.

A priority encoder 210 receives the value from the B latch 203, and generates the shift count value required to normalize the input data as fixed point format, and writes back the shift count value into the register file 115 over the D2 bus 312 or the D3 bus 313.

An X latch 212 and a Y latch 213 are input registers in a multiplier, and receive 16-bit values on the S4 bus 304 and the S5 bus 305, respectively, and perform zero-extension or sign-extension of the 16-bit values into 17 bits. The multiplier 211 is a 17- by 17-bit multiplier which multiplies a value stored in the X latch 212 by a value stored in the Y latch 213. When a multiply-add instruction or a multiply-subtract instruction is executed, the multiplication result is given to a P latch 214 and then transferred to the B latch 203. When the destination operand in the multiplication instruction designates the accumulator 208, the multiplication result is written into the accumulator 208.

A barrel shifter 215 can perform an arithmetic/logic shift on 40-bit or 16-bit data by up to 16 bits left and right. The value held in the accumulator 208 or the register value transferred over the S4 bus 304 is given to a shift data (SD) latch 217 as data to be shifted. The immediate value or the register value transferred over the S5 bus 305 is given to a shift count (SC) latch 216 as a shift count. The barrel shifter 215 performs shifting of the data held in the SD latch 217 by the shift count held in the SC latch 216 according to the operation code. The shifted result is outputted to the saturation circuit 209, subjected saturation arithmetic, like the operation result from the ALU, as required, and outputted to the interconnection line 207. The value on the interconnection line 207 is written back into the accumulator 208 or the register file 115 over the D2 bus 312 and the D3 bus 313.

An immediate-value latch 218 extends a 6-bit immediate value generated by the second decoder 114 into a 16-bit value and holds the same, and transfers the same to the arithmetic device over the S5 bus 305. A bit mask for execution of a bit handling instruction is generated therein.

Figure 12:
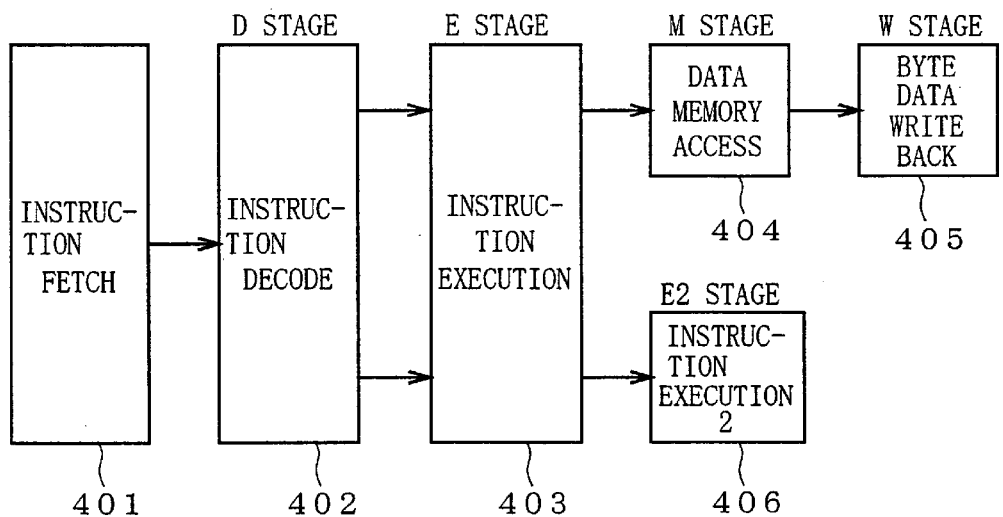
FIG. 12 is a model diagram showing pipeline processing of the data processor according to the embodiment 1 of the present invention.

Next, a pipeline processing in the data processor of this embodiment will be discussed. FIG. 12 illustrates the pipeline processing of the data processor in accordance with the embodiment 1. The data processor of the embodiment 1 performs 5-stage pipeline processing: an instruction-fetch (IF) stage 401 for fetching instruction data; an instruction-decode (D) stage 402 for decoding instructions; an instruction-execution stage (E) 403 for executing operations; a memory-access (M) stage 404 for accessing a data memory, and a write-back (W) stage 405 for writing byte operands loaded from the memory into a register, and writing of the operation result obtained in the E stage 403 is completed in the E stage 403 and writing of 1-word (2-byte) or 2-word (4-byte) loaded data into the register is completed in the M stage 404. To perform multiply-add/multiply-subtract operations, further 2 stages of pipeline processing including multiplication and addition are needed to execute instructions. The latter-stage processing is referred to as an instruction-execution 2 (E2) stage 406. In execution of consecutive multiply-add/multiply-subtract operations, one operation can be performed in one clock-cycle.

In the IF stage 401, mainly, a fetch of instructions, management of the instruction queue 111 and repeat control are performed. The IF stage 401 controls the operations of the instruction fetch unit 102, the integrated instruction memory 103, the external bus interface unit 106, the instruction queue 111, the IA register 181, the latch 182, the incrementor 183 and the comparator 187 in the PC unit 118, and parts of the control unit 113 to achieve an IF stage stage-control, an instruction fetch control and a control of the PC unit 118. The IF stage 401 is initialized by a jump at the E stage 403.

A fetch address is held in the IA register 181. If a jump occurs in the E stage 403, the IA register 181 receives the jump target address over the JA bus 323 and performs initialization. To sequentially fetch the instruction data, the incrementor 183 increments the address. During execution of a repeat instruction, if the comparator 187 detects coincidence between the value held in the IA register 181 and the value held in the RPT_E register 186 and the value held in the RPT_C register 188 is not "1", the sequence is controlled to change over. In this case, the value held in the RPT_S register 184 is transferred to the IA register 181 through the latch 185 over the JA bus 323.

The value held in the IA register 181 is transferred to the instruction fetch unit 102 which in turn fetches the instruction data. If the corresponding instruction data are found in the integrated instruction memory 103, the instruction code is read from the integrated instruction memory 103. In this case, fetch of 32-bit instruction is completed in one clock-cycle. If the corresponding instruction data are not found in the integrated instruction memory 103, an instruction-fetch request is given to the external bus interface unit 106. The external bus interface unit 106 arbitrates between the instruction-fetch request and a request from the operand access unit 104, and fetches the instruction data from an external memory when fetching of instruction is enabled and transfers the same to the instruction fetch unit 102. The external bus interface unit 106 can access the external memory in two clock cycles at the minimum. The instruction fetch unit 102 transfers the received instruction to the instruction queue 111. The instruction queue 111 holds a queue of two entries and outputs the instruction code received under FIFO control to the instruction decoding unit 119.

In the D stage 402, the instruction decoding unit 119 decodes an operation code and generates a group of control signals for controlling the first operation unit 116, the second operation unit 117 and the PC unit 118 to execute instructions. The D stage 402 is initialized by a jump at the E stage 403. If the instruction code transferred from the instruction queue 111 is invalid, the D stage 402 is idle and waits for fetching a valid instruction code. When the E stage 403 can not start the next operation, the D stage 402 invalidates the control signal to be transferred to the arithmetic unit and the like and waits for completion of the preceding operation in the E stage 403. Such a condition occurs, for example, when the instruction being executed in the E stage 403 is one for performing a memory access and the preceding memory access in the M stage 404 is not completed.

Figure 13:
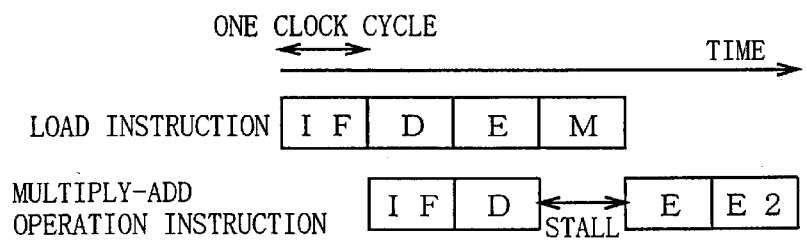
FIG. 13 is an explanatory diagram showing the state of the pipeline when causing load operand conflict in the data processor according to the embodiment 1 of the present invention.
Figure 14:
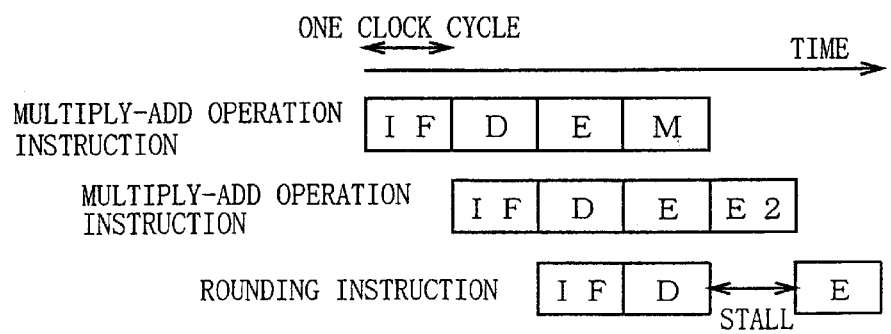
FIG. 14 is an explanatory diagram showing the state of the pipeline when causing arithmetic hardware conflict in the data processor according to the embodiment 1 of the present invention.

The D stage 402 also performs division of two instructions to be sequentially executed and sequence control of instructions to be executed in two cycles. Further, the D stage 402 performs checking of a conflict of load operands using a scoreboard register (not shown) and, a conflict of operations by arithmetic devices in the second operation unit 117 and the like. When any of these conflicts is detected, the control signal is not permitted to output until the conflict is resolved. FIG. 13 illustrates an example of load operand conflict. If a 1-word or 2-word load instruction is executed and immediately after the load instruction exists a multiply-add operation instruction which refers to the operand loaded by the load instruction, execution of the multiply-add instruction is not permitted to start until the loading of the operand into the register is completed. In this case, 1-clock-cycle stall occurs even if the memory access is completed in one clock-cycle. In a case of loading of byte data, further 1-clock-cycle stall occurs since writing of the byte data into the register file is completed in the W stage. FIG. 14 illustrates an example of arithmetic hardware conflict. If a rounding instruction uses an adder is found immediately after execution of multiply-add instruction, execution of the rounding instruction is not permitted to start until the execution of the preceding multiply-add instruction is completed. In this case, a 1-clock-cycle stall occurs. In a case of consecutive multiply-add instructions, no stall occurs.

The first decoder 113 mainly generates execution control signals for controlling the first operation unit 116, the PC unit 118 except its elements controlled by the IF stage 401, reading of data from the register file 115 to the S1 bus 301, the S2 bus 302 and the S3 bus 303 and writing of data into the register file 115 from the D1 bus 311. The first decoder 113 also generates instruction-dependent control signals to be used in the M stage 404 and W stage 405, and the control signals are transferred according to the flow of the pipeline processing. The second decoder 114 mainly generates execution control signals for controlling the execution in the second operation unit 117, and reading data out from the register file 115 into the S4 bus 304 and the S5 bus 305 and writing data into the register file 115 from the D2 bus 312 and the D3 bus 313.

The E stage 403 achieves almost all executions of the instructions, except memory access and addition of the multiply-add/multiply-subtract instructions, such as an arithmetic operation, comparison, data transfer between registers including control registers, calculation of operand address of load/store instructions, calculation of the jump target address of the jump instruction, jump operation, EIT (Exception, Interrupt, Trap) detection and jump to a vector table of the EIT.

With interrupts enabled, an interrupt is always detected at the end of a 32-bit instruction. When two short instructions are sequentially executed in a 32-bit instruction, no interrupt is serviced between the two short instructions.

When the instruction being executed in the E stage 403 is one for performing an operand access and the memory access is not completed in the M stage 404, the execution in the E stage 403 must stall, not to be completed. The control unit 112 performs this stage control.

In the E stage 403, the first operation unit 116 performs arithmetic and logic operation, comparison and data transfer. The ALU 153 calculates an address of a memory operand which also controls modulo addressing and a branch target address. The register value designated as an operand is given to the S1 bus 301, S2 bus 302 and S3 bus 303, arithmetic operation of the register value and a separately-received extended data such as an immediate value and a displacement is performed in the ALU 153, and the operation result is written back to the register file 115 over the D1 bus 311. When the load/store instruction is executed, the operation result is transferred to the operand access unit 104 through the AO latch 154 over the OA bus 321. When the jump instruction is executed, the jump target address is transferred to the PC unit 118 over the JA bus 323. The data stored in the register file 115 is transferred over the S1 bus 301 and the S2 bus 302, held in the SD register 160 and the latch 161 and subjected to aligning in the alignment circuit 166. The PC unit 118 manages the PC value of the instruction being executed and generates an address of the next instruction. Data transfer among the first operation unit 116, the control registers (except the accumulator) in the PC unit 118 and the register file 115 occurs over the S3 bus 303 and the D1 bus 311.

In the E stage 403, the second operation unit 117 performs all the operations, except addition of the multiply-add operation, such as arithmetic and logic operation, comparison, transfer and shift. Operand values are transferred from the register file 115, the immediate-value register 218, the accumulator 208 and the like to respective arithmetic devices over the S4 bus 304, the S5 bus 305 and other exclusive paths for performing specified operations, and the operation results are written back to the accumulator 208, and the register file 115 over the D2 bus 312 and the D3 bus 313.

The E stage 403 also controls updating of a flag value in the PSW 172 by the operation results in the first and second operation units 116 and 117. Since the operation result is reliably obtained late in the E stage 403, however, actual updating of the value in the PSW 172 is performed in the next cycle. Another updating of the value in the PSW 172 by data transfer is completed in the corresponding cycle.

The execution control signal for controlling the addition and subtraction of the multiply-add/multiply-subtract operation generated by the second decoder 114 is held under control of the E stage 403. Informations on the memory access and load register are transferred to the M stage 404. The control unit 112 also performs the control of the E stage 403.

In the M stage 404, operand memory access is performed with the address transferred from the first operation unit 116. When the operand is found in the integrated data memory 105 or an on-chip IO (not shown), the operand access unit 104 reads/writes data from/to the integrated data memory 105 or the on-chip IO in one clock-cycle. When the operand is not found in the integrated data memory 105 or the on-chip IO, the operand access unit 104 gives a data access request to the external bus interface unit 106. The external bus interface unit 106 performs data access to the external memory, and transfers the read data to the operand access unit 104 when data are loaded. The external bus interface unit 106 can perform access to the external memory in two clock cycles at the minimum. When data are loaded, the operand access unit 104 transfers the read data over the OD bus 322. When byte data are loaded, the data are written into the LD register 164 and when 1-word or 2-word data are loaded, the data are directly written into the register file 115. When data are stored, the data to be stored which are aligned in the alignment circuit 162 are transferred to the operand access unit 104 over the OD bus 322, and then written into the specified memory. The control unit 112 also performs the control of the M stage 404.

In the W stage 405, the load operand (byte data) held in the LD register 164 is given to the latch 165 to be held therein and aligned and zero- or sign-extended in the alignment circuit 166 and written into the register file 115 over the W bus 314.

In the E2 stage 406, the ALU 201 performs the addition and subtraction of the multiply-add/multiply-subtract operation and the operation result is written back to the accumulator 208.

The data processor of this embodiment generates a clock signal with non-redundant 2 phases of the same frequency as an input clock, which is used for internal control. An operation of each pipeline stage is completed in one internal clock cycle at the minimum. Detailed discussion on clock control will be omitted since it is not directly pertinent to this invention.

Now, execution of sub-instructions will be discussed. Execution of instructions for arithmetic operations such as addition and subtraction, logic operation and comparison, and instructions for transfer between registers is completed in three stages consisting of the IF stage 401, the D stage 402 and the E stage 403. Operations and data transfers are performed in the E stage 403.

The multiply-add/multiply-subtract instruction performs 2-clock-cycle operations, i.e., multiplication in the E stage 403 and addition and subtraction in the E2 stage 406, and therefore execution of the instruction is completed in four stages.

Execution of the byte-data load instruction is completed in five stages: the IF stage 401, the D stage 402, the E stage 403, the M stage 404 and the W stage 405. Execution of the 1-word/2-word load/store instruction is completed in four stages: the IF stage 401, the D stage 402, the E stage 403 and the M stage 404.

To access non-aligned data, two separate memory accesses are performed in the operand access unit 104 under control of the M stage 404.

An instruction to perform 2-cycle operation is executed by the first and second instruction decoders 113 and 114 in two cycles, and the execution control signal is outputted for each cycle. Thus, the operation is performed in two cycles.

As to a long instruction, one 32-bit instruction is formed by a single long instruction and execution of a 32-bit instruction is achieved through processing of this single long instruction. Two instructions to be executed in parallel are two short instructions, and the two executions are controlled in accordance with the speed of one that requires more cycles. For example, parallel executions of an instruction to perform 2-cycle operation and another instruction to perform 1-cycle operation are completed in two cycles. In the case of two short instructions of sequential executions, it comes to combination of respective sub-instructions and respective instructions are sequentially decoded and then executed in a decoding stage. For example, when two addition instructions are executed, each of which is completed in one cycle of the E stage 403, the D stage 402 and the E stage 403 each need one cycle for each instruction and in total two cycles. Decoding of the following instruction is performed in the D stage 402 parallelly with execution of the preceding instruction in the E stage 403.

<Flag>

Details of updating of flags and condition execution in the data processor which is the embodiment 1 of the present invention are now described.

First, updating of the flags in this data processor is first described in detail. This data processor comprises flags indicating three operation results of the F0 flag 47, the F1 flag 48 and the carry (C) flag 49 in the PSW, as shown in FIG. 2. While the C flag 49 changes by a general operation instruction such as an add-subtract instruction, the F0 flag 47 changes only by a limited instruction such as a comparison instruction since the same is referred to as an execution condition for the instruction. As to the F1 flag 48, it transfers the value of the F0 flag 47 before updating to the F1 flag 48 when updating the F0 flag 47.

In instructions updating the F0 flag 47, there are those updating the flag with comparison results such as a comparison instruction comparing the register value or the accumulator value with the register value, the accumulator value or the immediate value, a bit test instruction testing whether a specified bit in the register is "0" or "1", a bit field test instruction testing that specified bit fields in the register are all "0" or all "1", and the like. The flag also changes by an operation performing a complex operation including condition determination such as an instruction calculating the absolute value of the register value or the accumulator value, an instruction setting the maximum value/minimum value or the like. In updating of the F0 flag 47, the content of the F0 flag 47 before updating is copied into the F1 flag 48. The values of the F0 flag 47 and the F1 flag 48 remain unchanged through other instructions for loading, storage, transfer, arithmetic logic operation, shifting and the like.

It specifies the condition for setting the flag with an instruction setting the flag. In comparison instructions performing largeness/smallness determination of two 16-bit signed numbers held in the register, for example, there are two types of instructions of a CMPEQ instruction setting the F0 flag 47 when the two values match and a CMP instruction setting the F0 flag 47 when the first value is less than the second value.

Figure 15:
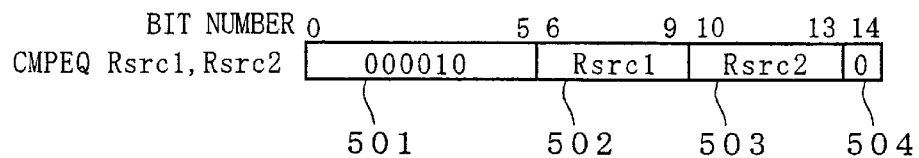
FIG. 15 is an explanatory diagram showing bit allocation of a CMPEQ instruction in the data processor according to the embodiment 1 of the present invention.
Figure 16:
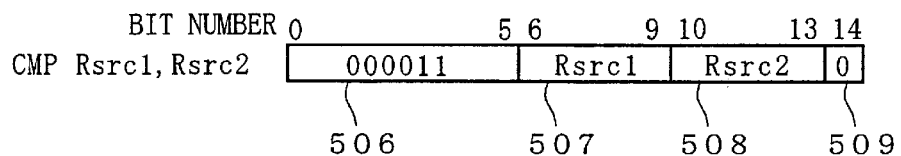
FIG. 16 is an explanatory diagram showing bit allocation of a CMP instruction in the data processor according to the embodiment 1 of the present invention.

FIG. 15 shows bit allocation of the CMPEQ instruction, and FIG. 16 shows bit allocation of the CMP instruction. These instructions have the format of the short instruction shown in FIG. 4, and 501, 504, 506 and 509 are operation codes. The CMPQ instruction sets 1 in the F0 flag 47 when the value of a register specified in an Rsrc1 field 502 matches the value of a register specified in an Rsrc2 field 503 match, and sets 0 in the F0 flag 47 in the case of mismatch. The CMP instruction sets 1 in the F0 flag 47 when the value of a register specified in an Rsrc1 field 507 is less than the value of a register specified in an Rsrc2 field 508, and sets 0 in the F0 flag 47 in other case.

Figure 17:
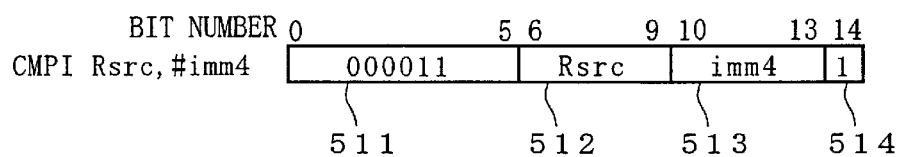
FIG. 17 is an explanatory diagram showing bit allocation of a CMPI instruction of a short format in the data processor according to the embodiment 1 of the present invention.
Figure 18:
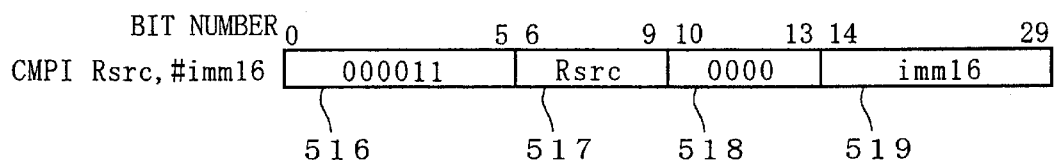
FIG. 18 is an explanatory diagram showing bit allocation of a CMPI instruction of a long format in the data processor according to the embodiment 1 of the present invention.

Further, there is a CMPI instruction employing an immediate value in place of Rsrc2 of the CMP instruction. FIG. 17 shows bit allocation of an instruction of a short format specifying an immediate value of four bits from −8 to 7, and FIG. 18 shows bit allocation of an instruction of a long format specifying an immediate value of 16 bits. The respective ones specify the immediate values in an imm4 field 513 and an imm16 field 519, and perform comparison with register values specified in Rsrc fields 512 and 517. The CMPEQ instruction also has an instruction (format) performing comparison with the immediate value. It additionally comprises a number of comparison instructions and formats such as comparison of unsigned numbers, comparison of accumulator values and the like. Thus, it comprises a number of instructions updating flags, though limited instructions, in order to efficiently perform data processing.

Figure 19:
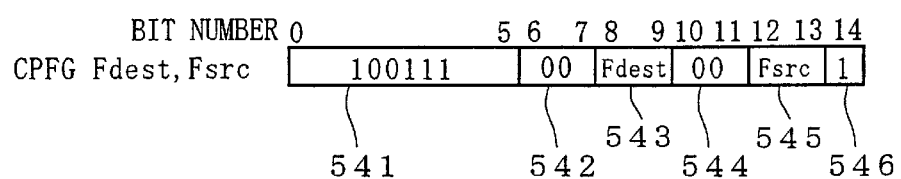
FIG. 19 is an explanatory diagram showing bit allocation of a CPFG instruction in the data processor according to the embodiment 1 of the present invention.

Further, this data processor comprises a CPFG instruction copying the content of any of the F0 flag 47, the F1 flag 48 and the C flag 49, the F0 flag 47 or the F1 flag 48. FIG. 19 shows bit allocation of the CPFG instruction. The content of a flag specified in an Fsrc field 545 is copied into a flag specified by an Fdest field 543.

Figure 20:
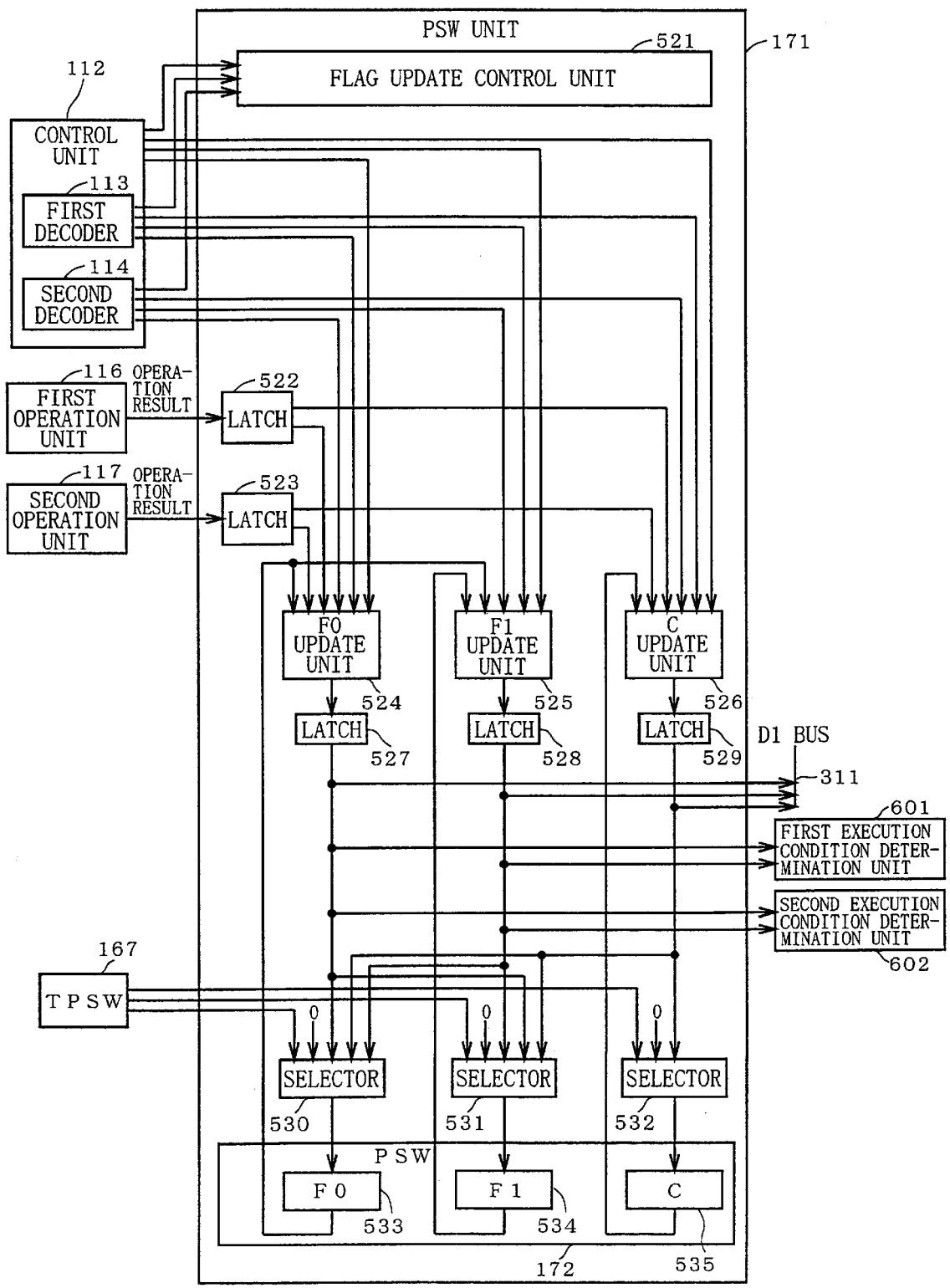
FIG. 20 is a block diagram showing a PSW unit of the data processor according to the embodiment 1 of the present invention.

FIG. 20 shows a diagram showing only a flag update unit of the PSW unit 171. Description of a mode bit and the like is omitted since not particularly directly related to the present invention. For simplification, control signals for the latches, the selectors and the like and the clock signals are also omitted, and it shows the part with a block diagram noting the flow of data.

A flag update control unit 521 performs update control of the flags such as generation of a latch enable signal, selection signal generation for the selectors and the like. It fetches flag update information following execution of the instruction from the first decoder 113 and the second decoder 114 in the control unit 112. Further, it fetches update control information of the PSW following instruction execution state information and EIT processing from a part (not shown) performing pipeline control and EIT control in the control unit 112. It generates the latch enable signal, the selection signal for the selectors and the like from the information, and controls updating of the flags.

An F0 latch 533, an F1 latch 534 and a C latch 535 are latches physically holding the F0 flag 47, the F1 flag 48 and the C flag 49 on architecture respectively.

An F0 update unit 524, an F1 update unit 525 and a C update unit 526 perform updating following operation results of the F0 flag 47, the F1 flag 48 and the C flag 49 and updating following instruction execution respectively. The comparison instruction and the add-subtract instruction of the short format can be executed in both the first operation unit 116 and the second operation unit 117. Operation result information of the first operation unit 116 and the second operation unit 117 necessary for updating the flags is fetched in latches 522 and 523 respectively, and transmitted to the F0 update unit 524 and the C update unit 526.

From the first decoder 113 and the second decoder 114, first and second decoded results having information related to based on which operation result or flag to generate each flag are transmitted to the F0 update unit 524, the F1 update unit 525 and the C update unit 526 respectively. From the control unit 112, update control information of the PSW following instruction execution state information and EIT processing is transmitted to the F0 update unit 524, the F1 update unit 525 and the C update unit 526 respectively.

The PSW unit 171 operates to transfer the content of the F0 flag 47 before updating to the F1 flag 48 in updating of the F0 flag 47, while outputting the value before updating as such to the update unit for each flag when performing no updating. In order to implement this operation, the value of the F0 latch 533 is inputted in the F0 update unit 524, the values of the F0 latch 533 and the F1 latch 534 are inputted in the F1 update unit 525 and the value of the C latch 535 is inputted in the C update unit 526 respectively.

When executing an effective instruction, the F0 update unit 524, the F1 update unit 525 and the C update unit 526 perform generation of flags on the basis of flag update relevant information consisting of decoded results, operation results and state control information and flag information before updating.

Updating of the flags by execution of a flag update instruction such as a compare/operation instruction is performed from the rear half of a processing cycle in the E stage 403 to the front half of the next cycle since definition of the operation results delays. When performing no flag updating, it outputs the value before updating as such. Information generated in the F0 update unit 524, the F1 update unit 525 and the C update unit 526 is held in latches 527, 528 and 529 respectively. When reading the value of the PSW 21 by an instruction or saving the value of the PSW21 in EIT starting, outputs of these latches are outputted to the D1 bus 311. In order to perform execution condition determination of the instruction described later, the outputs of the latches 527 and 528 are also outputted to a first execution condition determination unit 601 and a second execution condition determination unit 602 in the control unit 112. The details of condition determination are described later.

Selectors 530, 531 and 532 select update data of the F0 latch 533, the F1 latch 534 and the C latch 535 respectively. When updating the flags with the operation results, they select the outputs of the latches 527, 528 and 529 respectively. In the case of a transfer instruction to the PSW setting a value in the PSW as data in the instruction, they select the value of the TPSW 167. When performing copying of the flag in the CPFG instruction, the latch (any one of 527 to 529) for the flag selected as the source is selected by the selector 530 or the selector 531 corresponding to the flag specified as the destination. In EIT starting, the values of all flags are zero-cleared and hence 0 is selected. Updating of the F0 latch 533, the F1 latch 534 and the C latch 535 is performed with selected data. Each flag is updated in value only when updating is necessary, and holds the precedent value when no updating is necessary.

As described above, definition of the operation results may delay, and hence updating is performed in the next cycle of the E stage 403 executing the operation/comparison instruction when updating the flag with the operation result, while updating is completed in the E stage 403 when executing the CPFG instruction, a transfer instruction to the PSW and a return instruction from EIT. In this case, updating of the flag by the operation result in the next cycle is inhibited. In other words, when the CPFG instruction, the transfer instruction to the PSW, the return instruction from EIT and the like and the operation/comparison instruction are executed in parallel, updating of the flags related to the CPFG instruction and the transfer instruction to the PSW is given priority. While the values of the flags are referred to in the E stage 403, the values of the latches 527 to 529 holding the values after updating in the update units 524 to 526 are referred to and hence it correctly operates in any case even if reference is made immediately after updating.

Updating of a desired flag is implemented with the a forementioned structure. When updating the F0 flag 47 with the comparison result, an update value is generated in the F0 update unit 524 on the basis of the decoded result and the operation result and fetched in the F0 latch 533. In the F1 update unit 525, the value of the F0 latch 533 before updating is outputted as such and fetched in the F1 latch 534.

Thus, the data processor of the embodiment 1 can hold two comparison and operation results in the F0 flag 47 and the F1 flag 48 without specifying which flag to update by the instruction. Consequently, a field specifying which flag to update is unnecessary in the instruction code, whereby a number of instructions can be encoded with a short operation code and the code efficiency improves.

The comparison instruction is an instruction whose execution frequency is extremely high in a program performing various control and the number of instructions is also large in general, and hence contribution to improvement of the code efficiency is large. While the flag update unit is in a somewhat complex structure, increase of hardware resulting from addition of the F1 flag 48 is extremely small.

Condition execution is now described in detail. Instructions performing condition execution implemented by the data processor of the present invention can be roughly classified into three of a condition execution instruction (it is hereinafter assumed that simple description of a condition execution instruction indicates this instruction) performing condition execution based on a condition specified by its own instruction, a condition set instruction setting different values on the basis of whether a condition specified by its own instruction is satisfied or not and an execution condition specifying instruction specifying execution conditions of a pair of instructions executed in parallel.

It can be said that the aforementioned condition execution instruction and condition set instruction are flag control execution instructions whose execution contents are decided on the basis of the contents of flags.

The condition execution instruction and the condition set instruction of a short format are implemented only with respect to instructions having a high frequency of performing condition execution due to limitation of operation codes, and only the F0 flag 47 can be referred to. As to each operation, it comprises two types of instructions of an instruction executed when the F0 flag 47 is "1" and an instruction executed when the F0 flag is "0". As to the condition execution instruction, there are a condition transfer instruction, a condition branch instruction and the like, for example.

Figure 21:
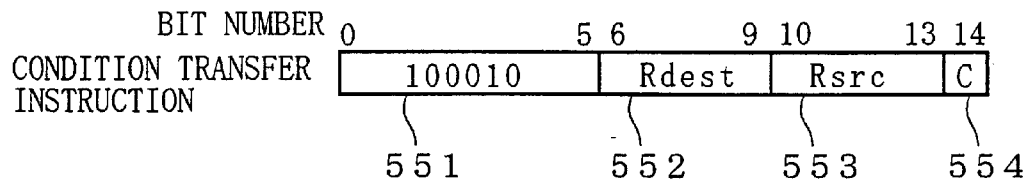
FIG. 21 is an explanatory diagram showing bit allocation of a condition transfer instruction in the data processor according to the embodiment 1 of the present invention.

FIG. 21 shows bit allocation of the condition transfer instruction. In such an MVF0F instruction that a C field 554 is "0", the value of a register specified in an Rsrc field 553 is transferred to a register specified in an Rdest field 552 only when the F0 flag 47 is "0", and it performs no transfer when the F0 flag 47 is "1". In such an MVF0T instruction that the C field 554 is "1", on the contrary, the value of the register specified in the Rsrc field 553 is transferred to the register specified in the Rdest field 552 only when the F0 flag is "1", and it performs no transfer when the F0 flag 47 is "0". In the condition in the figure, "==" denotes that it becomes true when matching, and becomes false when mismatching. It indicates that the operation is executed only when the condition is satisfied (hereafter similar).

Figure 22:
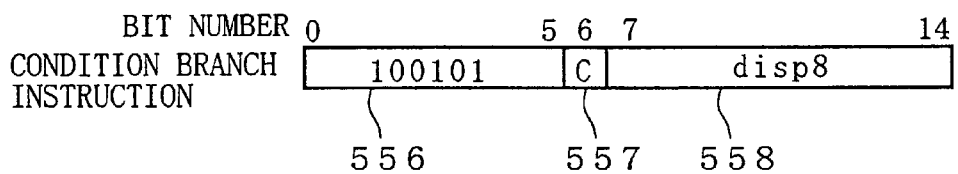
FIG. 22 is an explanatory diagram showing bit allocation of a condition branch instruction of a short format in the data processor according to the embodiment 1 of the present invention.

FIG. 22 shows bit allocation of the condition branch instruction of a short format. In such a BRF0F instruction that a C field 557 is "0", it branches to a branch destination address only when the F0 flag 47 is "0". The branch destination address is calculated by sign-extending the value of a branch displacement field of eight bits specified in a dsp8 field 558 to 16 bits and thereafter adding the same with a PC value of the condition branch instruction. When the F0 flag 47 is "1", it causes no branch but continues execution of an instruction of a sequence subsequent to the condition branch instruction. Transfer of the jump target address through the JA bus 323 is also inhibited. In such a BRF0T instruction that the C field 557 is "1", on the contrary, a branch takes place only when the F0 flag 47 is "1".

Figure 23:
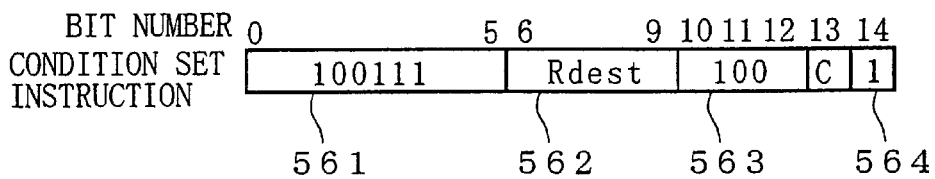
FIG. 23 is an explanatory diagram showing bit allocation of a condition set instruction of a short format in the data processor according to the embodiment 1 of the present invention.

FIG. 23 shows bit allocation of the condition set instruction of a short format. For this instruction, execution of the instruction is performed also when the condition is not satisfied dissimilarly to the condition execution instruction. In such an SETF0F instruction that a C field 564 is "0", it sets 1 in a register specified by an Rdest field 562 when the F0 flag 47 is "0" while setting "0" when the F0 flag 47 is "1". In such an SETF0T instruction that the C field 564 is "1", on the contrary, it sets "1" in the register specified in the Rdest field 562 when the F0 flag 47 is "1" while setting "0" when the F0 flag 47 is "0".

The condition execution instruction and the condition set instruction of a long format have margins for operation codes, and hence 14 conditions can be specified as to each operation. The two flags of the F0 flag 47 and the F1 flag 48 can be referred as execution conditions, and not only the condition can be specified by either one flag but also a composite condition (OR, AND or exclusive-OR) of two flags can be specified. When taking the composite condition of the two flags, further, it is also possible to refer to inversion of each flag. In the case of exclusive-OR, XOR and XNOR may be specifiable and hence the conditions are two.

Figure 24:
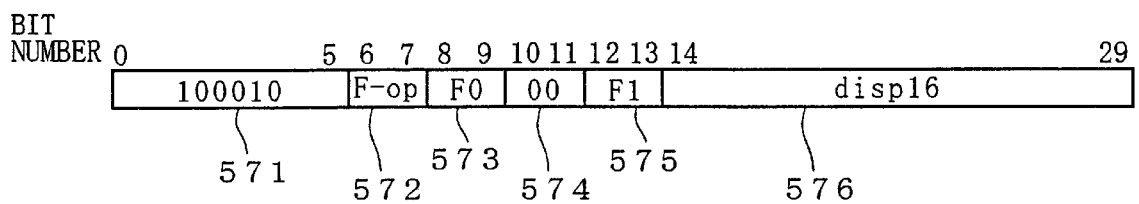
FIG. 24 is an explanatory diagram showing bit allocation of a condition branch instruction of a long format in the data processor according to the embodiment 1 of the present invention.

The condition execution instruction of the log format includes a condition branch instruction, for example. FIG. 24 shows bit allocation of the condition branch instruction of the long format. A flag operation (F-op) field 572, an F0 field 573 and an F1 field 575 specify the branch condition. The F-op field 572 specifies a composite condition of the two flags. "00" indicates AND, "01" indicates OR and "10" indicates exclusive-OR. The F0 field 573 and the F1 field 575 specify a reference method for each flag. "00" indicates reference to inversion, and "01" indicates reference to the value as such. "10" indicates that it is regularly true regardless of the value of the flag. When referring to one flag, AND is specified as the operation of the flag, and "10" (regularly true) is specified in a field of a flag on a side irrelevant to the condition. In response to 14 conditions, 14 instructions are present. In a BRTAT instruction, for example, a branch takes place when the F0 flag 47 is "1" and the F1 flag 48 is "1". When the condition is not satisfied, no branch takes place. The branch destination address is calculated by adding the value of a branch displacement field of 16 bits specified in a disp16 field 576 to a PC value of the condition branch instruction.

Figure 25:
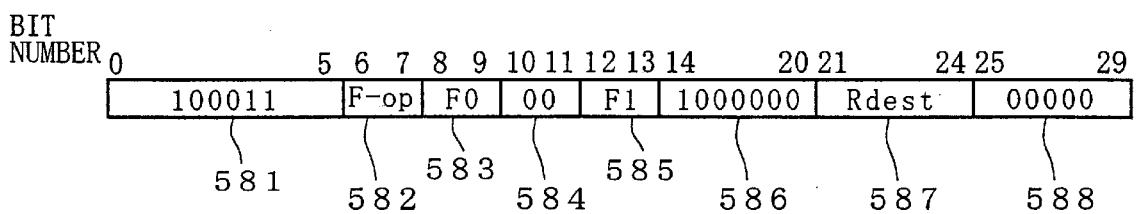
FIG. 25 is an explanatory diagram showing bit allocation of a condition set instruction of a long format in the data processor according to the embodiment 1 of the present invention.

FIG. 25 shows bit allocation of the condition set instruction of the long format. A flag operation (F-op) field 582, an F0 field 583 and an F1 field 585 specify the set condition. In response to 14 conditions, 14 instructions are present. In an SETFRT instruction, for example, it sets "1" in a register specified in an Rdest field 587 when the F0 flag 47 is "0" or the F1 flag 48 is "1" while setting "0" in other case. Thus, by rendering a sophisticated condition set instruction of writing a first value/second value in a prescribed storage area on the basis of whether the composite condition consisting of the F0 flag 47 and the F1 flag 48 is satisfied or not, a data processor having higher performance can be obtained.

The execution condition specifying instruction is now described. The execution condition specifying instruction is a short instruction, which performs an effective operation only when executing two short instructions in parallel. When this execution condition specifying instruction is arranged in the left-hand container 52 in the instruction code, an execution condition for an instruction executed in the second operation unit 117 or the like arranged in the right-hand container 53 is specified. When the execution condition specifying instruction is arranged in the right-hand container 53 in the instruction code, an execution condition for an instruction executed in the first operation unit 116, the PC unit 118 or the like arranged in the left-hand container 52 is specified. Parallel execution with all short instructions such as transfer, operation, jump, load/store, trap and the like is possible, and condition execution of various operations is enabled by comprising this single instruction.

Figure 26:
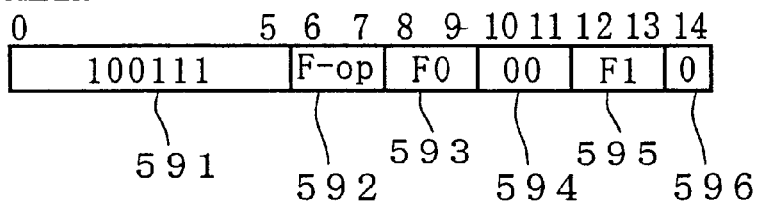
FIG. 26 is an explanatory diagram showing bit allocation of an execution condition specifying instruction in the data processor according to the embodiment 1 of the present invention.

FIG. 26 shows bit allocation of the execution condition specifying instruction. A flag operation (F-op) field 592, an F0 field 593 and an F1 field 595 specify the execution condition. In response to 14 conditions, 14 instructions are present. In an EXETXT instruction, for example, it performs execution of instructions stoned in a pair of containers when the value of the F0 flag 47 and the value of the F1 flag 48 are different, while inhibiting execution of the instructions stored in the pair of containers in other case.

Figure 27:
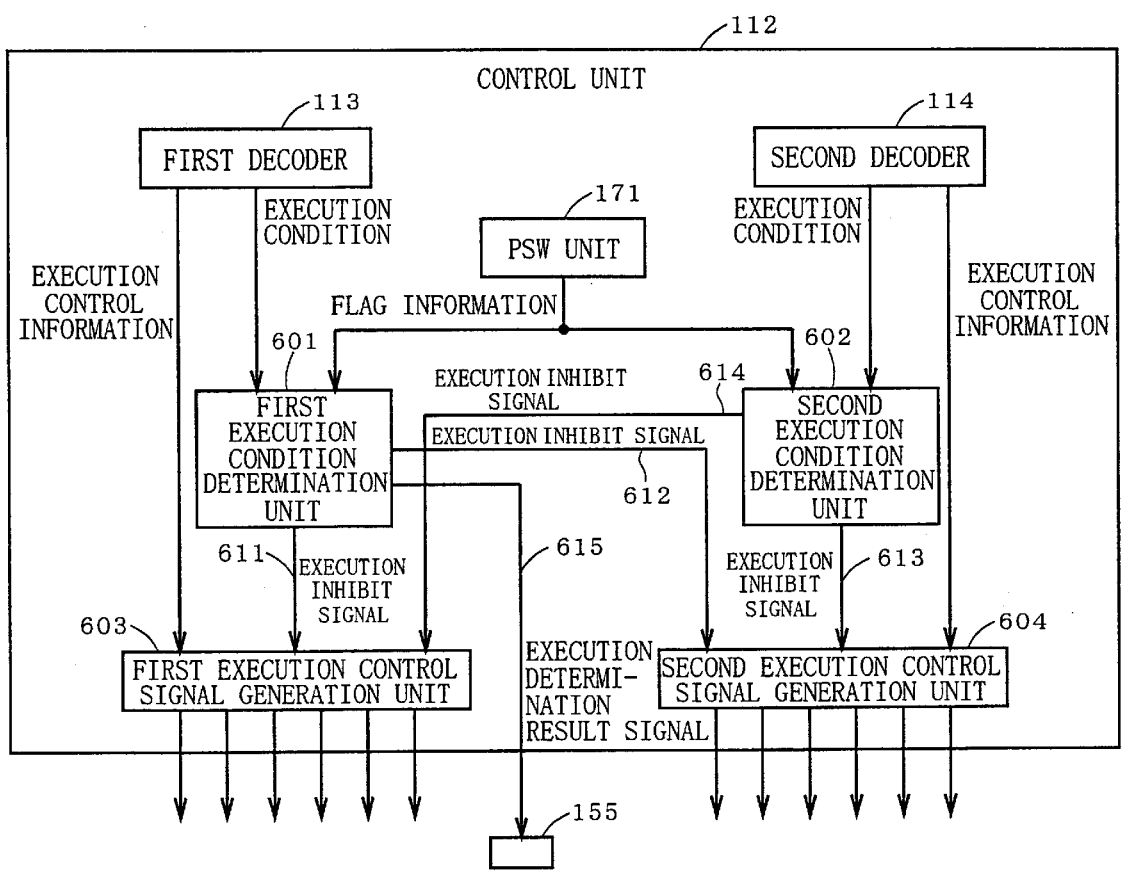
FIG. 27 is a block diagram showing in detail a unit related to execution condition determination in a control unit of the data processor according to the embodiment 1 of the present invention.

FIG. 27 shows a block diagram extracting a part related to execution condition determination in the control unit 112. As shown in FIG. 20, the values of the F0 flag 47 and the F1 flag 48 are outputted from the PSW unit 171 to the first execution condition determination unit 601 and the second execution condition determination unit 602. A control signal (execution control information) necessary for execution of the instruction in the decoded result in the first decoder 113 is outputted to a first execution control unit 603, while execution control information in the decoded result in the second decoder 114 is outputted to a second execution control unit 604. On the basis of the outputs of the first execution control unit 603 and the second execution control unit 604, each instruction is executed in the arithmetic unit, the register file and the like.

Description is now made on the case where the instruction decoded in the first decoder 113 is a condition execution instruction specifying the execution condition for its own instruction. Execution control information necessary for processing performed when the condition is satisfied is generated in the first decoder 113 and transmitted to the first execution control signal generation unit 603, the execution condition for the condition execution instruction is outputted to the first execution condition determination unit 601, and the first execution condition determination unit 601 performs execution condition determination on the basis of flag information and the execution condition.

The first execution condition determination unit 601 asserts an execution inhibit signal 611 when the execution condition is not satisfied in the condition execution instruction. Then, the first execution control signal generation unit 603 forcibly negates an execution control signal controlling updating of a resource visible from the user. For example, a control signal controlling updating of the register file 115, updating of other control registers visible from the user, updating of the PSW 172, assertion of a data memory access request, issuance of processing to the M stage 404, assertion of an internal jump signal, transfer of the jump target address through the JA bus 323, starting of an exception or a trap following execution of the instruction or the like is negated. However, since it is difficult in timing to inhibit execution starting of the instruction, operation and the like have been started and the value of an internal temporary latch such as an input latch of the arithmetic unit is updated. While it is better to inhibit processing having high power consumption in view of reduction of power consumption, functionally only updating of a state visible as the user may be inhibited at the minimum.

On the other hand, the first execution condition determination unit 601 does not assert the execution inhibit signal 611 when the execution condition is satisfied in the condition execution instruction. Therefore, the instruction is executed by an execution control signal generated in the first execution control signal generation unit 603 based on the execution control information of the first decoder 113.

Description is now made on the case where the instruction decoded in the first decoder 113 is an execution condition specifying instruction specifying the execution condition for a pair of instructions executed in parallel. In this case, decoding of an effective instruction is performed in the second decoder 114, and execution control information necessary for instruction execution is outputted to the second execution control unit 604. The execution condition defined in the execution condition specifying instruction is outputted to the first execution condition determination unit 601, and the first execution condition determination unit 601 performs determination of the execution condition on the basis of flag information.

The first execution condition determination unit 601 asserts an execution inhibit signal 612 when the execution condition for the execution condition specifying instruction is not satisfied. Then, the second execution control signal generation unit 604 forcibly negates an execution control signal controlling updating of the resource visible from the user. For example, a control signal controlling updating of the register file 115, the accumulator 208, the PSW 172 or the like is negated. Since it is difficult in timing to inhibit execution starting of the instruction, operation and the like have been started and the value of an internal temporary latch such as the input latch of the arithmetic unit is updated. It inhibits only updating of the state visible from the user.

On the other hand, the first execution condition determination unit 601 does not assert the execution inhibit signal 612 when the execution condition is satisfied in the execution condition specifying instruction. Therefore, the instruction is executed by an execution control signal generated in the second execution control signal generation unit 604 on the basis of execution control information from the second decoder 114. In any case, the execution condition specifying instruction itself performs no operation but execution control information identical to a NOP (no operation) instruction is transmitted from the first decoder 113 to the first execution control unit 603.

When the instruction decoded in the second decoder 114 is a condition execution instruction specifying the execution condition for its own instruction, determination of the execution condition is performed in the second execution condition determination unit 602. The second execution condition determination unit 602 asserts an execution inhibit signal 613 when the execution condition is not satisfied. Then, the second execution control signal generation unit 604 forcibly negates an execution control signal controlling updating of the resource visible from the user.

On the other hand, the second execution condition determination unit 602 does not assert the execution inhibit signal 613 when the execution condition is satisfied. Therefore, the instruction is executed by an execution control signal generated in the second execution control signal generation unit 604 on the basis of execution control information outputted from the second decoder 114.

When the instruction decoded in the second decoder 114 is an execution condition specifying instruction specifying an execution condition for a pair of instructions executed in parallel, determination of the execution condition is performed in the second execution condition determination unit 602.

The second execution condition determination unit 602 asserts an execution inhibit signal 614 when the execution condition is not satisfied. Then, the first execution control signal generation unit 603 forcibly negates an execution control signal controlling updating of the resource visible from the user. The second execution condition determination unit 602 does not assert the execution inhibit signal 614 when the execution condition is satisfied. Therefore, the instruction is executed by an execution control signal generated in the first execution control signal generation unit 603 on the basis of execution control information outputted from the first decoder 113.

The condition set instruction can be executed only in the first operation unit 116. Determination of the execution condition is performed in the first execution condition determination unit 601. In this instruction, no execution inhibit signal is asserted. "1" is outputted to a condition determination result signal 615 when the condition specified in the instruction is satisfied while "0" is outputted when the condition is not satisfied, and transmitted to the selector 155 of the first operation unit 116. In the selector 155, zero is connected to high-order 15 bits of the condition determination result signal 615, and written in a register specified as the destination register in the register file 115 through the D1 bus 311.

Some exemplary processing of the execution condition specifying instruction is described. As such an example that the execution condition is specified in the left-hand container, description is made on processing in the case of executing an EXEF0T instruction specifying execution of a pair of instructions when the F0 flag 47 is 1 and a two-word transfer instruction "MV2W R0, R2" transferring the value of the register R2 to the register R0 and transferring the value of the register R3 to the register R1 in parallel. FIG. 28 shows bit allocation of the instruction. An FM bit field 621 is "00" since it is parallel execution of two short instructions. The instruction code for the EXEF0T instruction is encoded in the left-hand container 622, and the instruction code for "MV2W R0, R2" is encoded in the right-hand container 623. The instruction codes fetched in the instruction queue 111 are outputted to the instruction decoding unit 119. Instruction decoding is performed in the D stage 402.

The first decoder 133 analyzes the contents of the left-hand container 622, and outputs execution control information executing (performing no effective state updating) NOP (no operation) to the first execution control signal generation unit 603 while outputting information indicating that it is an execution condition specifying instruction and execution condition information to the first execution condition determination unit 601. The second decoder 114 analyzes the contents of the right-hand container 623 and outputs execution control information for executing an MV2W instruction to the second execution control signal generation unit 604. The E stage 403 performs execution condition determination and operation execution. On the basis of the output of the second execution control signal generation unit 604, the value of the register R2 in the register file 115 is outputted to the S4 bus 304 and the value of the register R3 is outputted to the S5 bus 305 respectively, and fetched in the B latch 203 through the shifter 205. The value of the register R2 held in the B latch 204 is outputted to the D2 bus 312 through the interconnection line 207 and the value of the register R3 is outputted to the D3 bus 313 through the interconnection line 207 respectively.

In parallel with the operation execution, determination of the execution condition is performed in the first execution condition determination unit 601, and the execution inhibit signal 612 is asserted only when the value of the F0 flag 47 is "1". When the execution inhibit signal 612 is not asserted, the second execution control signal generation unit 604 writes the values of the D2 bus 312 and the D3 bus 313 in the registers R0 and R1 in the register file 115 respectively on the basis of the decoded result of the second decoder 114. When the execution inhibit signal 612 is asserted, a write enable signal for performing writing in the register file is forcibly negated from the D2 bus 312 and the D3 bus 313 in the second execution control signal generation unit 604, and so controlled that the values of the registers are not updated. Thus, it is so controlled as to execute the operation specified in the right-hand container when the condition is satisfied while not executing the operation specified in the right-hand container when the condition is not satisfied. While the example of the MV2W instruction has been shown here, all subinstructions processable in the second decoder 114 and the second operation unit 117 can be executed in parallel with the execution condition specifying instruction arranged in the left-hand container. However, an operation in the case of specifying an execution condition specifying instruction, a condition transfer instruction or the like in the right-hand container is meaningless and hence not guaranteed.

As such an example that the execution condition is specified in the right-hand container, description is made on processing in the case of executing an EXETAT instruction specifying execution of a pair of instructions when both the F0 flag 47 and the F1 flag 48 are "1" and "ST R0, @R12" storing the value of the register R0 in a memory area specified by an address held in the register R12 in parallel. It is assumed that the ST instruction is stored in the integrated data memory 105. FIG. 29 shows bit allocation of the instructions. An FM bit field 626 is "00" since it is parallel execution of two short instructions. The instruction code for "ST R0, @R12" is encoded in a left-hand container 627, and the instruction code for the EXETAT instruction is encoded in a righthand container 628. The instruction codes fetched in the instruction queue 111 are outputted to the instruction decoding unit 119.

In the D stage 402, decoding of the instructions is performed. The first decoder 113 analyzes the contents of the left-hand container 627, and outputs execution control information for executing the ST instruction to the first execution control signal generation unit 603. The second decoder 114 analyzes the contents of the right-hand container 628, and outputs execution control information executing (performing no effective state updating) NOP (no operation) to the second execution control signal generation unit 604 while outputting information indicating that this is an execution condition specifying instruction and execution condition information to the second execution condition determination unit 602. The E stage 403 performs execution condition determination and operation execution. On the basis of the output of the first execution control signal generation unit 603, the value of the register R12 in the register file 115 is fetched in the AA latch 151 through the S3 bus 303. Further, the value of the register R0 in the register file 115 is fetched in the SD register 160 through the S1 bus 301.

In parallel with the operation execution, the second execution condition determination unit 602 performs determination of the execution condition and asserts the execution inhibit signal 614 only when both the F0 flag 47 and the F1 flag 48 are "1". When the execution inhibit signal 614 is not asserted, the address held in the AA latch 151 is transferred to the operand access unit 104 through the AO latch 154 and the OA bus 321. Further, store data fetched in the SD register 160 is inputted in the alignment circuit 162 through the latch 161 and set on a four-byte boundary. In addition, processing of memory access is issued to the M stage 104. In the M stage 104, the output of the alignment circuit 162 is outputted to the operand access unit 104 through the latch 163 and the OD bus 322. The operand access unit 104 outputs an operand address inputted through the OA bus 321 and operand data inputted through the OD bus 322 to the integrated data memory 105, and performs memory writing. When the execution inhibit signal 614 is asserted, the first execution control signal generation unit 603 inhibits issuance of processing to the M stage 404 in the control unit 112 and assertion of a memory access request signal (not shown) and performs control not to perform memory access. In this case, updating of the AO latch 154 and the latch 161 is also forcibly inhibited for power consumption reduction. Thus, it performs control to execute the operation specified in the left-hand container when the condition is satisfied, and not to execute the operation specified in the left-hand container when the condition is not satisfied.

While the example of the ST instruction has been shown here, all subinstructions processable in the first decoder 113 and the second operation unit 117 can be executed in parallel with the execution condition specifying instruction arranged in the right-hand container. However, an operation in the case of specifying an execution condition specifying instruction, a condition transfer instruction or the like in the left-hand container is meaningless and hence not guaranteed.

Thus, by simply adding an execution condition specifying instruction of a short format, conditioned execution of all short instructions is enabled with no execution condition specify field for instructions of a short format. Condition execution can be implemented by hardware addition simply adding a function performing condition determination of an execution condition specifying instruction and a function inhibiting execution of the instruction when the condition is not satisfied, penalty of a branch is reduced and the performance improves. Further, a field specifying the execution condition is unnecessary for an unconditionally executed instruction, and hence a number of instructions can be allocated as instructions of a short format and the code efficiency can be improved.

However, this embodiment further implements reduction of the code size and improvement of the performance by implementing a condition execution instruction capable of specifying a subset of a condition having high a usage frequency for a short instruction (transfer, branch instruction or the like) having a high execution frequency. For an instruction (instruction which cannot be implemented by combination of a short instruction such as a condition branch instruction having branch displacement of 16 bits and an execution condition specifying instruction and has a high usage frequency) for which it is better that the execution condition is specifiable as a long instruction, it implements an instruction capable of specifying execution conditions including a composite condition of two flags in its own instruction thereby implementing reduction of the code size and improvement of the performance. Further, wasteful operations can be reduced since the execution condition can be specified with a composite condition of a plurality of operation results, and it contributes to reduction of the code size and improvement of the performance since processing can be implemented with the minimum necessary instruction number.

Further, performance of Boolean operation with a plurality of conditions is enabled by implementing a condition set instruction setting "1" or "0" on the basis of a plurality of conditions, and a complex control condition such as a control program for a microcomputer is processable at a high speed with a small number of code sizes.

Some simple exemplary programs are now shown.

FIG. 30 shows an exemplary program counting a number having a value greater than a reference value of 32 bits in 40 32-bit data D[i] (i: 0 to 39). FIG. 31 shows the contents of an instruction memory of a repeat block in a loop, and FIG. 32 shows allocation of the data D[i] on the integrated data memory. h' indicates hexadecimal representation, and "||" indicates parallel execution.

The program is divided into two parts of an initialization unit denoted by 631 to 634 and a loop processing unit denoted by 635 to 639. An LD2W instruction (631) loads the reference value in the pair of registers R2 and R3. An LDI instruction (631) sets the address (h'2000) of the D[0] (641) in the register R8 used as a data pointer. In an instruction 633, the LD2 instruction and an NOP instruction are executed in parallel. In the LD2W instruction, it loads the D[0] (641) in the pair of registers R0 and R1 and post-increments the value of the register R8 by an operand size 4. The NOP instruction is a no operation instruction inserted for setting. In an instruction 634, the LDI instruction and an MV2WTAC instruction are executed in parallel. The LDI instruction initializes the register R6 to "0". The MV2WTAC instruction sign-extends the value of the reference value held in the pair of registers R2 and R3 to 40 bits and writes the same in the accumulator A0.

By executing an REPI instruction (635), it repeats a block of four instruction words from an instruction 636 next to the REPI instruction to an instruction 639 having a REP_END label 20 times with zero overhead. In the repeat block, it performs processing with throughput of 1 data/2 clock cycle. Repeat processing is not directly related to the present invention and hence detailed description is omitted.

As shown in FIG. 31, this instruction of four words executes two short instructions in parallel respectively. Therefore, all FM bits are "00". The initial first processing is now described. In the instruction 636, the LD2W instruction and the CMP instruction are executed in parallel. The CMP instruction compares the value of the D[0] (641) previously loaded in the pair of registers R0 and R1 and the value of the reference value held in the accumulator A0 as signed numbers, and sets "1" in the F0 flag 47 if D[0] 641 is greater than the reference value, while setting "0" in the F0 flag 47 in other case.

In the LD2W instruction, it loads the value of the data D[1] (642) processed next in the pair of registers R2 and R3, and the register R8 is post-incremented by four. In an instruction 637, the EXEF0T instruction and an ADDI instruction are executed in parallel. The value of the register R6 is incremented by one when the F0 flag 47 is "1", i.e., the D[0] 641 is greater than the reference value, otherwise the execution inhibit signal 612 is asserted and the value of the register R6 is not updated. Similarly, the LD2W instruction and the CMP instruction are executed in parallel in an instruction 638, and the EXEF0T instruction and the ADDI instruction are executed in parallel in an instruction 639. Since it is free by one cycle from loading up to reference, and hence no conflict of load operands takes place but it executes each 32-bit instruction every clock cycle. After repeat termination, a number having a value greater than the reference value in the D[i] (i: 0 to 39) is held in the register R6.

Thus, high-speed processing is implemented with no penalty of a branch by condition execution by parallel execution of an execution condition specifying instruction and an addition instruction. Further, power consumption can be reduced by reducing the processing clock cycle number necessary for execution.

Figures 33, 34:
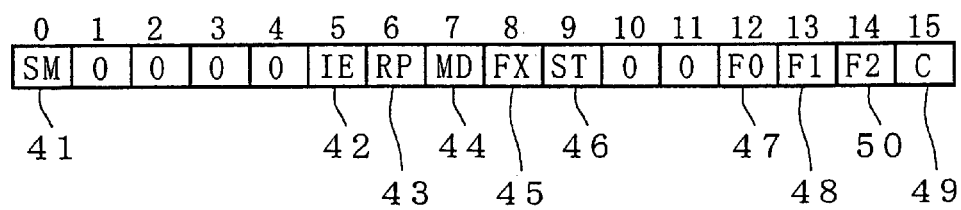
FIG. 33 is an explanatory diagram showing another exemplary program of the data processor according to the embodiment 1 of the present invention.
FIG. 34 is an explanatory diagram showing the structure of a processor status word of a data processor according to an embodiment 2 of the present invention.

FIG. 33 shows another exemplary program processing. When a bit 0 of a variable A is "1" and a bit 7 of a variable B is "1", it sets a bit 3 of a variable C to "1" Then, when a bit 2 of the variable A is "0" or a bit 15 of the variable B is "1", it calls a subroutine SUB_1. Finally, it sets "1" to a variable F when a variable D is nonzero and a variable E is less than 8 while otherwise setting "0" to the variable F. Each variable is 16 bits. The register R14 shows the base address of a variable area, and DISP_A shows the like shows displacement of the storage position of each variable from the base address.

An LD instruction (651) loads the variable A in the register R0, an LD instruction (652) loads the variable B in the register R1 and an LD instruction(653) loads the variable C in the register R2 respectively. It tests the bit 0 of the variable A held in the register R0 in a BTSTI instruction (654). It sets "1" in the F0 flag 47 if "1", while setting "0" in the F0 flag if "0". It tests the bit 7 of the variable B held in the register R1 in a BTSTI instruction (655), and sets "1" in the F0 flag 47 if "1", while setting "0" in the F0 flag 47 if "0". The test result of the bit 0 of the variable A having been stored in the F0 flag 47 before updating is copied into the F1 flag 48. In an instruction (656), it performs condition execution on the basis of the aforementioned two comparison results. The execution condition is specified in an EXETAT instruction. If both the F0 flag 47 and the F1 flag 48 are "1", a BSETI instruction is executed, and the bit 3 of the variable C held in the register R2 is set to "1". When the execution condition is not satisfied, the execution inhibit signal 612 is asserted and writing in the register file is inhibited, and hence the value of the register R2 is not updated. An ST instruction (657) stores the variable C in the memory.

It tests the bit 2 of the variable A held in the register R0 in a BTSTI instruction (658), and sets the test result in the F0 flag 47. It tests the bit 15 of the variable B held in the register R1 in a BTSTI instruction (659), and sets the test result in the F0 flag 47. At this time, the test result of the bit 2 of the variable A having been stored in the F0 flag 47 before updating is copied into the F1 flag 48. In an instruction 660, it performs condition execution on the basis of the aforementioned two comparison results. The execution condition is specified in an EXETOF instruction. If the F0 flag 47 is "1" or the F1 flag 48 is "0", a branch to a subroutine specified with a label of SUB_1 takes place. Further, the address of an LD instruction (661) forming a return address is written in the register R13. When the execution condition is not satisfied, the execution inhibit signal 614 is asserted and assertion of an internal jump signal (pipeline cancel signal), output of the branch destination address to the JA bus 323 and writing of the return address in the register file are inhibited and hence no jump to the subroutine takes place.

The LD instruction (661) loads the variable D in the register R0 and an LD instruction (662) loads the variable E in the register R1 respectively. In a CMPEQI instruction (663), the value D stored in the register R0 and an immediate value 0 are compared for setting "1" in the F0 flag 47 when matching while setting "0" when mismatching. In a CMPI instruction 664, the variable E held in the register R1 and an immediate value 8 are compared, for setting "1" in the F0 flag 47 when the variable E is less than 8 while otherwise setting "0". The comparison result of the variable D having been stored in the F0 flag 47 before updating is copied into the F1 flag 48. In a condition set instruction SETTAF (665), it sets "1" in the register R0 when the F0 flag 47 is "1" and the F1 flag 48 is "0" while otherwise setting "0" in the register R0. The condition determination result signal 615 goes "1" only in true condition, is outputted to the selector 155 so that "0" is connected to the high order, and written back in the register R0. In an ST instruction (666), the value of the register R0 is stored in a storage area for the variable F in the memory.

As hereinabove described, the data processor of the embodiment 1 comprises a plurality of flags and can reduce the execution count for a condition branch instruction by executing a flag control execution instruction which is a condition execution instruction or a condition set instruction with a composite condition, whereby the effective speed improves and power consumption can be reduced. Further, condition branch instructions of twice can be replaced with a condition execution instruction of once by a composite condition capable of simultaneously determining two conditions, and the code size of the program can also be reduced.

The data processor of the embodiment 1 performs setting of the flags on the basis of a specific condition specified by an instruction such as a comparison instruction setting the flags and determines whether to execute in a true case or to execute in a false case in an instruction such as a condition execution instruction, an execution condition specifying instruction, a condition set instruction or the like performing condition determination. It may be an instruction set specifying up to whether to set in a true case or to set in a false case in an instruction setting the flags and performing execution when only the condition is satisfied (true or false case) in an instruction performing condition determination.

While the data processor of the embodiment 1 is a VLIW type processor which can execute two subinstructions in parallel, it is not a technique restricted to the VLIW type processor in relation to updating of the flags and reference to an execution condition and a set condition. It is also applicable a RISC or CISC processor of single instruction issuance or plural instruction issuance such as a superscalar. While the data processor of the embodiment 1 comprises two flags, it may comprise three or more flags for updating the three or more flags similarly to a shift register when updating the flags with a comparison instruction or the like.

Further, it may specify an execution condition or a set condition with a composite condition of the three or more flags. In addition, the flags may be set under whatever condition such as overflow. In any case, effects similar to the data processor of the embodiment 1 can be attained.

The technique of specifying the execution condition or the set condition with the composite condition is also effective in the case of comprising a plurality of flag groups and processing an instruction set explicitly specifying a flag group reflecting a comparison result in an instruction such as a comparison instruction updating the flags.

While the execution condition specifying instruction is executable both in the left-hand container 52 and the right-hand container 53 in this data processor, it is also effective in only either one. When it is in a structure processing different instructions in each operation unit for hardware reduction, however, the performance improves if the execution condition can be specified in both since a larger number of instructions can be condition-executed.

While this data processor can specify an order of executions or format of the instructions with the FM bit 51, the execution condition specifying instruction is effective also in a VLIW processor of a type having no such format specifying bit which can necessarily execute a plurality of instructions (operations) in parallel. Even a superscalar processor may implement an instruction, which is an instruction necessarily executed in parallel with a basic operation instruction, specifying the execution condition of the corresponding instruction. As to the execution condition specifying instruction, the composite condition may not necessarily be specified. Also when only one condition can be specified, a number of instructions may be condition-executable and penalty of a branch may be reducible. It is also effective in the case of processing an instruction set which can explicitly specify flags introducing operation results in a comparison instruction with an instruction.

While this data processor sets the value based on the condition determination result in the register in the condition set instruction, it may be set in an accumulator in an accumulator machine. Further, it may implement condition set and store instruction, directly set a value indicating true/false in store data and store the same in the memory. The same technique can be utilized, and similar effects can be attained.

According to the data processor of the embodiment 1, as hereinabove described, a plurality of comparison results can be held in the flags without providing a field for information insertion as to which flag is updated in the instruction code, whereby a number of instructions can be allocated in a short instruction word and the code efficiency can be improved.

Further, no execution condition specify field may be provided for an instruction performing unconditional execution as an instruction code, whereby a number of instructions can be allocated in a short instruction word and the code efficiency can be improved. When performing condition execution, this unconditional execution instruction and an execution condition specifying instruction may be executed in parallel. By comprising the execution condition specifying instruction, condition execution of a number of instructions is enabled with addition of small hardware, processing employing a branch instruction can be reduced by this, and branch penalty can be reduced. Further, the execution condition and the set condition can be specified with the composite condition of a plurality of operation results, whereby not only the condition branch count is reduced but operations such as condition determination and initialization of the registers are unnecessary and the number of executed instructions can be reduced.

Thus, the data processor of the embodiment 1 forms a high-performance apparatus at a low cost with small increase of the hardware quantity. Further, the code size can be reduced since it is not necessary to describe a flag to be updated in an instruction code for a flag update instruction such as a compare/operation instruction, whereby, when ROMing a program for built-in usage or the like, the capacity of the packaged ROM can be reduced and reduction of the cost can be attained. Further, prescribed processing can be efficiently executed by setting various execution conditions in an execution condition specifying instruction, whereby the clock cycle number necessary for implementation can be reduced and reduction of power consumption can be attained.

<Embodiment 2.>

A data processor according to an embodiment 2 of the present invention is now described. The basic structure is identical to the data processor of the embodiment 1. In the data processor of the embodiment 2, a point comprising three flags which can be referred to as an execution condition is different from the data processor of the embodiment 1. Description is now made while noting the difference between the same and the embodiment 1 of the present invention.

FIG. 34 shows a processor status word (PSW) of the data processor of the embodiment 2. In the data processor of the embodiment 2, three flags of an F0 flag 47, an F1 flag 48 and an F2 flag 50 are updated in a comparison instruction or the like, and referred to as an execution condition. The point that the F2 flag 50 of bit 14 is added is different from the data processor of the embodiment 1, and allocation of the remaining bits is identical.

Figure 35:
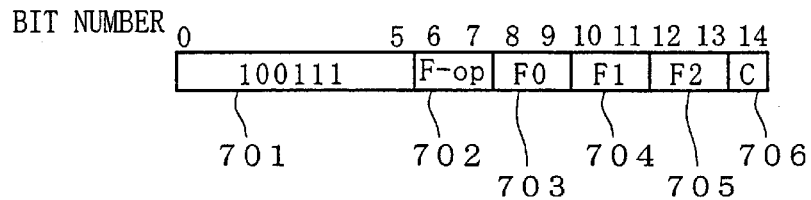
FIG. 35 is an explanatory diagram showing instruction bit allocation of an execution condition specifying instruction in the data processor according to the embodiment 2 of the present invention.
Figure 36:
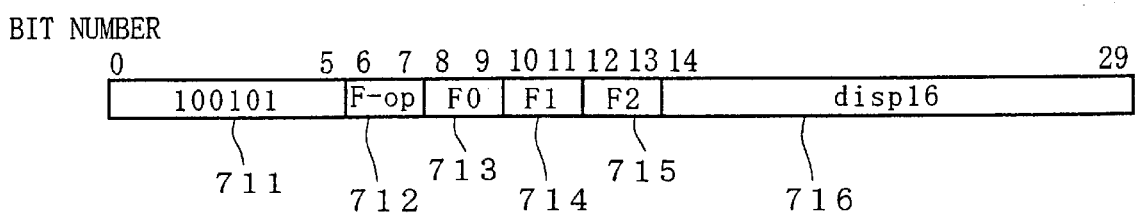
FIG. 36 is an explanatory diagram showing bit allocation of a condition branch instruction of a log format in the data processor according to the embodiment 2 of the present invention.
Figure 37:
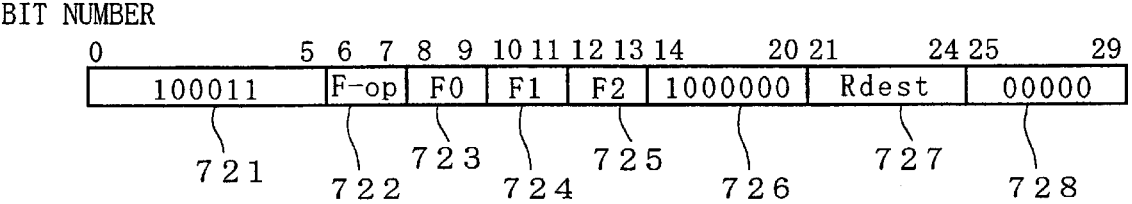
FIG. 37 is an explanatory diagram showing bit allocation of a condition set instruction of a log format in the data processor according to the embodiment 2 of the present invention.

FIG. 35 shows instruction bit allocation of an execution condition specifying instruction. There are an F0 field 703, an F1 field 704 and an F2 field 705 as the execution condition, and the three flags of the F0 flag 47, the F1 flag 48 and the F2 flag 50 can be referred to as the execution condition. A composite condition (OR, AND or exclusive-OR) of three flags is specifiable at the maximum. A composite operation is specified in a flag operation (F-op) field 702. FIG. 36 shows bit allocation of a condition branch instruction, and FIG. 37 shows bit allocation of a condition set instruction. For both instructions, there are F2 fields 715 and 725 so that the F2 flag 50 can be referred to as the execution condition, similarly to the execution condition specifying instruction. Allocation of F-op fields 712 and 722, F0 fields 713 and 723, F1 fields 714 and 724 and F2 fields 715 and 725 is identical to the execution condition specifying instruction of FIG. 35.

A basic structure related to execution condition determination in the data processor of the embodiment 2 is a structure similar to the structure of the embodiment 1 shown in FIG. 27. However, information related to the F2 flag 50 is added as information transferred between the respective units, and hence the structure in each block is somewhat different.

Figure 38:
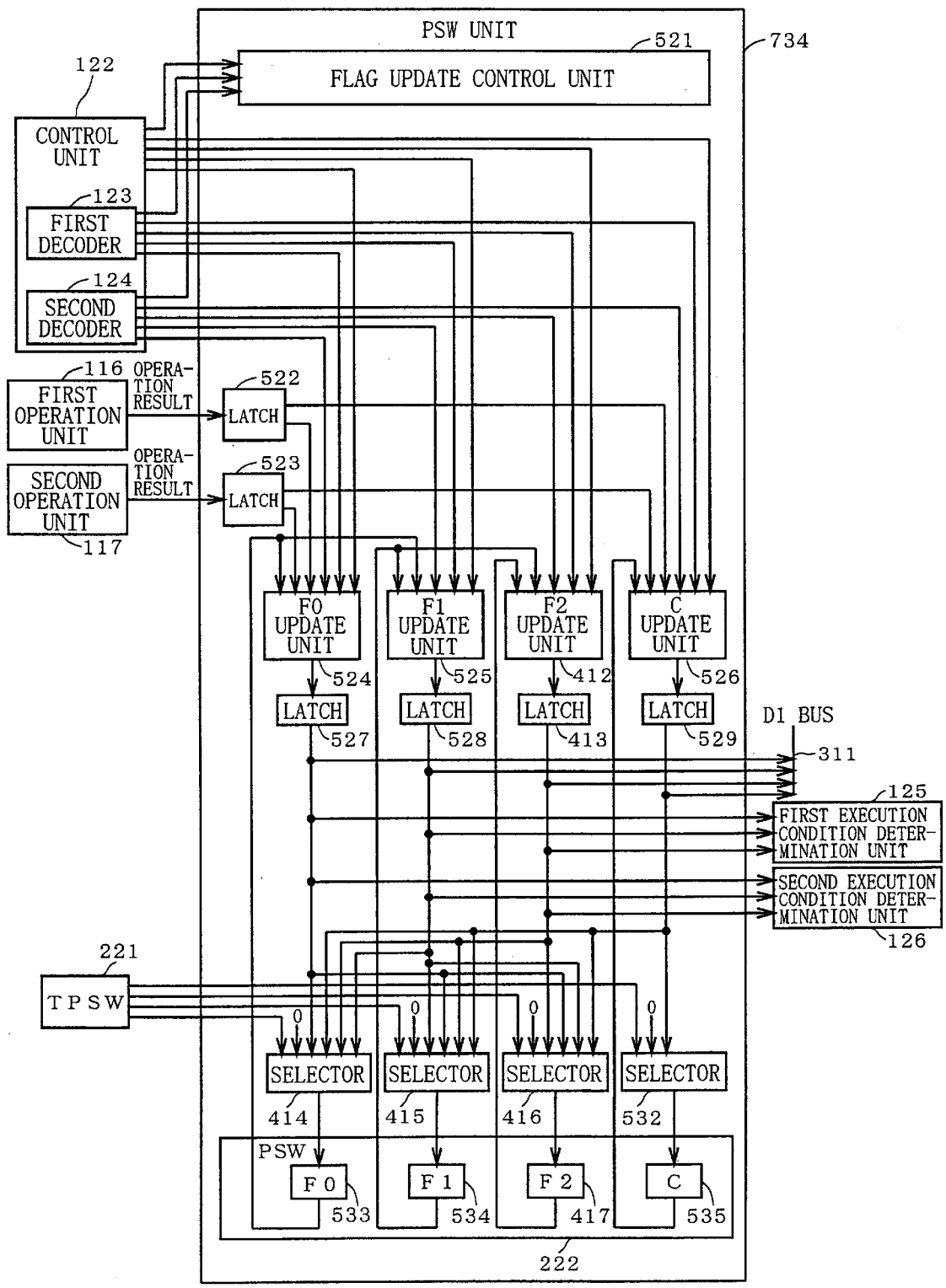
FIG. 38 is a model diagram showing in detail a part performing updating of flags and execution condition determination in a control unit of the data processor according to the embodiment 2 of the present invention.

FIG. 38 is a model diagram showing the internal structure of a PSW unit 734 in the data processor of the embodiment 2. The PSW unit 734 corresponds to the PSW unit 171 of the embodiment 1 shown in FIG. 20. As shown in the figure, an F2 update unit 412, a latch 413, a selector 416 and an F2 latch 417 which are units related to the F2 flag 50 are added and the selectors 530 and 531 are replaced with selectors 414 and 415. A transfer path from a latch 534 to the F2 update unit 412 is provided, so that the value of the F0 flag 47 before updating is copied into the F1 flag 48 while the value of the F1 flag 48 before updating is copied into the F2 flag 50 when updating the F0 flag 47 in a comparison instruction or the like.

A control unit 122, a first decoder 123, a second decoder 124, a TPSW latch 221, a PSW 222, a first execution condition determination unit 125 and a second execution condition determination unit 126 correspond to the control unit 112, the first decoder 113, the second decoder 114, the TPSW latch 167, the PSW 172, the first execution condition determination unit 601 and the second execution condition determination unit 602 of the embodiment 1 respectively.

Information related to the F0 flag 47, the F1 flag 48 and the F2 flag 50 is outputted from latches 527, 528 and 413 to the first execution condition determination unit 125 and the second execution condition determination unit 126.

Although not illustrated in FIG. 38, the first decoder 123 and the second decoder 124 of the control unit 122 output an execution condition related to the F0 flag 47, the F1 flag 48 and the F2 flag 50 to the first execution condition determination unit 125 and the second execution condition determination unit 126, similarly to the control unit 112 of the embodiment 1 shown in FIG. 27. The first execution condition determination unit 125 and the second execution condition determination unit 126 perform generation of an execution inhibit signal, a condition determination result signal and the like on the basis of the specified condition and the values of the flags.

The data processor of the embodiment 2 having such a structure is capable of execution condition specification with a composite condition of the three flags consisting of the F0 flag 47, the F1 flag 48 and the F2 flag 50. Similarly to the data processor of the embodiment 1, further, a data processor having low power consumption can be obtained at a low cost with high performance. Further, the data processor of the embodiment 3 is capable of referring to a complex condition or an old condition again and can also reduce a condition branch instruction or an operation such as saving of an old comparison result, whereby the performance further improves. However, control is slightly complicated as compared with the data processor of the embodiment 1.

While the case where three flags are influenced in a comparison instruction has been described with reference to the data processor of the embodiment 2, it is possible to extend this idea for forming a data processor in the case where four or more flags are influenced, as a matter of course.

<Embodiment 3.>

Figure 39:
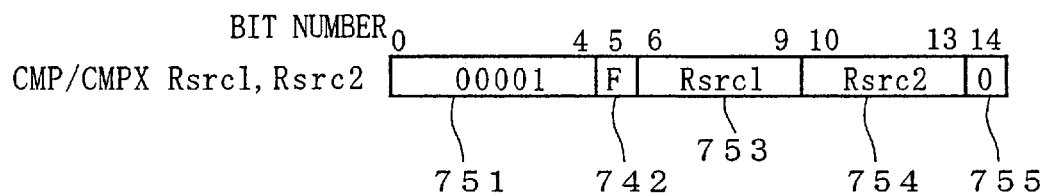
FIG. 39 is an explanatory diagram showing bit allocation of a comparison instruction of a short format in a data processor according to an embodiment 3 of the present invention.

While the case of unconditionally performing updating of three flags in comparison instruction processing has been shown in the embodiment 2, it may comprise two types of instructions of an instruction updating the flags other than the F0 flag 47 and an instruction not performing updating when updating the flags in the comparison instruction. As an example, FIG. 39 shows bit allocation of a comparison instruction of a short format. In a CMP instruction, it updates only the F0 flag 47 depending on an operation result, and in a CMPX instruction, it updates the F0, F1 and F2 flags 47, 48 and 50. The CMP instruction and the CMPX instruction are distinguished by "0"/"1" of an F field 752.

The basic structure is substantially identical to the data processor (FIG. 27, FIG. 38) of the embodiment 2. As elements, processing contents of a first decoder 112 (123), a second decoder 114 (124) and a flag update control unit 521 are different.

A flag update control unit (corresponding to 512) of a data processor according to an embodiment 3 is different from the data processor of the embodiment 2 in a point that a function of inhibiting updating of the F1 flag 48 and the F2 flag 50 in updating of the F0 flag 47 is comprised. For example, an F0 update unit 524, an F1 update unit 525 and an F2 update unit 412 are so controlled that the F0 update unit 524 generates an update value of the F0 flag 47 on the basis of an operation result and the F1 update unit 525 and the F2 update unit 412 output the values of an F1 latch 534 and an F2 latch 417 before updating as such respectively in CMP instruction execution, while the F0 update unit 524 generates the update value of the F0 flag 47 on the basis of the operation result and the F1 update unit 525 and the F2 update unit 412 output the values of the F0 latch 533 and the F1 latch 534 before updating respectively in CMPX instruction execution.

The data processor of the embodiment 3 can intentionally hold a comparison result necessary for performing condition execution only in a specific flag, whereby an operation such as saving of an old comparison result can be reduced and the performance improves by this as compared with the data processor of the embodiment 2. However, an instruction code for indicating to update/not update the specific flag is consumed additionally by one bit in a part of an instruction updating the flag. When there are three or more flag bits, however, this is not much as compared with a bit number specifying which flag to update in a comparison instruction.

<Embodiment 4.>

Figure 40:
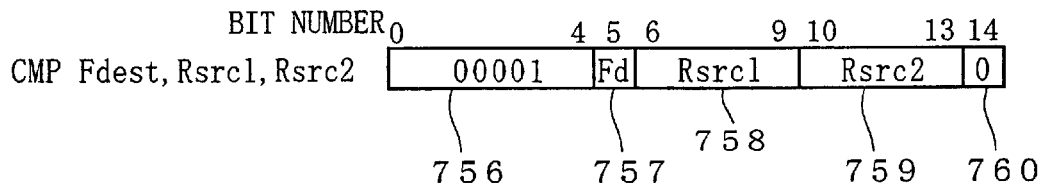
FIG. 40 is an explanatory diagram showing bit allocation of a comparison instruction of a short format in a data processor according to an embodiment 4 of the present invention.
Figure 41:
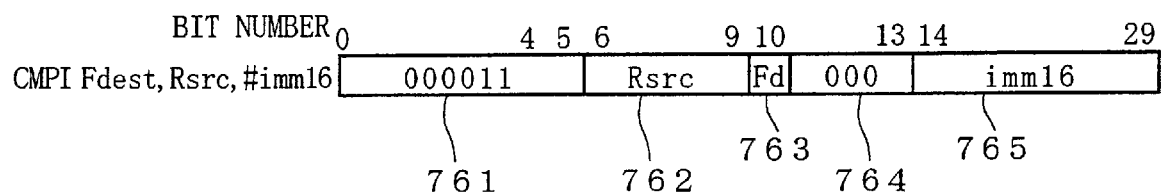
FIG. 41 is an explanatory diagram showing bit allocation of a comparison instruction of a long format in the data processor according to the embodiment 4 of the present invention.

A data processor according to an embodiment 4 explicitly specifies a set flag on the basis of a comparison result in a comparison instruction. The basic structure is identical to the data processor of the embodiment 1. Description is made while noting difference between the same and the data processor of the embodiment 1. FIG. 40 shows bit allocation of a comparison instruction of a short format, and FIG. 41 shows bit allocation of a comparison instruction of a long format. Each indicates whether to update an F0 flag 47 or to update an F1 flag 48 in an Fd field 757 or 763.

Figure 42:
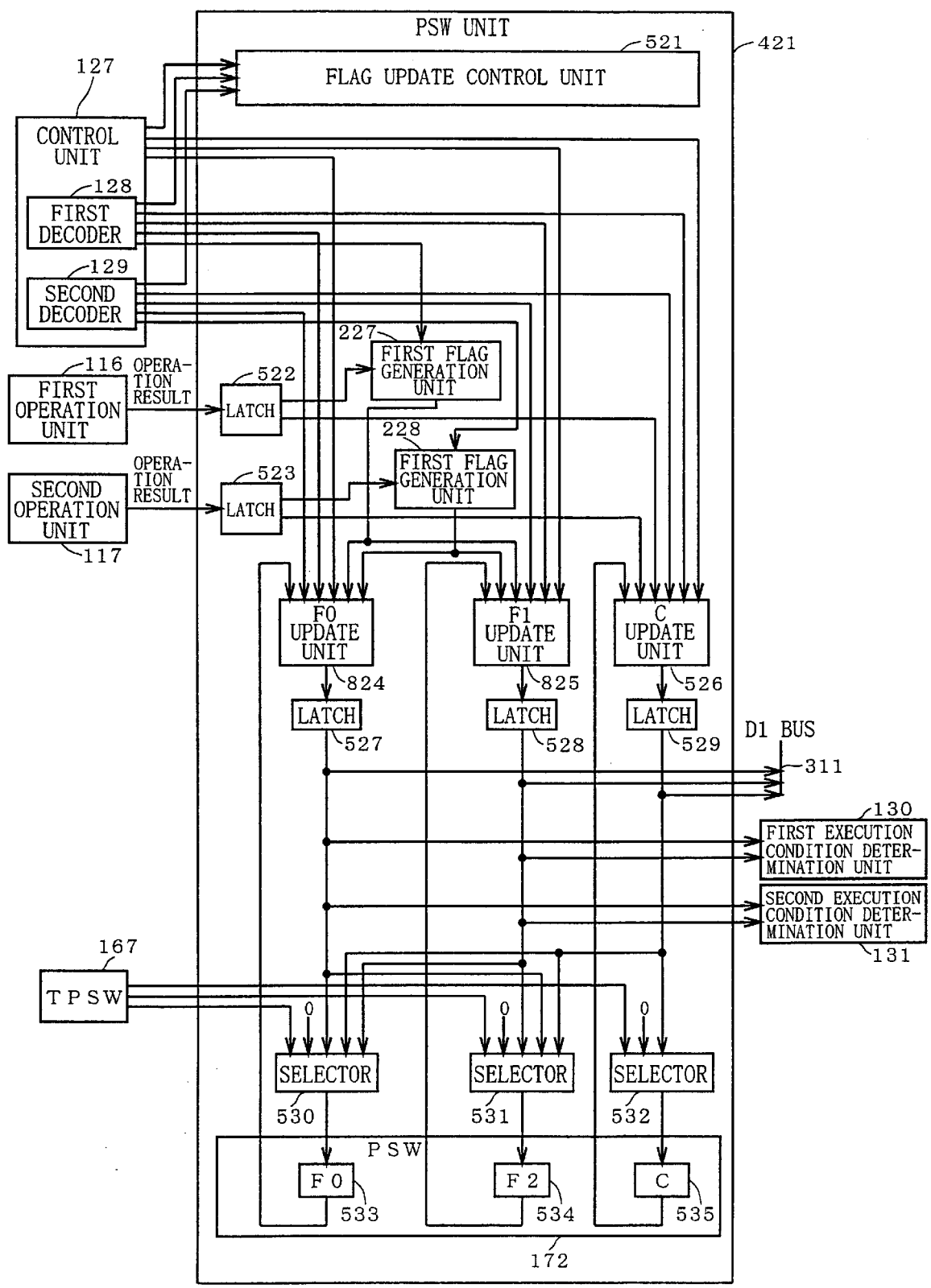
FIG. 42 is a block diagram showing in detail a part performing flag updating of a PSW unit in the data processor according to the embodiment 4 of the present invention.

A basic structure related to execution condition determination is similar to the structure of the embodiment 1 shown in FIG. 27. FIG. 42 is a model diagram showing the internal structure of a PSW unit 421 of the data processor of the embodiment 4. The PSW unit 421 corresponds to the PSW unit 171 of the embodiment 1 shown in FIG. 20.

Further, a control unit 127, a first decoder 128, a second decoder 129, a first execution condition determination unit 130, a second execution condition determination unit 131, an F0 update unit 824 and an F1 update unit 825 correspond to the control unit 112, the first decoder 113, the second decoder 114, the first execution condition determination unit 601, the second execution condition determination unit 602, the F0 update unit 524 and the F1 update unit 525 of the embodiment 1 respectively.

As shown in the figure, a first flag generation unit 227 and a second flag generation unit 228 are added, and only the value of an F1 latch 534 is inputted in the F1 update unit 825.

The first flag generation unit 227 supplies an update value to the F0 update unit 824 or the F1 update unit 825 on the basis of a decoded result of the first decoder 128 and an operation result of an first operation unit 116 through a latch 522. The second flag generation unit 228 supplies an update value to the F0 update unit 824 or the F1 update unit 825 on the basis of a decoded result of the second decoder 129 and an operation result of a second operation unit 117 through a latch 523.

On the basis of the decoded result of the first decoder 128, the first flag generation unit 227 outputs the update value to a latch 527 through the F0 update unit 824 when setting the operation result of the first operation unit 116 in the F0 flag 47, while outputting the update value to a latch 528 through the F1 update unit 825 when setting an execution result of the first operation unit 116 to the F0 flag 47. On the basis of the decoded result of the second decoder 129, on the other hand, the second flag generation unit 228 outputs the update value to the latch 527 through the F0 update unit 824 when setting the operation result of the second operation unit in the F0 flag 47, while outputting the update value to the latch 528 through the F1 update unit 825 when setting the execution result of the first operation unit 116 in the F0 flag 47.

Thus, the data processor of the embodiment 4 intentionally structures a comparison result necessary for performing condition execution holdable in a specific flag, and hence can readily implement reference to an old comparison result or setting of a composite condition of flags including the old comparison result. Consequently, the performance further improves as compared with the data processor of the embodiment 1 since an operation such as saving of the old comparison result or an operation for performing comparison again can be reduced.

In addition, it is also possible to execute two comparison instructions updating different flags in parallel in the first operation unit 116 and the second operation unit 117, and it also attains an effect capable of determining plural condition determination in a shorter time. However, it is necessary to necessarily provide an area for specifying at least the flags in an instruction for updating the flags in an instruction code.

<Embodiment 5.>

Figure 43:
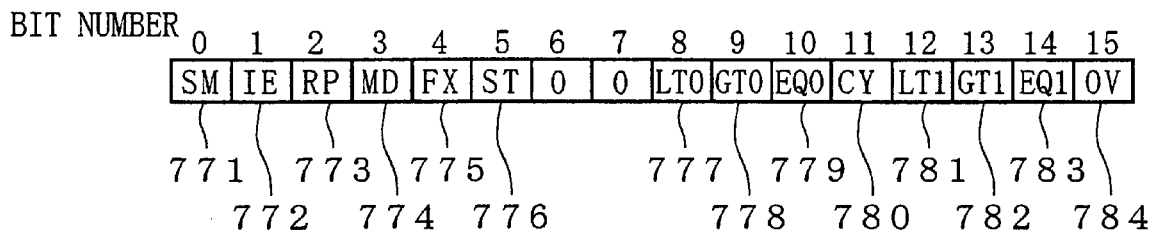
FIG. 43 is an explanatory diagram showing the structure of a processor status word of a data processor according to an embodiment 5 of the present invention.

A data processor according to an embodiment 5 is now described. The data processor of the embodiment 5 sets a flag group consisting of a plurality of flags in accordance with a plurality of conditions in single execution of a comparison instruction. FIG. 43 shows a processor status word. An SM bit 771, an IE bit 772, an RP bit 773, an MD bit 774, an FX bit 775 and an ST bit 776 are substantially identical to the processor status word employed in the data processor of the embodiment 1, though there are those having different bit positions. An LT0 flag 777 and an LT1 flag 781 are flags indicating that a first operand of the comparison instruction is less than a second operand, a GT0 flag 778 and a GT1 flag 782 are flags indicating that the first operand of the comparison instruction is greater than the second operand, an EQ0 flag 779 and an EQ1 flag 783 are flags indicating that the first operand and the second operand of the comparison instruction match, a CY flag 780 is a flag indicating carry/borrow in addition/subtraction, and an OV flag 784 is a flag indicating overflow in an arithmetic operation. The LT0 flag 777, the GT0 flag 778 and the EQ0 flag 779 are collectively referred to as a flag group 0, and the LT1 flag 781, the GT1 flag 782 and the EQ1 flag 783 are collectively referred to as a flag group 1.

In the data processor of the embodiment 5, the flag group is updated in response to the comparison result of the comparison instruction. In a "CMP Rsrc1, Rsrc2" instruction comparing two values as signed numbers, for example, a value held in Rsrc1 and a value held in Rsrc2 are compared and three flags are set. It sets "1" in the LT0 flag 777 when the value (first operand) held in Rscr1 is less than the value (second operand) held in Rscr2 while setting "0" in other case. It sets "1" in the GT0 flag 778 when the value held in Rsrc1 is greater than the value held in Rsrc2 while setting "0" in other case. It sets "1" in the EQ0 flag 779 when the value held in Rsrc1 and the value held in Rsrc2 match, while setting "0" in other case. Further, each bit of the flag group 0 is copied into the flag group 1. Thus, only the holding mode for operation results is different and the basic idea is not different from the data processor of the embodiment 1.

Figure 44:
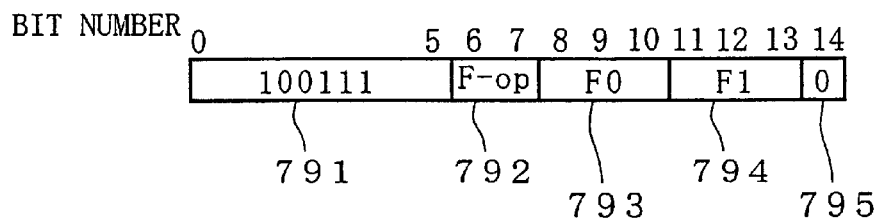
FIG. 44 is an explanatory diagram showing bit allocation of an execution condition specifying instruction in the data processor according to the embodiment 5 of the present invention.
Figure 45:
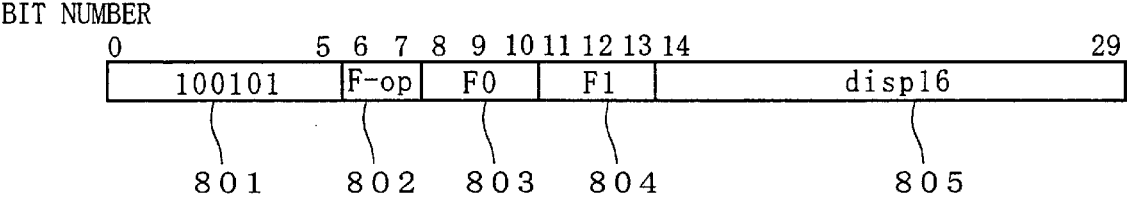
FIG. 45 is an explanatory diagram showing bit allocation of a condition branch instruction of a long format in the data processor according to the embodiment 5 of the present invention.
Figure 46:
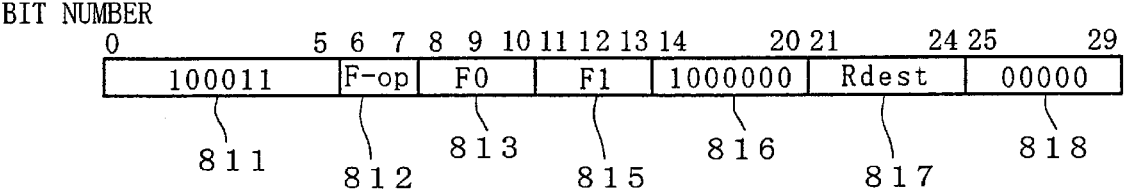
FIG. 46 is an explanatory diagram showing bit allocation of a condition set instruction of a long format in the data processor according to the embodiment 5 of the present invention.

Even if taking such a holding mode for operation results, a condition execution instruction, an execution condition specifying instruction and a condition set instruction effectively operate. FIG. 44 shows bit allocation of the execution condition specifying instruction. An F-op field 792 specifies a composite condition (OR, AND or exclusive-OR) of conditions for the two flag groups. An F0 field 793 specifies the condition related to the flag group 0 and an F0 field 794 specifies the condition related to the flag group 1 respectively. In an EXEEQAEQ instruction (x=EQ, y=EQ), for example, the condition is satisfied when comparison results of twice both match. The basic idea is identical to the data processor of the embodiment 1. FIG. 45 shows bit allocation of a condition branch instruction of a long format, and FIG. 46 shows bit allocation of a condition set instruction of a long format. Execution of a branch or setting of values is performed in the same condition as the execution condition specifying instruction in each. Referring to FIG. 45, 801 to 805 are an operation code, an F-op field, a flag group 0 field, a flag group 1 field and a disp16 field respectively. Referring to FIG. 46, 811 to 817 are an operation code, an F-op field, a flag group 0 field, a flag group 1 field, an operation code and an Rdest field.

Figure 47:
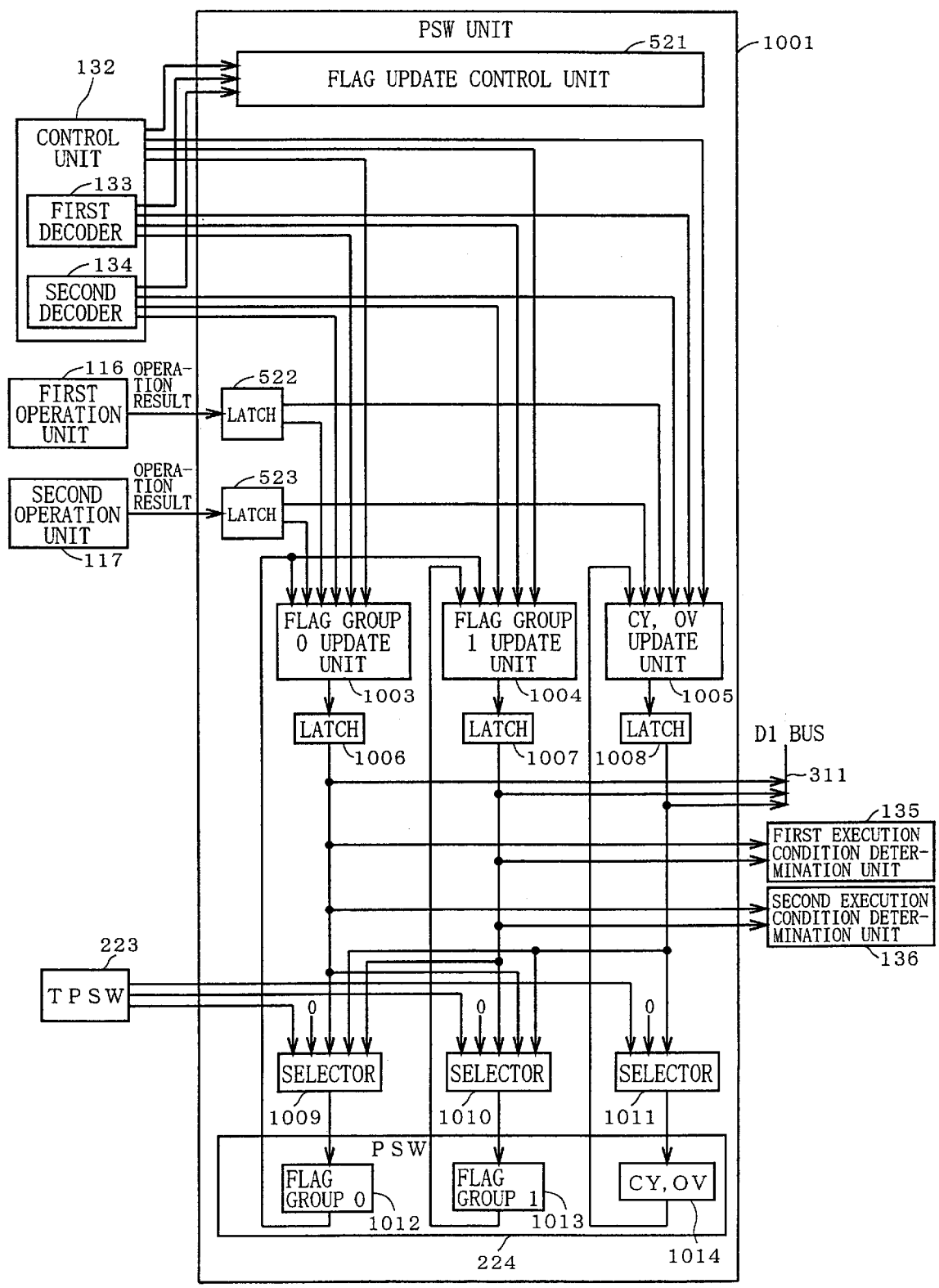
FIG. 47 is a block diagram showing in detail a part performing flag updating of a PSW unit in the data processor according to the embodiment 5 of the present invention.

The basic structure related to execution condition determination is a structure similar to the structure of the embodiment 1 shown in FIG. 27. FIG. 47 is a model diagram showing the internal structure of a PSW unit 1001 of the data processor of the embodiment 1. The PSW unit 1001 corresponds to the PSW unit 171 of the embodiment 1 shown in FIG. 20.

Referring to FIG. 47, a flag group 0 update unit 1003, a flag group 1 update unit 1004 and a CY, OV update unit 1005 correspond to the F0 update unit 524, the F1 update unit 525 and the C update unit 526 of the embodiment 1 shown in FIG. 20 respectively, latches 1006 to 1008 correspond to the latches 527 to 529 of the embodiment 1, selectors 1009 to 1011 correspond to the selectors 530 to 532 of the embodiment 1 respectively, and a flag group 0 latch 1012 and a flag group 1 latch 1013 correspond to the F0 latch 533 and the F1 latch 534 of the embodiment 1 respectively. Namely, only the flag number held by a single comparison result increases, and the basic structure and operation are similar to the embodiment 1.

A control unit 132, a first decoder 133, a second decoder 134, a first execution condition determination unit 135 and a second execution condition determination unit 136 correspond to the control unit 112, the first decoder 113, the second decoder 114, the TPSW latch 167, the PSW 172, the first execution condition determination unit 601 and the second execution condition determination unit 602 of the embodiment 1 respectively.

In processing of a flag update instruction updating the flags with the comparison result or the like, a 3-bit update value of the flag group 0 is generated in the flag group 0 update unit 1003 on the basis of an operation result and outputted to the latch 1006. In this case, further, the value of the flag group 0 before updating outputted from the flag 0 latch 1012 is outputted from the flag group 1 update unit 1004 and outputted to the latch 1007. Thus, the value of the flag group 0 before updating is transferred to the flag group 1 in updating of the flag group 0, similarly to the embodiment 1.

The contents of the latches 1006 and 1007 are outputted to the first execution condition determination unit 135 and the second execution determination unit 136. The first execution condition determination unit 135 and the second execution condition determination unit 136 perform generation of an execution inhibit signal and a condition determination result signal on the basis of execution condition information outputted from the first decoder 133 and the second decoder 134 of the control unit 132 respectively and information of the flag group 0 and the flag group 1 outputted from the PSW unit 1001 similarly to the control unit 112 of the embodiment 1 shown in FIG. 27, although not illustrated in FIG. 47. Also in the data processor of the embodiment 5 taking such a holding mode for the flag groups (a plurality of flags), a condition execution instruction, a condition set instruction and an execution condition specifying instruction can be implemented similarly to the embodiment 1.

While the data processor of the embodiment 5 holds a large-small comparison result by a comparison instruction with three flags to simplify determination of the execution condition, it may hold only the EQ flag and the LT flag. In this case, it may determine that "the LT flag is 1 or the EQ flag is 1" when the condition is LE (less or equal), and may determine that "the LT flag is 0 and the EQ flag is 0" when the condition is GT (greater than).

The data processor of the embodiment 5 can hold and update a plurality of comparison results by the plurality of flags in the flag groups without specifying the flag group updated with a flag update instruction such as a comparison instruction. Further, it can specify the condition for the condition execution instruction, the execution condition specifying instruction or the condition set instruction with a single condition or a composite condition of two comparison results. Thus, the data processor of the embodiment 5 has effects capable of implementing the same functions as the data processor of the embodiment 1 and capable of improving the performance at a low cost similarly to the data processor of the embodiment 1.

In addition, it is possible for the data processor of the embodiment 5 to perform processing rendering a more sophisticated condition set instruction executable with a complex composite condition formed by the first and second flag groups.

<Embodiment 6.>

Figure 48:
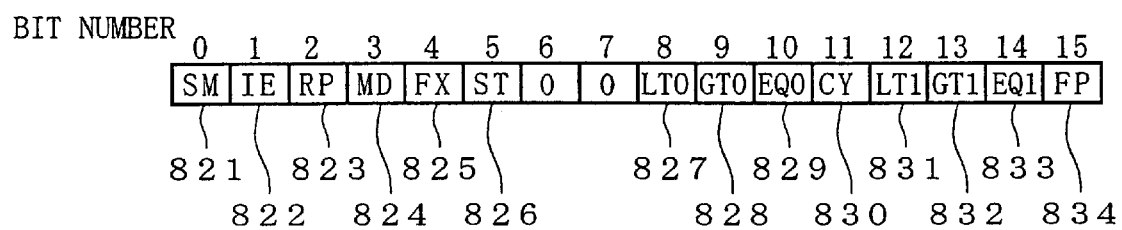
FIG. 48 is a diagram showing the structure of a processor status word of a data processor according to an embodiment 6 of the present invention.

FIG. 48 shows a processor status word (PSW) employed in a data processor of an embodiment 6. The point different from the processor status word (PSW) of the data processor of the embodiment 5 resides in a point that a bit 15 is a flag pointer (FP) bit 834. This data processor selects and updates a comparison result by a comparison instruction in accordance with the value of the FP bit 834 either one of two flag groups, dissimilarly to the data processor of the embodiment 5. The flag pointer (FP) 834 changes in toggle every time a flag is updated.

A plurality of comparison results can be held without specifying a flag updated in the comparison instruction by thus performing controlling, whereby it has the same effects as the data processor of the embodiment 1 or the embodiment 5. An LT0 flag 827, a GT0 flag 828 and an EQ0 flag 829 are collectively referred to as a flag group 0, and an LT1 flag 831, a GT1 flag 832 and an EQ1 flag 833 are collectively referred to as a flag group 1.

Figure 49:
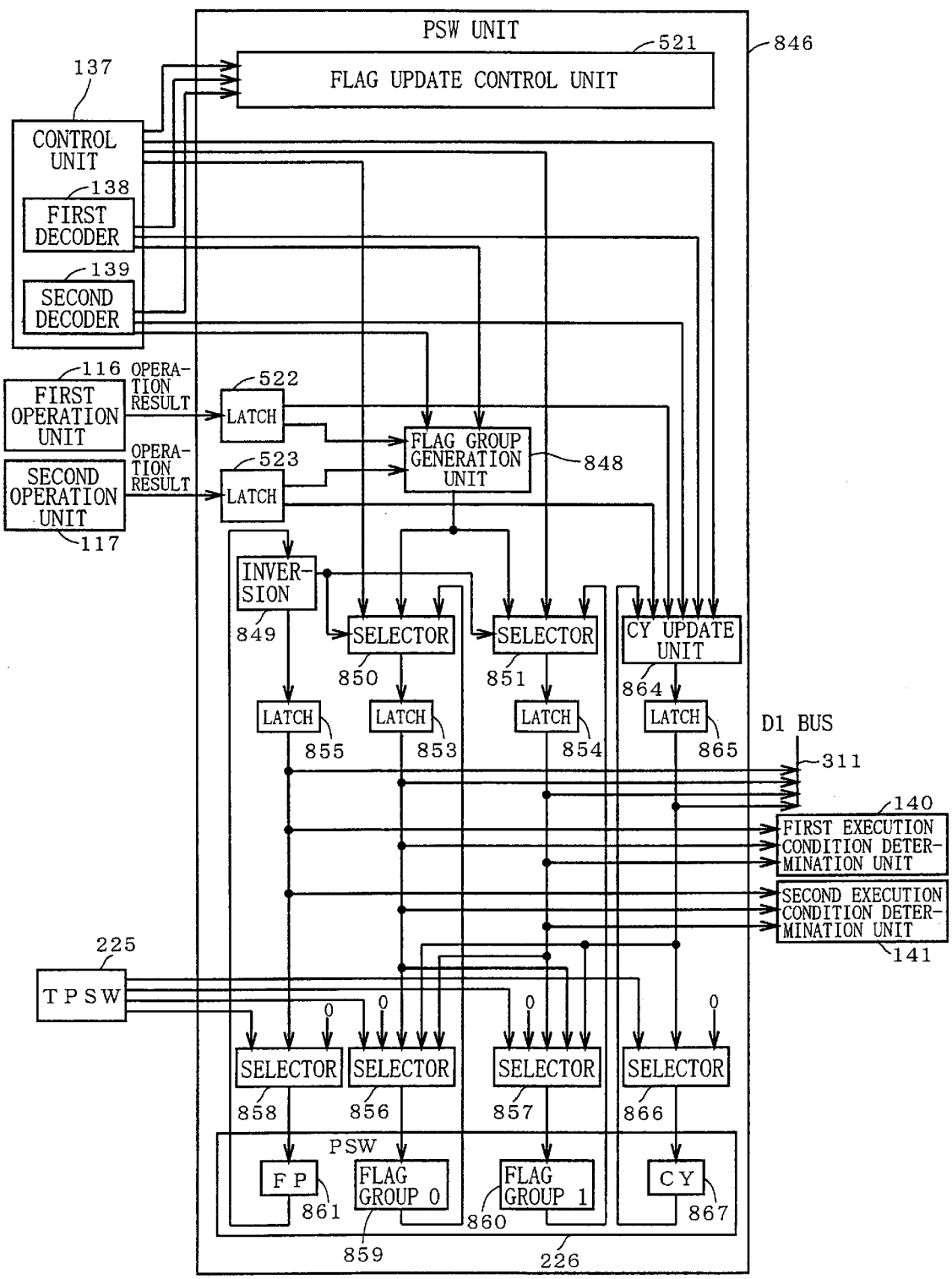
FIG. 49 is a block diagram showing in detail a part performing flag updating of a PSW unit in the data processor according to the embodiment 6 of the present invention.

A basic structure related to execution condition determination is a structure similar to the structure of the embodiment 1 shown in FIG. 27. FIG. 49 is a model diagram showing the internal structure of a PSW unit 846 in the data processor of the embodiment 6. The PSW unit 846 corresponds to the PSW unit 171 of the embodiment 1 shown in FIG. 20.

Latches 859, 860 and 861 hold the flag group 0, the flag group 1 and the FP bit 834 respectively. A flag group generation unit 848 generates update data for the flags on the basis of operation results of respective ones of a first operation unit 116 and a second operation unit 117 held in latches 522 and 523 respectively and decoded results of respective ones of a first decoder 113 and a second decoder 114. An inversion circuit 849 inverts the value of an FP bit latch 861 and outputs the same to a latch 855, while outputting the same to selectors 850 and 851.

The selectors 850 and 851 select updated data on the basis of the output of the inversion circuit 849. When the output of the inversion circuit 849 indicates the flag group 0 (flag group on a side reflecting the comparison result), the selector 850 outputs the update data for the flags from the flag group generation unit 848 to a latch 853, and the selector 851 outputs data of itself before updating which is the output of the flag group 1 latch 860 to a latch 854. When the output of the inversion circuit 849 indicates the flag group 1, the selector 851 outputs the update data for the flags from the flag group generation unit 848 to the latch 854, and the selector 850 outputs the data of itself before updating which is the output of the flag group 0 latch 859 to the latch 853.

Update values of the flag group 0, the flag group 1 and the FP bit 834 are fetched in the latches 853, 854 and 855 respectively and outputted to each unit through a D1 bus 311. Through selectors 856, 857 and 858, further, the values of the flag group 0 latch 859, the flag 1 latch 860 and the FP bit latch 861 are updated. As described above, the FP bit is inverted by the inversion circuit 849 in advance of updating of the flag group 0 and the flag group 1. Therefore, it follows that the value of the FP bit 834 held in the FP bit latch 861 indicates the flag group on the side updated immediately before.

A CY update unit 864, a latch 865, a selector 866 and a CY latch 867 correspond to the C update unit 526, the latch 529, the selector 532 and the C latch 535 of the embodiment 1 shown in FIG. 20 respectively, and perform similar operations.

Further, a control unit 137, a first decoder 138, a second decoder 139, a TPSW latch 225, a PSW 226, a first execution condition determination unit 140 and a second execution condition determination unit 141 correspond to the control unit 112, the first decoder 113, the second decoder 114, the TPSW latch 167, the PSW 172, the first execution condition determination unit 601 and the second execution condition determination unit 602 of the embodiment 1 respectively.

The first execution condition determination unit 140 and the second execution condition determination unit 141 perform condition determination (refer to FIG. 27 and FIG. 49) on the basis of decoded results (execution conditions) of the first decoder 138 and the second decoder 139 and the values of the latches 853, 854 and 855. Updating of the flags is performed on the basis of operation results, and hence performed in timing up to reference in next execution after execution of the instruction in an execution stage. When instructions are continuously processed, it follows that updating of the flags in the flag group generation unit 848 is performed on the basis of a decoded result of an instruction executed immediately before the instruction subjected to condition determination.

While the flag groups are only in two sets in the aforementioned example, the flag groups may be in three or more sets. In this case, it is necessary to increase the bit number of the pointer in response to the number of the flag groups. Further, it is also applicable to the case where each flag group is formed by one bit as shown in the embodiment 1. While the FP bit 834 is updated (inverted) in advance of updating of the flag group in the embodiment 6, the same may be formed to be updated after updating of the flag group.

By taking such structure/control of the data processor of the embodiment 6, a plurality of operation results can be held without explicitly specifying flags storing the operation results in a comparison instruction similarly to the embodiment 1. Further, the data processor of the embodiment 6 has such an advantage that control of updating is simplified when the number of the flags is large. However, it is also necessary to refer to the value of the FP bit 834 in condition determination, and hence control of the execution condition determination units 140 and 141 is slightly complicated.

The data processor of the embodiment 6 can determine all large-small comparison results by single execution of a comparison instruction and hence the performance improves by this although the held flags and execution conditions increase. However, control of hardware is slightly complicated. As to the comparison instruction, it may not have an instruction every compare condition, whereby the instruction number of the comparison instruction can be reduced. When allocating a condition branch instruction or a condition set instruction as an instruction of a short format, however, fields specifying the execution condition increase.

Further, the data processor of the embodiment 6 can specify the flag group to be updated by the value of the FP bit 834, whereby it is not necessary to provide an area specifying the flags to be updated in a flag update instruction such as a comparison instruction facilitating updating of the flags.

<Embodiment 7.>

A data processor of an embodiment 7 renders four sub-instructions (operations) executable in parallel.

Figure 50:
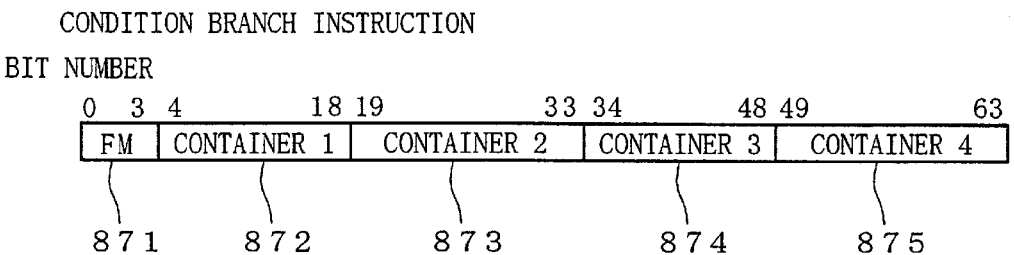
FIG. 50 is a diagram showing an instruction format employed in a data processor according to an embodiment 7 of the present invention.

FIG. 50 shows an instruction format processed by the data processor of the embodiment 7. An FM bit 871 indicating a format of four bits performs format specification similar to the FM bit 51 (see FIG. 3) employed in the data processor of the embodiment 1 with two bits each as to combination of a container 1 of 872 and a container 2 of 873 and combination of a container 3 of 874 and a container 4 of 875. The respective containers 872 to 875 are expressed in 15 bits.

Figure 51:
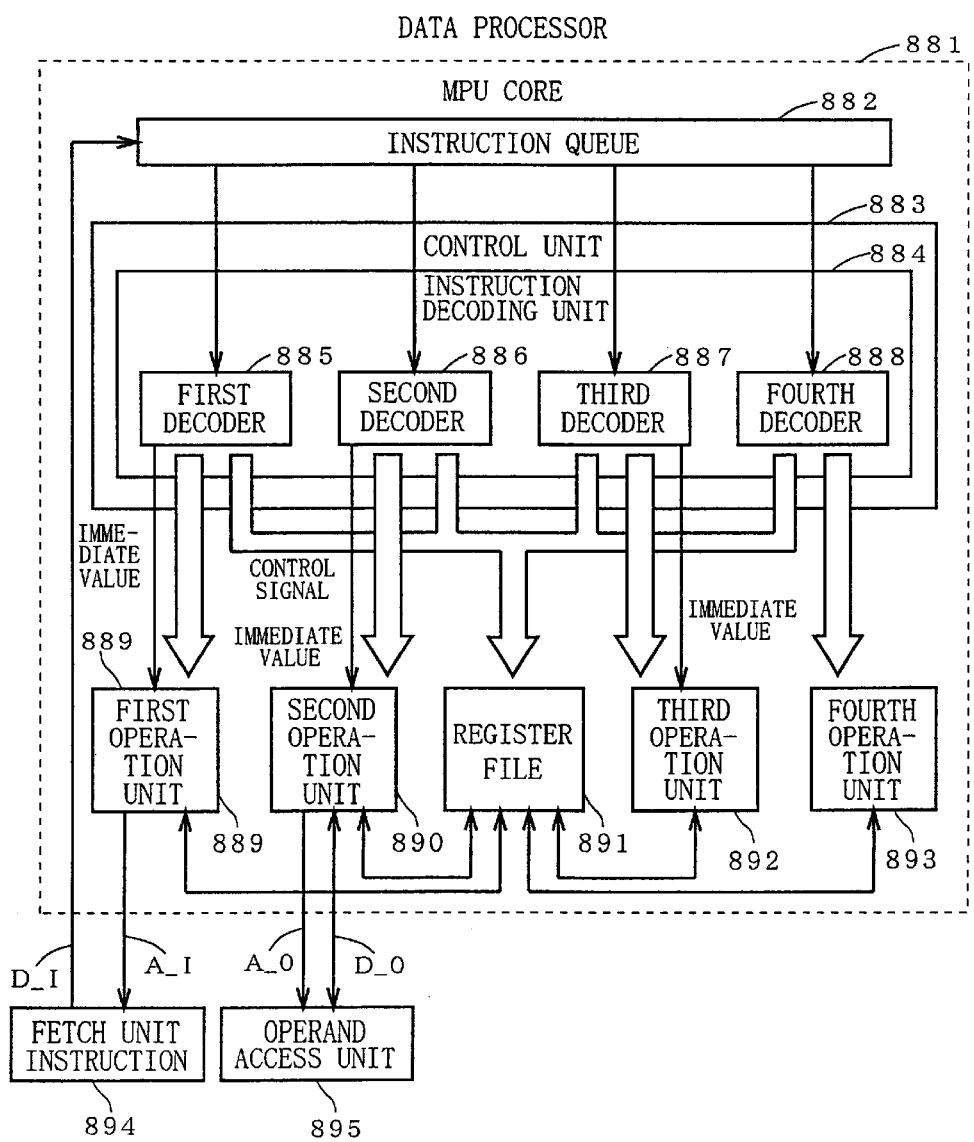
FIG. 51 is a block diagram showing the structure of the data processor according to the embodiment 7 of the present invention.

FIG. 51 is a block diagram showing the internal structure of the data processor of the embodiment 7. Referring to the figure, 881 is an MPU core. An instruction fetch unit 894 and an operand access unit 895 perform actions substantially identical to the instruction fetch unit 102 and the operand access unit 104 in the data processor of the embodiment 1 shown in FIG. 8. The remaining blocks such as a bus interface unit are not illustrated here.

The MPU core 881 consists of an instruction queue 882, a control unit 883, a register file 891, a first operation unit 889, a second operation unit 890, a third operation unit 892 and a fourth operation unit 893. The instruction queue 882 is an instruction buffer of FIFO control holding two instructions of 64 bits at the maximum. The first operation unit 889 comprises an incrementor, a decrementor, an adder and the like, and performs management of a PC value, calculation of a branch destination address, repeat control, arithmetic operation, comparison, transfer and the like. The second operation unit 890 comprises an ALU, a alignment circuit and the like, and performs operand access, updating of a pointer, arithmetic logic operation, transfer, comparison, holding-setting of loaded data and holding-setting of stored data. The third operation unit 892 comprises an ALU, a shifter and the like, and performs operation processing such as arithmetic logic operation, transfer, comparison and shifting. The fourth operation unit 893 comprises a product-sum arithmetic unit, a shifter, an accumulator and the like, and mainly performs product-sum, multiply-subtract, accumulator shifting and the like. Thus, it comprises four independent operation units 889, 890, 892 and 893 connected to the register file respectively.

An instruction decoding unit 884 is included in the control unit 883. There are four decoders in the instruction decoding unit 884. A first decoder 885 mainly decodes an operation code of the container 1 of 872, and generates control signals to the register file 891 and the first operation unit 889. Mainly a branch instruction, a repeat instruction, arithmetic operation, comparison, a transfer instruction and the like are specified in a field of the container 1 of 872. A second decoder 886 mainly decodes an operation code of the container 2 of 873, and generates control signals to the register file 891 and the second operation unit 890. Mainly a load/store instruction, an arithmetic logic operation instruction, a transfer instruction, a comparison instruction and the like are specified in a field of the container 2 of 873. A third decoder 887 mainly decodes an operation code of the container 3 of 874, and generates control signals to the register file 891 and the third operation unit 892. Mainly an arithmetic logic operation instruction, a transfer instruction, a comparison instruction, a shift instruction and the like are specified in a field of the container 3 of 874. A fourth decoder 888 mainly decodes an operation code of the container 4 of 875, and generates control signals to the register file 891 and the fourth operation unit 893. Mainly multiplication, product-sum/multiply-subtract operation, arithmetic logic operation, a shift instruction and the like are specified in a field of the container 4 of 875.

A processor status word PSW of the data processor of the embodiment 7 is identical to the PSW of the data processor of the embodiment 1. The same subinstructions as the data processor of the embodiment 1 are executable.

Figure 52:
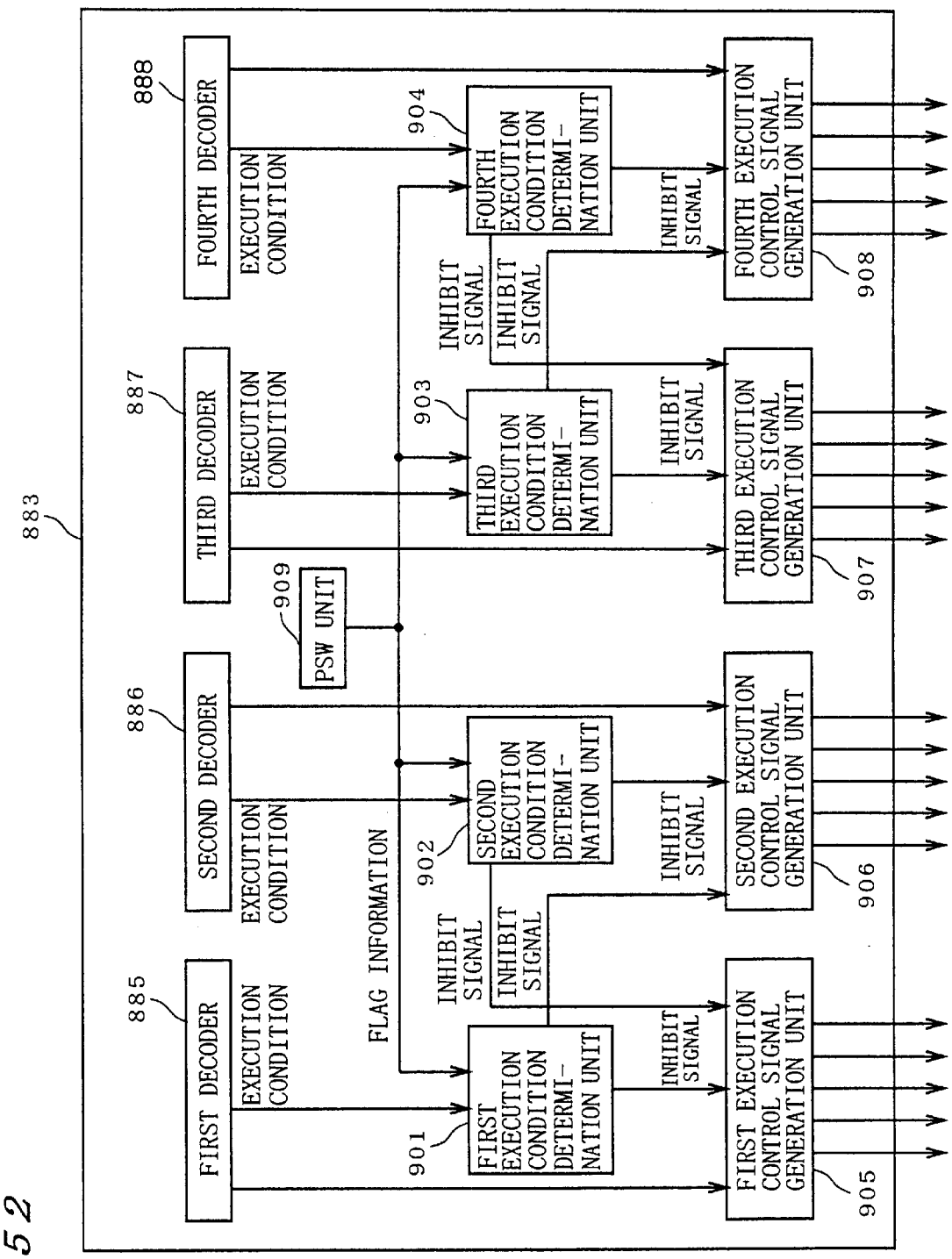
FIG. 52 is a block diagram showing details of a part related to condition determination in a control unit of the data processor according to the embodiment 7 of the present invention.

FIG. 52 shows a block diagram extracting a part related to execution condition determination in the control unit 883 of FIG. 51. The first to fourth decoders 885 to 888 output decoded results necessary for instruction execution to first to fourth execution control signal generation units 905 to 908 respectively, and output execution conditions of a condition execution instruction and an execution condition specifying instruction to first to fourth execution condition determination units 901 to 904 respectively. In the execution condition determination units 901 to 904, flag information is inputted from a PSW unit 909 (identical to the internal structure of the PSW unit 171 shown in FIG. 20) respectively.

In the execution condition determination units 901, the execution condition is determined when executing the condition execution instruction or the execution condition specifying instruction respectively. When the condition is not satisfied in condition execution instruction processing specifying the execution condition for its own instruction, an execution inhibit signal is asserted in each corresponding execution control signal generation unit, to forcibly negate a control signal performing state updating by instruction execution. When the condition is satisfied, the execution inhibition is not asserted but the instruction is executed on the basis of a decoded result. The execution condition specifying instruction each specifies an execution condition for a pair of instructions. When the condition is not satisfied in execution condition specifying instruction processing, the execution inhibit signal is asserted in an execution control signal generation unit corresponding to a pair of decoders each, to forcibly negate the control signal performing state updating by instruction execution. When the condition is satisfied, the execution inhibit signal is not asserted but the instruction is executed on the basis of the decoded result.

When the instruction processed in the first decoder 885 is an execution condition specifying instruction, for example, the first execution condition determination unit 901 performs determination of the execution condition. When the first execution condition determination unit 901 determines that the execution condition is not satisfied, it asserts an execution inhibit signal outputted to the second execution control signal generation unit 906, and inhibits execution of the instruction based on the decoded result of the second decoder 886. When the first execution condition determination unit 901 determines that the execution condition is satisfied, on the other hand, it does not assert the execution inhibit signal outputted to the second execution control signal generation unit 906 but lets the instruction based on the decoded result of the second decoder 886 executed.

When the instruction decoded in the third decoder 887 is a condition execution instruction specifying the execution condition for its own instruction, a control signal necessary for processing performed when the condition is satisfied is transmitted to the third execution control signal generation unit 907 in the third decoder 887, and the execution condition for the condition execution instruction is outputted to the third execution condition determination unit 903. The third execution condition determination unit 903 performs execution condition determination on the basis of flag information of the PSW unit 909 and the execution condition, asserts an execution inhibit signal outputted to the third execution control signal generation unit 907 and inhibits execution of the instruction based on the decoded result of the third decoder 887 when the execution condition is satisfied in the condition execution instruction. When the execution condition is not satisfied, on the other hand, the third execution condition determination unit 903 does not assert the execution inhibit signal outputted to the third execution control signal generation unit 907 but lets the instruction based on the decoded result of the third decoder 887 executed.

While the data processor of the embodiment 7 is thus capable of executing four operations in parallel, it is applicable also in the case of executing operations of a larger number in parallel by extending this technique. The FM bit 871 is not necessarily necessary, but four operations may be necessarily executed in parallel while omitting the FM bit 871. Further, format specification bits of four bits may be provided for specifying an order of executions of the instruction of each container in the four bits respectively. For example, it performs control of executing four subinstructions in parallel when all four bits are zero or executing an instruction of a container in which zero is specified in advance and thereafter executing an instruction of a container in which 1 is satisfied when zero and 1 are mixed. What order of executions is specified or what format is specified may be set at need.

Thus, the data processor of the embodiment 7 can handle that which the data processor of the embodiment 1 handles as two instructions as a single instruction. Also in the case of a high-performance VLIW processor executing such four operations in parallel, the execution condition specifying instruction effectively functions. When in two sets of two subinstructions (an instruction 1 and an execution condition specifying instruction 1 and an instruction 2 and an execution condition specifying instruction 2) reversing execution conditions for the execution condition 1 and the execution condition specifying instruction 2, it is also possible to execute the instruction 1 when the execution condition for the execution condition specifying instruction 1 is satisfied and executing the instruction 2 when the execution condition for the execution condition specifying instruction 1 is not satisfied. Thus, fine execution condition specification can be performed, whereby further performance of the data processor of the embodiment 7 further improves.

<Embodiment 8.>

As an embodiment 8, another data processor executing four operations in parallel is shown. The instruction format of the data processor of the embodiment 8 is identical to the data processor of the embodiment 7, and a basic structure is also substantially identical. In the data processor of the embodiment 8, an instruction specification of an execution condition specifying instruction and a condition determination method and an execution control signal inhibition method for implementing the same are different.

Figure 53:
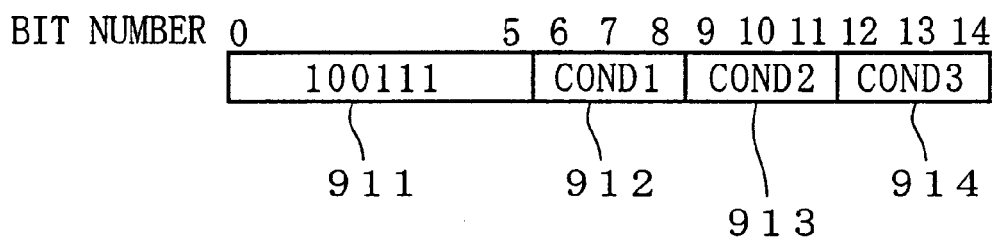
FIG. 53 is an explanatory diagram showing bit allocation of an execution condition specifying instruction in a data processor according to the embodiment 8 of the present invention.

FIG. 53 shows bit allocation of an execution condition specify (EXEC) instruction processed by the data processor of the embodiment 8. CONDn (condition, n: 1 to 3) fields specify execution conditions for corresponding subinstructions respectively. When the EXEC instruction is specified in a container 1 of 872, a COD1 field 912 specifies the execution condition for a subinstruction placed in a container 2 of 873, a COD2 field 913 specifies the execution condition for a subinstruction placed in a container 3 of 874 and a COD3 field 914 specifies the execution condition for a subinstruction placed in a container 4 of 875 respectively. When the EXEC instruction is specified in the container 2 of 873, the COD1 field 912 specifies the execution condition for the subinstruction placed in the container 1 of 872, the COD2 field 913 specifies the execution condition for the subinstruction placed in the container 3 of 874 and the COD3 field 914 specifies the execution condition for the subinstruction placed in the container 4 of 875 respectively. When the EXEC instruction is specified in the container 3 of 874, the COD1 field 912 specifies the execution condition for the subinstruction placed in the container 1 of 872, the COD2 field 913 specifies the execution condition for the subinstruction placed in the container 2 of 873 and the COD3 field 914 specifies the execution condition for the subinstruction placed in the container 4 of 875 respectively. When the EXEC instruction is specified in the container 4 of 875, the COD1 field 912 specifies the execution condition for the subinstruction placed in the container 1 of 872, the COD2 field 913 specifies the execution condition for the subinstruction placed in the container 2 of 873 and the COD3 field 914 specifies the execution condition for the subinstruction placed in the container 3 of 874 respectively. Thus, it specifies the execution conditions for the remaining three subinstructions with one condition specifying instruction. As the execution condition, AND of the two flags of an F0 flag 47 and an F1 flag 48 is specifiable only in the F0 flag 47, and inversion of each flag can also be referred to. Unconditional execution regardless of the execution condition is also specifiable.

Figure 54:
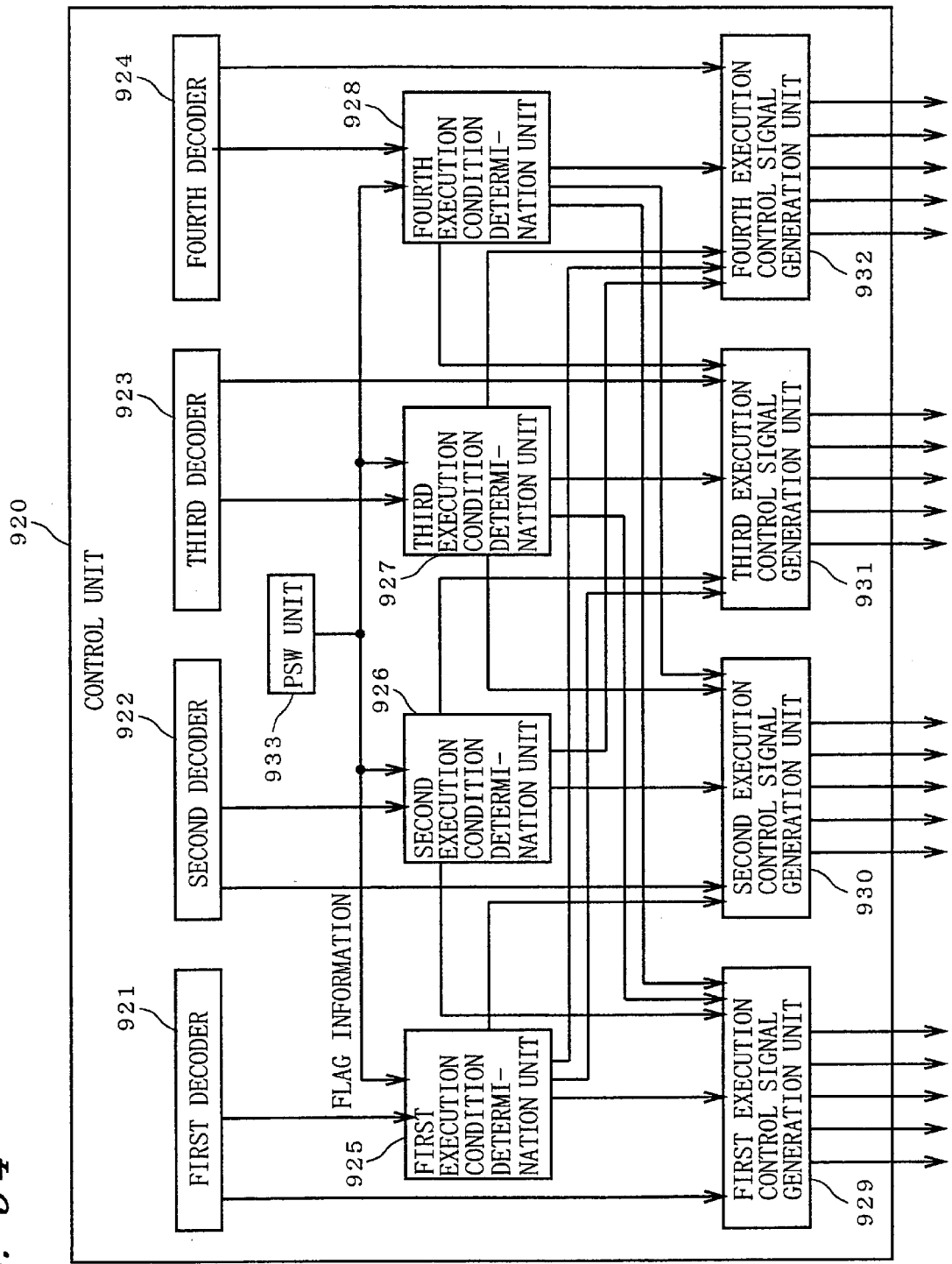
FIG. 54 is a block diagram showing details of a part related to execution condition determination of a control unit in the data processor according to the embodiment 8 of the present invention.

FIG. 54 is a block diagram extracting a part related to execution condition determination in a control unit 920, and the control unit 920 corresponds to the control unit 883 shown in FIG. 51. As shown in the figure, first to fourth decoders 921 to 924 mainly perform decoding of instructions stored in the container 1 to the container 4 of 872 to 875 respectively, and output decoded results including information necessary for executing the instructions to first to fourth execution control signal generation units 929 to 932 respectively. The first to fourth decoders 921 to 924 transmit execution conditions to first to fourth execution condition determination units 925 to 928 respectively.

In execution condition specifying instruction processing, the corresponding execution condition determination unit performs determination of the condition specified in each CONDs field, while asserting an execution inhibit signal outputted to the execution control signal generation unit corresponding to each COND field when the execution condition is not satisfied. The execution control signal generation unit in which the execution inhibit signal is asserted from any execution condition determination unit forcibly negates an execution control signal related to updating of the state. When the execution condition is not satisfied in condition execution instruction processing specifying the execution condition for its own instruction, each asserts the execution inhibit signal to the corresponding execution control signal generation unit.

When the instruction processed in the first decoder 921 is an execution condition specifying instruction, for example, it performs determination of the execution condition in the first execution condition determination unit 925. The first execution condition determination unit 925 determines whether the execution conditions for subinstructions placed in the container 2 to container 4 respectively is true or false, and when the determination results are false, false and true, it asserts the execution inhibit signals outputted to the second execution control signal generation unit 930 and the third execution control signal generation unit 931, inhibits execution of the instructions based on the decoded results of the respective ones of the second decoder 992 and the third decoder 993, does not assert the execution inhibit signal outputted to the fourth execution control signal generation unit 932, but lets the instruction based on the decoded result of the fourth decoder 924 executed.

In the data processor of the embodiment 8, execution condition specification becomes effective also as to instructions not executed in parallel. When the container 1 of 872 holds an execution condition specifying instruction and two instructions of the container 3 of 874 and the container 4 of 875 are sequentially executed two instructions, for example, the condition specified in the execution condition specifying instruction becomes effective for the subinstructions of both the container 3 of 874 and the container 4 of 875. Further, the instruction paired with the execution condition specifying instruction may not necessarily be executed in parallel. When one of the sequentially executed two instructions is the execution condition specifying instruction, the condition specified in the execution condition specifying instruction becomes effective also for the paired instruction.

The data processor of the embodiment 8 may also have no FM bit and may take a different format specify method, similarly to the embodiment 7.

Thus, the data processor of the embodiment 8 can control execution/inhibition of three instructions by one execution condition specifying instruction, and hence can perform efficient execution condition specification.

In addition, the data processor of the embodiment 8 individually describes execution conditions for the remaining three operations (subinstructions) with one condition specifying instruction, and hence can specifically set the respective execution conditions, is capable of specification of extremely fine execution conditions with the minimum necessary code size, can describe the instructions with a small number of code sizes, and can implement further performance improvement.

<Embodiment 9.>

Figure 55:
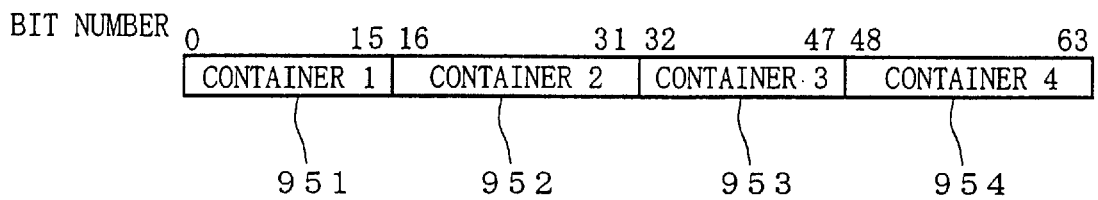
FIG. 55 is an explanatory diagram showing an instruction format of a data processor according to an embodiment 9 of the present invention.

A data processor of an embodiment 9 whose execution condition specify method for the condition specifying instruction of the embodiment 8 is different is described. FIG. 55 shows an instruction format of the data processor of the embodiment 9. The data processor of the embodiment 9 comprises no format specification bit but four subinstructions held in four containers 951 to 954 are necessarily executed in parallel. Each subinstruction is formed by 16 bits. The basic structure is substantially identical to the data processor of the embodiment 7, and detailed description is omitted. The execution condition determination method is substantially identical to the data processor of the embodiment 8. Only an execution condition specify method for a condition specifying instruction is different.

Figure 56:
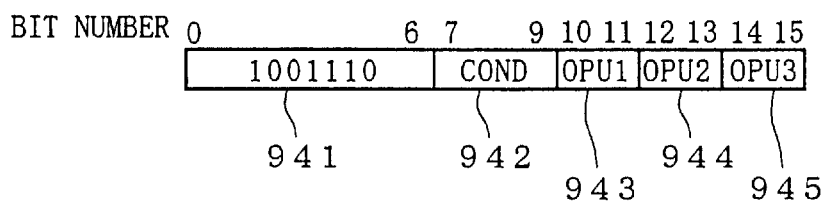
FIG. 56 is an explanatory diagram showing instruction bit allocation of a condition execution instruction in the data processor according to the embodiment 9 of the present invention.

FIG. 56 shows instruction bit allocation of a condition execution instruction in the data processor of the embodiment 9. In the data processor of the embodiment 9, a common condition for one instruction is specified in a COND field 942. A composite condition of an F0 flag, an F1 flag and two flags are specifiable. In OPU1, OPU2 and OPU3 fields 943, 944 and 945, conditions corresponding to other respective containers are specified. Three of performing execution when the condition specified in the COND field 942 is true, performing execution when false and unconditionally performing execution regardless of the condition are specifiable every container. The association between the OPU1, OPU2 and OPU3 fields 943, 944 and 945 and the container 1 (951) to the container 4 (954) is similar to the association between the COND1, COND2 and COND3 fields 912 to 914 and the container 1 (872) to the container 4 (875) in the data processor of the embodiment 8.

Thus, the data processor of the embodiment 9 can individually specify execution conditions for the remaining three operations (subinstructions) with one condition specifying instruction similarly to the embodiment 8, and hence extremely fine specification of execution conditions is enabled with a small number of instruction codes and further performance improvement is implemented with a small number of code sizes.

In order to simplify hardware in the data processor of the embodiment 9, limitation may be made to specify an execution condition, implement an instruction specified in a specific container when the condition is satisfied and implement a second operation which is an instruction specified in another container when the condition is not satisfied. Limitation may be made to specify an execution condition and execute all subinstructions only when the condition is satisfied. However, the performance may be deteriorated as compared with the aforementioned case. In any case, the implemented function may be decided through trade-off of the performance and the cost.

A format specification bit for specifying an order of executions or format may be comprised in an instruction code. When an order of executions is specified, specification of the execution condition becomes effective so far as it is an instruction in the same 64 bits even if the same is not an instruction executed in parallel with the execution condition specifying instruction.

By implementing such an execution condition specifying instruction, it is possible to batch-perform a series of processing accompanied by a condition branch instruction specifying the execution condition in an instruction 1, executing an instruction 2 when the condition is satisfied, executing an instruction 3 when the condition is not satisfied and unconditionally executing an instruction 4 regardless of the execution condition or the like. Thus, the data processor of the embodiment 9 is capable of performing efficient condition execution without comprising an execution condition specify field for each instruction by implementing minute execution condition specification with one subinstruction, and the processing performance improves while the code size can also be reduced.

While the invention has been described in detail, the above description is entirely illustrative and not restrictive.

It is conceivable that a number of other improvements or modifications are considerable without separating from the scope of the present invention.

What is claimed is:

1. A data processor receiving a parallel processing instruction including first and second instruction codes defining first and second instructions, comprising:
    a first decoder for decoding said first instruction code to output a first decoded result;
    a second decoder for decoding said second instruction code to output a second decoded result;
    flag information storage means for storing flag information;
    first execution control means for controlling execution of said first instruction on the basis of said first decoded result;
    second execution control means for controlling execution of said second instruction on the basis of said second decoded result; and
    first execution condition judgment means for outputting second instruction execution control information which controls whether to permit or inhibit the execution of said second instruction to said second execution control means on the basis of whether or not said flag information satisfies a second instruction execution condition when said first instruction is an execution condition specifying instruction defining an execution condition for said second instruction based on said flag information,
    wherein said second execution control means controls whether to permit or inhibit the execution of said second instruction on the basis of indication of said second instruction execution control information.

2. The data processor according to claim 1, further comprising:
    second execution condition judgment means for outputting first instruction execution control information which controls whether to permit or inhibit the execution of said first instruction to said first execution control means on the basis of whether or not said flag information satisfies a first instruction execution condition when said second instruction is an execution condition specifying instruction defining an execution condition for said first instruction based on said flag information,
    wherein said first execution control means controls whether to permit or inhibit the execution of said first instruction on the basis of indication of said first instruction execution control information.

3. The data processor according to claim 1, wherein
    said parallel processing instruction further includes third and fourth instruction codes defining third and fourth instructions,
    said data processor further comprises:
        a third decoder for decoding said third instruction code to output a third decoded result;
        a fourth decoder for decoding said fourth instruction code to output a fourth decoded result;
        third execution control means for controlling execution of said third instruction on the basis of said third decoded result;
        fourth execution control means for controlling execution of said fourth instruction on the basis of said fourth decoded result; and
        third execution condition judgment means for outputting fourth instruction execution control information which controls whether to permit or inhibit the execution of said fourth instruction to said fourth execution control means on the basis of whether or not said flag information satisfies a fourth instruction execution condition when said third instruction is an execution condition specifying instruction defining an execution condition for said fourth instruction based on said flag information,
    said fourth execution control means controls whether to permit or inhibit the execution of said fourth instruction on the basis of indication of said fourth instruction execution control information.

4. The data processor according to claim 1, wherein
    said parallel processing instruction further includes a third instruction code defining a third instruction,
    said data processor further comprises:
        a third decoder for decoding said third instruction code to output a third decoded result; and
        third execution control means for controlling execution of said third instruction on the basis of said third decoded result,
    said first execution condition judgment means outputs third instruction execution control information which controls whether to permit or inhibit the execution of said third instruction to said third execution control means on the basis of whether or not said flag information satisfies a third instruction execution condition when said first instruction is said execution condition specifying instruction also defining an execution condition for said third instruction based on said flag information as well as the execution condition for said second instruction, and
    said third execution control means controls whether to permit or inhibit the execution of said third instruction on the basis of indication of said third instruction execution control information.

5. The data processor according to claim 4, wherein
    said second instruction execution condition and said third instruction execution condition are independently described in said first instruction code respectively when said first instruction is said execution condition specifying instruction.

6. The data processor according to claim 4, wherein
    said second instruction execution condition and said third instruction execution condition arc partially duplicated in said first instruction code when said first instruction is said execution condition specifying instruction, and
    said second instruction execution condition consists of a common execution condition and an execution condition specific to said second instruction, and said third instruction execution condition consists of said common execution condition and an execution condition specific to said third instruction.

7. The data processor according to claim 4, wherein
    a common execution condition common to said second instruction execution condition and said third instruction execution condition is described in said first instruction code when said first instruction is said execution condition specifying instruction, and
    said first execution condition judgment means outputs said second instruction execution control information indicating permission of the execution of said second instruction while outputting said third instruction execution control information indicating inhibition of the execution of said third instruction when satisfying said common executing condition, and outputs said second instruction execution control information indicating inhibition of the execution of said second instruction while outputting said third instruction execution control information indicating permission of the execution of said third instruction when not satisfying said common execution condition.

8. The data processor according to claim 1, wherein said flag information includes first and second flag information, and said execution condition specifying instruction is an instruction specifying an execution condition consisting of a composite condition decided by said first flag information and said second flag information.

9. A data processor capable of executing an instruction at least including a flag update instruction to update flag information and a flag control execution instruction whose execution content is decided on the basis of said flag information, comprising:

flag information storage means for storing said flag information; and instruction execution control means for outputting flag update relevant information relevant to flag updating to said flag information storage means on the basis of said flag update instruction when an instruction to be executed is said flag update instruction and for execution-controlling said flag control execution instruction with an execution content decided on the basis of the content of said flag information when said instruction is said flag control execution instruction, wherein said flag information includes first and second flag information each including information of at least one flag, and said flag information storage means stores said first flag information as said second flag information and updates said first flag information on the basis of said flag update relevant information.

10. The data processor according to claim 9, wherein said first flag information includes information of a plurality of flags, and said second flag information includes information of a plurality of flags.

11. The data processor according to claim 9, wherein said flag information further includes third flag information, and said flag information storage means stores said second flag information as said third flag information when said second flag information is updated.

12. The data processor according to claim 9, wherein said flag control execution instruction includes an instruction whose execution content is decided on the basis of only said second flag information.

13. The data processor according to claim 9, wherein said flag control execution instruction includes an instruction whose execution content is decided on the basis of a composite condition combining said first flag information and said second flag information.

14. The data processor according to claim 9, wherein said flag control execution instruction includes an instruction whose execution content is decided on the basis of only said second flag information.

15. The data processor according to claim 9, wherein said flag control execution instruction includes an instruction whose execution content is decided on the basis of a composite condition by combining said first flag information and said second flag information.

16. A data processor capable of executing an instruction at least including a flag update instruction to update flag information and a flag control execution instruction whose execution content is decided on the basis of said flag information, comprising:

flag information storage means for storing said flag information; and instruction execution control means for outputting flag update relevant information relevant to flag updating to said flag information storage means on the basis of said flag update instruction when an instruction to be executed is said flag update instruction and for execution-controlling said flag control execution instruction with an execution content decided on the basis of said flag information when said instruction is said flag control execution instruction, wherein said flag information includes first and second flag information each including information of at least one flag and update flag information specifying flag information to be updated in said first and second flag information, and said flag information storage means updates one of said first and second flag informations indicated by said update flag information on the basis of said flag update relevant information.

17. The data processor according to claim 16, wherein said first flag information includes information of a plurality of flags, and said second flag information includes information of a plurality of flags.

18. A data processor capable of executing an instruction at least including a flag control execution instruction whose execution content is decided on the basis of flag information, comprising:

flag information storage means for storing said flag information; and instruction execution control means for execution-controlling said flag control execution instruction whose execution content is decided on the basis of the content of said flag information when said instruction is said flag control execution instruction, wherein said flag information includes first and second flag information each including information of at least one flag, and said flag control execution instruction includes an instruction writing a first value in a prescribed storage unit on the basis of a composite condition decided by said first and second flag information when said composite condition is satisfied while writing a second value in said prescribed storage unit when not satisfied.

19. The data processor according to claim 18, wherein said first flag information includes information of a plurality of flags, and said second flag information includes information of a plurality of flags.

20. The data processor according to claim 18, wherein said prescribed storage unit includes at least one of a register, an accumulator and a memory.

* * * * *